(12) United States Patent
Lavelle et al.

(10) Patent No.: US 7,599,439 B2
(45) Date of Patent: Oct. 6, 2009

(54) METHOD AND SYSTEM FOR TRANSMITTING N-BIT VIDEO DATA OVER A SERIAL LINK

(75) Inventors: Michael G. Lavelle, Saratoga, CA (US); Paul Daniel Wolf, San Carlos, CA (US)

(73) Assignee: Silicon Image, Inc., Sunnyvale, CA (US)

(*) Notice: Subject to any disclaimer, the term of this patent is extended or adjusted under 35 U.S.C. 154(b) by 756 days.

(21) Appl. No.: 11/166,458

(22) Filed: Jun. 24, 2005

(65) Prior Publication Data

US 2007/0009060 A1    Jan. 11, 2007

(51) Int. Cl.
*H04N 7/18* (2006.01)
(52) U.S. Cl. .............................. 375/240.26; 375/240.27
(58) Field of Classification Search ......... 348/469–478; 375/240.01–240.29

See application file for complete search history.

(56) References Cited

U.S. PATENT DOCUMENTS 6,914,637 B1* 7/2005 Wolf et al. .................. 348/473

7,187,307 B1* 3/2007 Schmidt et al. ............... 341/50

FOREIGN PATENT DOCUMENTS

JP    2003-101975    4/2003

\* cited by examiner

*Primary Examiner*—Andy S Rao
(74) *Attorney, Agent, or Firm*—Girard & Equitz LLP

(57) ABSTRACT

A system including a receiver, a TMDS link (or other serial link), and a transmitter configured to transmit K-bit video words (typically, encoded 8-bit video words) over the link. In typical embodiments, the transmitter is configured to pack a sequence of N-bit video words, where N≠K (e.g., N=10, 12, or 16, when K=8) into a sequence of K-bit fragments, encode the fragments, and transmit the encoded fragments. The transmitted data are indicative of a sequence of M-fragment groups, and the transmitter is typically configured also to transmit over the link packing phase data indicative of the phase of the most recently transmitted fragment. Other aspects are transmitters and receivers for use in such a system and methods implemented by any such transmitter, receiver, or system.

50 Claims, 14 Drawing Sheets

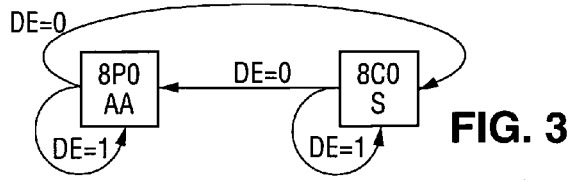
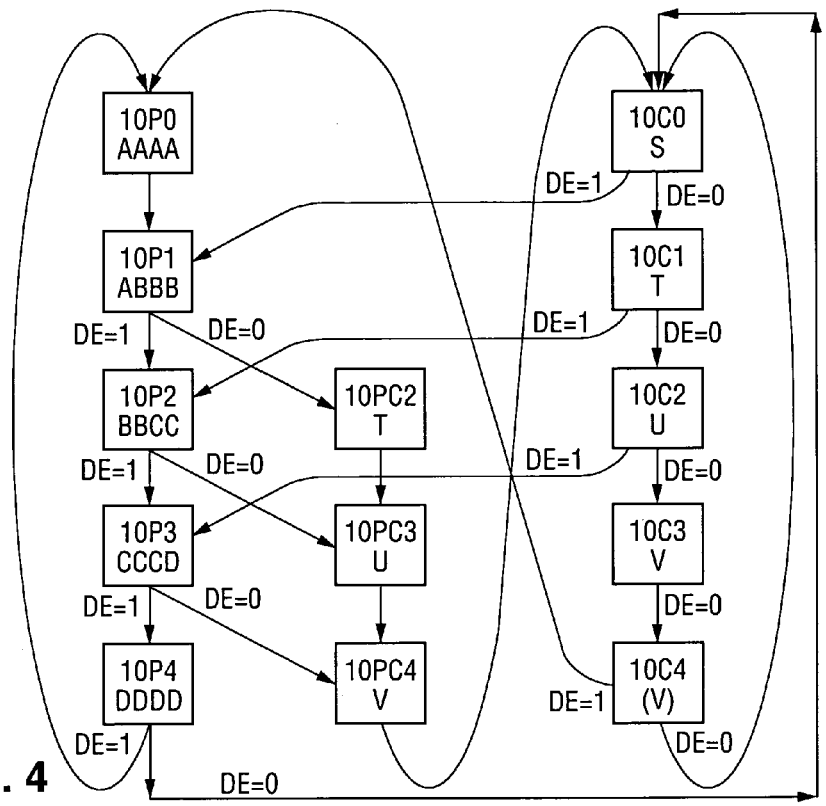
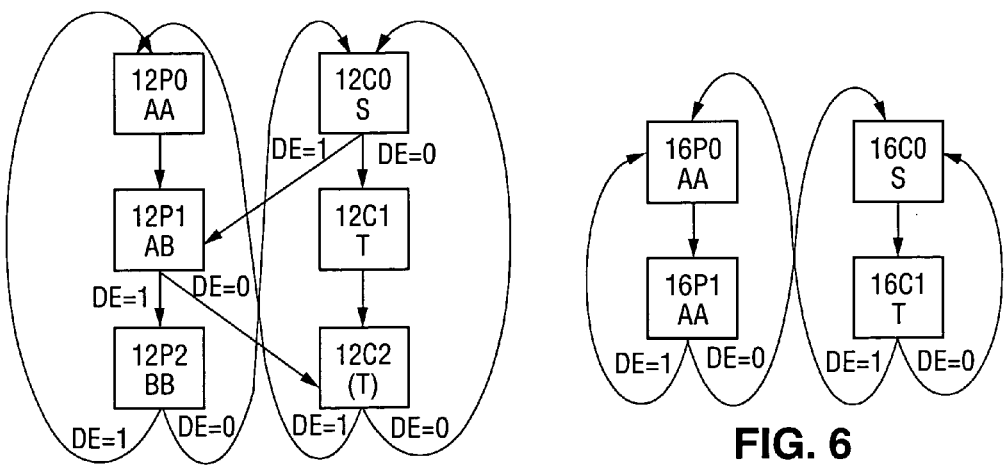
FIG. 3
FIG. 4
FIG. 5
FIG. 6

METHOD AND SYSTEM FOR TRANSMITTING N-BIT VIDEO DATA OVER A SERIAL LINK

TECHNICAL FIELD OF THE INVENTION

The invention pertains to methods and systems for transmitting video data (e.g., encoded video data) over a serial link, and to transmitters and receivers for use in such systems. In preferred embodiments, the serial link is a transition minimized differential signaling ("TMDS") link, or a link having some but not all of the characteristics of a TMDS link.

BACKGROUND OF THE INVENTION

Throughout this disclosure (including in the claims) the expression "pixel clock" (or "source pixel clock") denotes the pixel rate clock employed by a transmitter to receive (from a source) or generate video data to be transmitted over a serial link (e.g., video data to be encoded, serialized, and then transmitted over a serial link). Typically, a pixel clock cycles once per pixel.

Throughout this disclosure (including in the claims) "link clock" denotes the link rate clock employed by a transmitter to transmit data symbols (e.g., encoded video data) over a serial link. In the case of transmission over a TMDS link, the link clock cycles once per link symbol. In operation of a typical, conventional DVI-compliant or HDMI-compliant system ("DVI" and "HDMI" links are discussed below), the source pixel clock's frequency matches that of the link clock, and the transmitter transmits the link clock (with encoded video data) to the receiver over the serial link.

Various serial links for transmitting data and clock signals are well known.

One conventional serial link, used primarily for high-speed transmission of video data from a host processor (e.g., a personal computer) to a monitor, is known as a transition minimized differential signaling interface ("TMDS" link). The characteristics of a conventional TMDS link include the following:

1. 8-bit words (components) of video data are encoded and then transmitted as 10-bit encoded symbols. Each 8-bit Red, Green, or Blue component of a 24-bit RGB pixel of digital video data is converted to an encoded 10-bit symbol before transmission;

a. the encoding determines a set of "in-band" (data) words and a set of "out-of-band" (control) words (the encoder can generate only "in-band" words in response to video data, although it can generate "out-of-band" words in response to control or sync signals. Each in-band word is an encoded word resulting from encoding of one input video data word. All words transmitted over the link that are not in-band words are "out-of-band" words);

b. the encoding of video data is performed such that the in-band words are transition minimized (a sequence of in-band words has a reduced or minimized number of transitions);

c. the encoding of video data is performed such that the in-band words are DC balanced (the encoding prevents each transmitted voltage waveform that is employed to transmit a sequence of in-band words from deviating by more than a predetermined threshold value from a reference potential. Specifically, the tenth bit of each "in-band" word indicates whether eight of the other nine bits thereof have been inverted during the encoding process to correct for an imbalance between running counts of ones and zeroes in the stream of previously encoded data bits);

2. the encoded video data and a video clock signal are transmitted as differential signals (the video clock and encoded video data are transmitted as differential signals over conductor pairs);

3. three conductor pairs are employed to transmit the encoded video, and a fourth conductor pair is employed to transmit the video clock signal; and 4. signal transmission occurs in one direction, from a transmitter (typically associated with a desktop or portable computer, or other host) to a receiver (typically an element of a monitor or other display device).

Another serial link is the "High Definition Multimedia Interface" interface ("HDMI" link) developed Silicon Image, Inc., Matsushita Electric, Royal Philips Electronics, Sony Corporation, Thomson Multimedia, Toshiba Corporation, and Hitachi. An HDMI link can be implemented to include two TMDS links (which share a common conductor pair for transmitting a video clock signal) or one TMDS link, as well as additional control lines between the transmitter and receiver.

Another serial link is the "Digital Visual Interface" interface ("DVI" link) adopted by the Digital Display Working Group. It will be described with reference to FIG. 1. A DVI link can be implemented to include two TMDS links (which share a common conductor pair for transmitting a video clock signal) or one TMDS link, as well as additional control lines between the transmitter and receiver. The DVI link of FIG. 1 includes transmitter 1, receiver 3, and a cable (comprising connectors 120 and 121 and conductor set 122) between the transmitter and receiver. Conductor set 122 comprises four conductor pairs, Channel 0, Channel 1, and Channel 2 (sometimes referred to as "CH0," "CH1," and "CH2") for video data, and Channel C (sometimes referred to herein as "CHC") for a clock signal. Conductor set 122 also includes Display Data Channel ("DDC") lines for bidirectional communication between the transmitter and a monitor associated with the receiver in accordance with the conventional Display Data Channel standard (the Video Electronics Standard Association's "Display Data Channel Standard," Version 2, Rev. 0, dated Apr. 9, 1996), a Hot Plug Detect (HPD) line (on which the monitor transmits a signal that enables a processor associated with the transmitter to identify the monitor's presence), Analog lines (for transmitting analog video to the receiver), and Power lines (for providing DC power to the receiver and a monitor associated with the receiver). The Display Data Channel standard specifies a protocol for bidirectional communication between a transmitter and a monitor associated with a receiver, including transmission by the monitor of an Extended Display Identification ("EDID") message that specifies various characteristics of the monitor, and transmission by the transmitter of control signals for the monitor. Transmitter 1 includes three identical encoder/serializer units (units 2, 4, and 6) and additional circuitry (not shown). Receiver 3 includes three identical recovery/decoder units (units 8, 10, and 12) and inter-channel alignment circuitry 14 connected as shown, and additional circuitry (not shown).

As shown in FIG. 1, circuit 2 encodes the data to be transmitted over Channel 0, and serializes the encoded bits. Similarly, circuit 4 encodes the data to be transmitted over Channel 1 (and serializes the encoded bits), and circuit 6 encodes the data to be transmitted over Channel 2 (and serializes the encoded bits). Each of circuits 2, 4, and 6 responds to a control signal (an active high binary control signal referred to as a "data enable" or "DE" signal) by selectively encoding either digital video words (in response to DE having a high value) or a control or synchronization signal pair (in response to DE having a low value). Each of encoders 2, 4, and 6 receives a different pair of control or synchronization signals: encoder 2 receives horizontal and vertical synchronization signals (HSYNC and VSYNC); encoder 4 receives control bits CTL0 and CTL1; and encoder 6 receives control bits CTL2 and CTL3. Thus, each of encoders 2, 4, and 6 generates in-band data symbols indicative of video data (in response to DE having a high value), encoder 2 generates out-of-band control symbols indicative of the values of HSYNC and VSYNC (in response to DE having a low value), encoder 4 generates out-of-band control symbols indicative of the values of CTL0 and CTL1 (in response to DE having a low value), and encoder 6 generates out-of-band words indicative of the values of CTL2 and CTL3 (in response to DE having a low value). In response to DE having a low value, each of encoders 4 and 6 generates one of four specific out-of-band control symbols indicative of the values 00, 01, 10, or 11, respectively, of control bits CTL0 and CTL1 (or CTL2 and CTL3).

It has been proposed to use a cryptographic protocol known as "High-bandwidth Digital Content Protection"("HDCP") to encrypt digital video to be transmitted over a DVI link and to decrypt the data at the DVI receiver. A DVI transmitter implementing HDCP outputs a 24-bit bus, known as cout[23: 0], during the video active period (i.e. when DE is high). This 24-bit cout data is "Exclusive Ored" (in logic circuitry in the transmitter) with the 24-bit RGB video data input to the transmitter in order to encrypt the video data. The encrypted data is then encoded (according to the TMDS standard) for transmission. The same cout data is also generated in the receiver. After the encoded and encrypted data received at the receiver undergoes TMDS decoding, the cout data is processed together with the decoded video in logic circuitry in order to decrypt the decoded data and recover the original input video data.

Before the transmitter begins to transmit HDCP encrypted, encoded video data, the transmitter and receiver communicate bidirectionally with each other to execute an authentication protocol (to verify that the receiver is authorized to receive protected content, and to establish shared secret values for use in encryption of input data and decryption of transmitted encrypted data). After the receiver has been authenticated, the transmitter calculates the initial set of encryption keys (for encrypting the first line of input video data) in response to a control signal and sends the control signal to the receiver (during each vertical blanking period, when DE is low) to cause the receiver to calculate an initial set of decryption keys (for decrypting the first received and decoded line of transmitted video data). Following generation of the initial set of encryption/decryption keys, each of the transmitter and receiver performs a re-keying operation during each blanking (vertical or horizontal) interval to generate a new set of keys for encrypting (or decrypting) the next line of video data, and actual encryption of input video data (or decryption of received, decoded video data) is performed using the latest set of keys only when DE is high (not during the blanking intervals).

Throughout the specification the expression "TMDS-like link" will be used to denote a serial link capable of transmitting encoded data (e.g., encoded digital video data) and a clock for the encoded data, from a transmitter to a receiver, and also capable of transmitting (bidirectionally or unidirectionally) one or more additional signals (e.g., encoded digital audio data or other encoded data) between the transmitter and receiver, that is or includes either a TMDS link or a link having some but not all of the characteristics of a TMDS link. Examples of TMDS-like links include links that differ from TMDS links only by encoding data as N-bit code words (e.g., with N≠10 or N=10) that are not 10-bit TMDS code words, and links that differ from TMDS links only by transmitting encoded video over more than three or less than three conductor pairs. There are several conventional TMDS-like links.

The term "transmitter" is used herein in a broad sense to denote any device capable of encoding data and transmitting the encoded data over a serial link (and optionally also performing additional functions, which can include encrypting the data to be transmitted and other operations related to encoding, transmission, or encryption of the data). The term "receiver" is used herein in a broad sense to denote any device capable of receiving and decoding data that has been transmitted over a serial link (and optionally also performing additional functions, which can include decrypting the received data and other operations related to decoding, reception, or decryption of the received data). For example, the term transmitter can denote a transceiver that performs the functions of a receiver as well as the functions of a transmitter. In a more specific example, the term transmitter (with reference to a device that transmits non-audio auxiliary data over a TMDS-like link or other serial link) can denote a transceiver that is configured to receive video data and audio data over the link and to transmit the non-audio auxiliary data over the link.

Some TMDS-like links encode input video data (and other data) to be transmitted into encoded words comprising more bits than the incoming data using a coding algorithm other than the specific algorithm used in a TMDS link, and transmit the encoded video data as in-band characters and the other encoded data as out-of-band characters. The characters need not be classified as in-band or out-of-band characters based according to whether they satisfy transition minimization and DC balance criteria. Rather, other classification criteria could be used. An example of an encoding algorithm, other than that used in a TMDS link but which could be used in a TMDS-like link, is IBM 8b10b coding. The classification (between in-band and out-of-band characters) need not be based on just a high or low number of transitions. For example, the number of transitions of each of the in-band and out-of-band characters could (in some embodiments) be in a single range (e.g., a middle range defined by a minimum and a maximum number of transitions).

The data transmitted between the transmitter and receiver of a TMDS-like link can, but need not, be transmitted differentially (over a pair of conductors). Also, although a TMDS link has four differential pairs (in the single pixel version), three for video data and the other for a video clock, a TMDS-like link could have a different number of conductors or conductor pairs. Also, even though a TMDS link explicitly transmits the link clock over a separate differential pair, other links (including some TMDS-like links) do not explicitly transmit the link clock, in which case the receiver is required to recover the implicit clock from the data signaling. A link clock is not explicitly transmitted in all embodiments of the present invention, although a link clock is explicitly transmitted in some embodiments.

SUMMARY OF THE INVENTION

In a class of embodiments, the invention is a transmitter configured to pack a sequence of N-bit words of video data (where N is a "color depth" parameter, and N≠8) into a sequence of K-bit words to be referred to as "fragments" (where K is not equal to N) to encode the K-bit fragments, and to transmit the encoded fragments to a receiver over a serial link. Typically, the N-bit words of video data are received or generated by the transmitter at rate P, and encoded fragments are transmitted at a rate (N/K)P. In preferred embodiments, the color depth parameter N is 10, 12, or 16, and K=8 (e.g., as in embodiments in which three streams of encoded 8-fragments of data generated in accordance with the invention are transmitted in place of the three encoded streams of 8-bit components that are transmitted conventionally over serial links employed in DVI-compliant and HDMI-compliant systems).

In accordance with preferred embodiments of the invention, the transmitted data are indicative of a sequence of M-fragment "groups" (each group consisting of M fragments, where M is N divided by the greatest common divisor of N and K), and the "j" th fragment in each group (where $1 \leq j \leq M$) has a phase within the group. Each group of M fragments carries the encoded data for a group of (M*K/N) N-bit video data words. In accordance with preferred embodiments of the invention, a receiver is configured to deserialize and decode the K-bit fragments at the link transmission rate (N/K)P and to the unpack (reassemble) the transmitted fragments into N-bit words of video and blanking data that are output exactly at the original pixel rate P. The receiver unpacking sequence is designed to match and track the transmitter packing sequence.

In preferred embodiments, the transmitter is configured to occasionally transmit, over the link, phase information (sometimes referred to herein as "packing phase data") indicative of the phase of the most recently transmitted fragment at a known checkpoint (e.g., the start or end of a line or frame), to allow the receiver to unpack the recovered fragments in phase with the packing by the transmitter. The phase information may be explicit, for example, by allowing the phase to vary and transmitting a "packing phase at checkpoint" message during blanking. This approach supports arbitrary active pixel, blanking and total (active pixel plus blanking) counts between checkpoints (e.g., arbitrary active pixel, blanking and total counts per video line). In typical embodiments, (K+X)-bit code words (where X>0) indicative of the K-bit fragments are transmitted during active video periods, and the explicit phase information is indicated by other (K+X)-bit code words transmitted over the same channel during blanking intervals.

In other embodiments, the phase information may be implicit (e.g., packing phase data are indicated implicitly to the receiver, rather than being explicitly transmitted to the receiver). For example, this can be done by fixing the transmitted phase at a checkpoint, such as the start of blanking. This approach supports arbitrary pixel and blanking counts for cases in which the total (pixel plus blanking) count can be constrained to an exact multiple of the pixel group size. For another example, the phase information may be implicit by always restarting the transmitter packing sequence at a checkpoint, such as the start of pixel data (the start of an active video interval), and allowing the number of link symbols transmitted during blanking to vary slightly from line to line, such that the ratio of link symbols to pixel plus blanking characters is exactly (N/K). This approach supports arbitrary total, pixel and blanking counts.

In typical embodiments, the transmitter is operable in any of at least two different packing modes (sometimes referred to as color depth modes), the parameter N has a different value in each mode, the parameter K is a constant for the encoding system (K=8 for TMDS encoding), and the transmitter is configured to transmit (over the serial link) the encoded fragments, the packing phase data, and data (sometimes referred to as "color mode data") indicative of the color depth mode in which the transmitter currently operates. In some such embodiments, the transmitter is operable in an 8-bit mode to transmit 8-bit words of video data (encoded as Q-bit code words) to a receiver over the serial link using a link clock having frequency P is also operable in at least one other mode in accordance with the invention to pack N-bit words (where N is not equal to 8) of video data (typically clocked into the transmitter using a pixel clock having frequency P) into 8-bit fragments, encode the fragments as Q-bit code words (each code word having an 8 bit payload), and transmit the code words to the receiver using a link clock having frequency (N/8)P. The receiver decodes the received code words to recover the 8-bit fragments, unpacks the fragments to recover the original sequence of N-bit video data words, and recovers the original pixel clock (having frequency P) from the color mode data and link clock. The receiver must use the same sequence for unpacking that the transmitter used for packing, and the packing and unpacking sequences must be exactly synchronized.

In contrast with other possible solutions to the problem of how to transmit N-bit video data words (where $N \neq K$) over a serial link that transmits encoded K-bit words, the inventive approach wastes no bandwidth and can deal with pixel counts and blanking counts that are not exact multiples of the packing group size.

Other aspects of the invention are systems that include a serial link, a receiver, and any embodiment of the inventive transmitter. Other aspects of the invention are receivers for use in such systems, and methods performed by any embodiment of inventive transmitter, system, or receiver. In preferred embodiments, the transmitted fragments of video data (each indicative of an 8-bit video word) are encoded and then code words indicative of the encoded fragments are transmitted.

In a class of embodiments, the serial link is a TMDS link. The original TMDS link specification provides for transmission of 24-bit RGB pixels by assigning each of three 8-bit color components (red, green and blue) to each of three differential data channels (wire pairs sometimes referred to as "lanes"). Each 8-bit component is encoded as a 10-bit code word, the 10-bit code words for each color component are transmitted serially over a specific one of the lanes and decoded to 8 bits separately from the other lanes, and each set of three decoded components is reassembled into a pixel after decoding. In some embodiments in which the serial link is a TMDS link, each transmitter lane operable to transmit 8-bit words of video component data as 10-bit TMDS code words over a differential wire pair of the TMDS link using a link clock having frequency P is also operable (in at least one other mode) in accordance with the invention to transmit M*8/N-member groups of N-bit words of video data (where $N \neq 8$) as M-fragment groups of 10-bit TMDS code words (each codeword having an 8 bit payload) using a link clock having frequency (N/8)P. The N-bit words (each of which is typically a Red, Green, or Blue color component) are broken into pieces (each piece having size not larger than 8 bits) and the pieces are then packed into 8 bit fragments for encoding as TMDS code words (symbols).

For a given color depth parameter N, N-bit video words are packed into 8-bit fragments (with 100% efficiency) with a repeating cycle in accordance with preferred embodiments of the invention. For example, if N=10, the 10-bit red color components of four consecutive pixels of RGB video data are packed into a five-fragment group (each fragment consisting of 8 bits so that 8 bits per fragment*5 fragments per group=40 bits per group) sufficient to carry the 10-bit red components of the four pixels. A similar process is also applied to the green and blue components of the pixels. For another example, if N=12, the 12-bit red color components of two consecutive pixels of RGB video data are packed into a three-fragment group (each fragment consisting of 8 bits, so that 8 bits per fragment*3 fragments per group=24 bits per group) sufficient to carry the 12-bit red components of the two pixels. Such packing does not waste any bandwidth.

Although some embodiments pack three N-bit components of a D-bit pixel separately, the invention also applies equally to embodiments that do not separate data words or pixels into components prior to packing. Nor is the invention limited to links that use a specific lane count. In general, the invention supports sending D-bit words over L lanes using groups of M fragments of K bits each, where each fragment group contains M*L*K bits, carrying W=M*L*K/D words per group, where M, L, K, W and D are all integers.

In preferred embodiments, packing state machine sequences implemented by the inventive transmitter are carefully designed so that they can switch from packing pixel fragments to passing unpacked blanking characters and back again at any boundary (not just at packing group boundaries). This is useful because some common standard television timings have pixel or blanking counts that are not exact multiples of 4 pixels (the packing group size for 10-bit components).

Packing phase data and color mode data (described above) are transmitted over a serial link in any of a variety of ways in various embodiments of the invention. For example, during blanking intervals, DVI-compliant embodiments of the inventive transmitter can transmit TMDS code words indicative of two control bits over each of the three data channels of a TMDS link (a total of six control bits per link clock cycle), can use two of these bits as horizontal and vertical sync bits, and can use some or all of the other four bits (CTL0, CTL1, CTL2, CTL3) as packing phase data and optionally also color mode data. For another example, during portions of blanking intervals known as data islands, HDMI-compliant embodiments of the inventive transmitter can transmit packets including encoded auxiliary data (e.g., encoded audio data) and control bits over data channels of a TMDS link. In accordance with the present invention, some such packets can include packing phase data and/or color mode data.

With reference again to a class of embodiments of the invention in which the serial link is a TMDS link and the transmitter and receiver are DVI-compliant, 3N-bit input video words (pixels) are typically clocked into the transmitter using a pixel clock having frequency P (alternatively, they could be generated in the transmitter in a subsystem that is clocked by a pixel clock). Three streams of TMDS code words are generated in response to each 3N-bit pixel. Typically, one of the streams of TMDS code words is indicative of red color component data, another of green color component data, and another of blue color component data. Each TMDS code word stream is transmitted over a different channel (Channel 0, Channel 1, or Channel 2) of the TMDS link using a link clock having frequency (N/8)P.

In preferred embodiments, a transmitter that embodies the invention is operable in an 8-bit mode to perform conventional TMDS encoding of video data (to generate a 10-bit TMDS code word in response to each 8-bit component of 24-bit video data) and transmit the encoded data over a serial link (e.g., a DVI or HDMI link), and is also operable in at least one N-bit mode (where N≠8) to generate a 10-bit TMDS code word in response to each N-bit component of 3N-bit video data and transmit the encoded data over a serial link.

In some such embodiments, the transmitter in the 8-bit mode receives or generates 24-bit video data pixels at rate P (each pixel comprising an 8-bit Red component, an 8-bit Green component, and an 8-bit Blue component) and transmits TMDS code words indicative of the pixels over a DVI or HDMI link (or other serial link) at rate P. The transmitter is also operable in one or more of:

an 18-bit pixel mode in which it receives or generates 18-bit video data at rate P (e.g., pixels each consisting of a 6-bit Red component, a 6-bit Green component, and a 6-bit Blue component), and transmits TMDS code words indicative of the video data over the link at a rate of (¾)P;

a 30-bit pixel mode in which it receives or generates 30-bit video data pixels at rate P (each consisting of a 10-bit Red component, a 10-bit Green component, and a 10-bit Blue component) and transmits TMDS code words indicative of the video data over the link at a rate of (5/4)P;

a 36-bit pixel mode in which it receives or generates 36-bit video data pixels at rate P (each consisting of a 12-bit Red component, a 12-bit Green component, and a 12-bit Blue component) and transmits TMDS code words indicative of the video data over the link at a rate of (3/2)P;

and a 48-bit pixel mode in which it receives or generates 48-bit video data pixels at rate P (each consisting of a 16-bit Red component, a 16-bit Green component, and a 16-bit Blue component) and transmits TMDS code words indicative of the video data over the link at a rate of 2P.

In some embodiments, a transmitter operable in an M-bit pixel mode (where M≠8, and M=L*P, where L and P are integers) is optionally also operable in a P-bit pixel mode in which it receives or generates P-bit video data, packs and encodes sets of L consecutive P-bit video words (e.g., L consecutive P-bit color components) in the same manner as individual M-bit components are packed and encoded in the M-bit pixel mode, and transmits code words (e.g., TMDS code words) indicative of the video data over a serial link.

In preferred embodiments, a receiver that embodies the invention is configured to receive conventional TMDS-encoded video data from a serial link (e.g., a DVI or HDMI link) and decode the received TMDS code words to generate 24-bit video data (e.g., 24-bit pixels, each comprising an 8-bit Red component, an 8-bit Green component, and an 8-bit Blue component). The receiver is also operable in accordance with the invention in one or more of the following modes:

an 18-bit pixel mode in which it receives TMDS-encoded video data from a serial link at rate (¾)P and decodes the received TMDS code words and unpacks the decoded bits to generate 18-bit video data at rate P (each pixel of which consists of a 6-bit Red component, a 6-bit Green component, and a 6-bit Blue component);

a 30-bit pixel mode in which it receives TMDS-encoded video data from a serial link at rate (5/4)P and decodes the received TMDS code words and unpacks the decoded bits to generate 30-bit video data at rate P (each pixel of which consists of a 10-bit Red component, a 10-bit Green component, and a 10-bit Blue component);

a 36-bit pixel mode in which it receives TMDS-encoded video data from a serial link at rate (3/2)P and decodes the received TMDS code words and unpacks the decoded bits to generate 36-bit video data at rate P (each pixel of which consists of a 12-bit Red component, a 12-bit Green component, and a 12-bit Blue component);

and a 48-bit pixel mode in which it receives TMDS-encoded video data from a serial link at rate 2P and decodes the received TMDS code words and unpacks the decoded bits to generate 48-bit video data at rate P (each pixel of which consists of a 16-bit Red component, a 16-bit Green component, and a 16-bit Blue component).

Typical embodiments of the inventive transmitter are operable in a conventional 8-bit mode in which source pixels are received or generated at a source pixel clock rate, and the link clock rate matches the source pixel clock rate. In these embodiments, the transmitter is also operable in at least one N-bit mode (where N≠8) in which the link clock rate exceeds the source pixel clock rate. Typically, such a transmitter accepts source video data and the pixel clock (from a source) and multiplies the pixel clock by an appropriate factor to generate the link clock. Alternatively, the transmitter may accept (or generate) a link rate clock, and derive the pixel rate clock (for use by the pixel source and the transmitter) by dividing the link rate clock by an appropriate factor. Typical embodiments of the inventive receiver receive the link clock (and the encoded video data at the link clock rate), divide the link clock to recover the pixel clock, recover the source pixel data by decoding and unpacking the encoded video data, and output the recovered source pixel data at the pixel clock rate.

BRIEF DESCRIPTION OF THE DRAWINGS

FIG. 3 is a state diagram of 8-bit mode operation of typical embodiments of the inventive transmitter.

FIG. 4 is a state diagram of 10-bit mode operation of typical embodiments of the inventive transmitter.

FIG. 5 is a state diagram of 12-bit mode operation of typical embodiments of the inventive transmitter.

FIG. 6 is a state diagram of 16-bit mode operation of typical embodiments of the inventive transmitter.

DETAILED DESCRIPTION OF THE PREFERRED EMBODIMENTS

Figure 2:
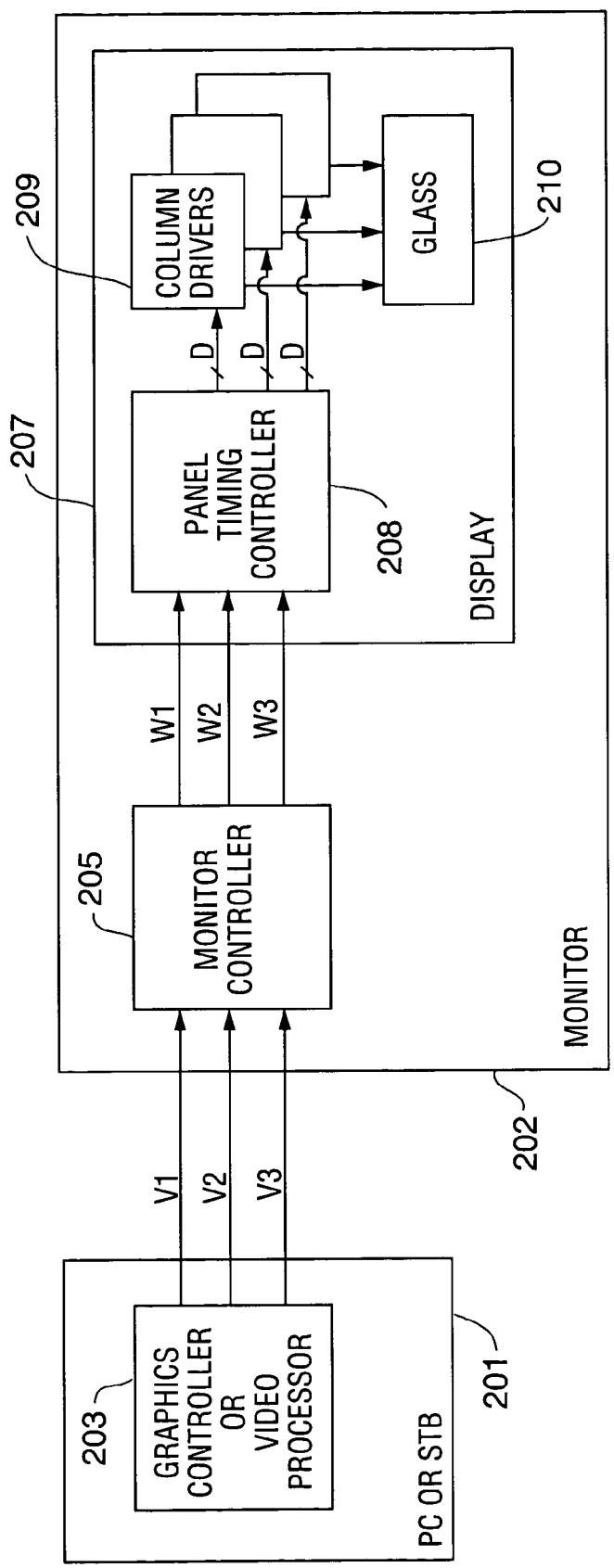
FIG. 2 is a block diagram of a system that that embodies the invention.

In a class of embodiments, the invention is a system including any embodiment of the inventive receiver, any embodiment of the inventive transmitter, and a serial link between the transmitter and receiver. FIG. 2 is a block diagram of an example of such a system. The FIG. 2 system includes video source 201 (which can be a personal computer or set-top box), monitor 202, and a serial link between transmitter 203 (of source 201) and monitor controller 205 (of monitor 202). Monitor 202 includes a display subsystem 207 (including panel timing controller 208, column drivers 209, and a glass panel display 210, connected as shown) as well as monitor controller 205. Each of controllers 205 and 208 is a transceiver. Transmitter 203 of source 201 can be a graphics controller or video processor.

The serial link between transmitter 203 and controller 205 has three channels: channel V1 for transmitting to monitor controller 205 bits indicative of an encoded stream of V-bit components of video data (e.g., V-bit "Red" color components of video data); channel V2 for transmitting bits indicative of another encoded stream of V-bit components of video data (e.g., V-bit "Green" color components of video data); and channel V3 for transmitting bits indicative of another encoded stream of V-bit components of video data (e.g., V-bit "Blue" color components of video data).

There is also another serial link (an "internal interface") between controller 205 and controller 208 having three channels: channel W1 for transmitting to controller 208 bits indicative of an encoded stream of I-bit components of video data (e.g., I-bit "Red" color components of video data); channel W2 for transmitting bits indicative of another encoded stream of I-bit components of video data (e.g., I-bit "Green" color components of video data); and channel W3 for transmitting bits indicative of another encoded stream of I-bit components of video data (e.g., I-bit "Blue" color components of video data).

The serial link between transmitter 203 and controller 205 can be any suitable serial link (e.g., a DVI link, an HDMI link, or another TMDS-like link which may or more not have three lanes). The serial link between controller 205 and controller 208 can also be any suitable serial link (e.g., a TMDS link or another TMDS-like link, not limited to one having three lanes).

A display interface between controller 208 and column drivers 209 is capable of transmitting D-bit components of video data of a first type (e.g., D-bit "Red" color components of video data); D-bit components of video data of a second type (e.g., D-bit "Green" color components of video data); and D-bit components of video data of a third type (e.g., D-bit "Blue" color components of video data).

The color depth parameters V, I, and D can have any value, but preferably $I \geq (V+2)$, to allow accurate (and versatile) gamma and color correction. Color depth parameter D for the display interface is typically set by the display cost point and technology type. Preferably, D satisfies $D \geq (V+2)$ for high quality applications. Preferably, D is equal to 10 or 12 for at least some high quality applications.

In typical implementations, each code word transmitted over each of channels V1, V2, V3, W1, W2, and W3 is indicative of an 8-bit video data component. In operating modes in which color depth parameter V is equal to 8, transmitter 203 and controller 205 can operate in a conventional manner and the link between them can be a conventional link. Similarly, in operating modes in which color depth parameter I is equal to 8, controllers 205 and 208 can operate in a conventional manner the link between them can be a conventional link.

However, in operating modes in which color depth parameter V>8 (e.g., V=10 or V=12) and the link between transmitter 203 and controller 205 is a conventional link (and each code word transmitted over each of channels V1, V2, and V3 is indicative of an 8-bit component), transmitter 203 and controller 205 operate in accordance with the invention. Specifically, transmitter 203 operates in an N-bit mode (in which N=V) in accordance with the invention to pack three sequences of V-bit words of video data (e.g., a sequence each of V-bit Red, Green, and Blue components) into three streams of 8-bit fragments, encode the 8-bit fragments, and transmit each stream of the encoded fragments to controller 205 over a different one of channels V1 V2, and V3. Controller 205 operates in accordance with the invention to decode each received (encoded) fragment and unpack each stream of decoded 8-bit fragments into a sequence of V-bit words (if no errors are present).

Similarly, in operating modes in which color depth parameter I>8 (e.g., I=10 or I=12) and the link between controllers 205 and 208 is a conventional link (and each code word transmitted over each of channels W1, W2, and W3 is indicative of an 8-bit component), controllers 205 and 208 operate in accordance with the invention. Specifically, controller 205 operates as a transmitter in an N-bit mode (in which N=I) in accordance with the invention to pack three sequences of I-bit words (of the video data received from source 201) into three streams of 8-bit fragments, encode the 8-bit fragments, and transmit each stream of the encoded fragments to controller 208 over a different one of channels W1, W2, and W3. Controller 208 operates in accordance with the invention to decode each received (encoded) fragment, and to unpack each stream of decoded 8-bit fragments into a sequence of I-bit words (if no errors are present).

In a class of embodiments, the invention is a transmitter configured to pack a sequence of N-bit words of video data (where N≠8) into a sequence of 8-bit fragments, to encode the 8-bit fragments, and to transmit the encoded fragments to a receiver over a serial link, where the serial link is configured to transmit encoded, 8-bit video data words. In preferred embodiments, the color depth parameter N is 10, 12, or 16. In accordance with the invention, the transmitted data are indicative of a sequence of M-fragment groups (each group consisting of M fragments), and the "j" th fragment in each group (where $1 \leq j \leq M$) has a phase within the group. Preferably, the transmitter is configured to transmit (over the link) packing phase data indicative of the phase of the most recently transmitted fragment, to allow the receiver to decode the encoded data (thereby recovering the fragments) and unpack the recovered fragments in phase with the packing by the transmitter.

In typical embodiments (e.g., those of FIG. 7 and FIG. 8), the transmitter is operable in any of at least two different color depth modes, the color depth parameter N has a different value in each mode, and the transmitter is configured to transmit (over the serial link) the encoded fragments, packing phase data, and "color mode" data indicative of the color depth mode in which the transmitter currently operates. In some such embodiments, the transmitter is operable in an 8-bit mode to transmit 8-bit words of video data (encoded as Q-bit code words) to a receiver over the serial link using a link clock having frequency P is also operable in at least one other mode in accordance with the invention to pack N-bit words (where N>8) of video data (typically clocked into the transmitter using a pixel clock having frequency P) into 8-bit fragments, encode the fragments as Q-bit code words (each code word having an 8 bit payload), and transmit the code words to the receiver using a link clock having frequency (N/8)P. In accordance with the invention, the receiver decodes the received code words to recover the 8-bit fragments, unpacks the fragments to recover the original sequence of N-bit video data words, and recovers the original pixel clock (having frequency P) from the color mode data and link clock. The receiver must use the same sequence for unpacking that the transmitter used for packing, and the packing and unpacking sequences must be exactly synchronized.

In a class of embodiments, the serial link is a TMDS link. In some such embodiments (e.g., those of FIG. 7 and FIG. 8), a transmitter operable to transmit 8-bit words of video data as 10-bit TMDS code words over the TMDS link using a link clock having frequency P is also operable (in at least one other mode) in accordance with the invention to transmit N-bit words of video data (where N>8) as 10-bit TMDS code words (each codeword having an 8 bit payload) using a link clock having frequency (N/8)P. The N-bit words (each of which is typically a Red, Green, or Blue color component) are broken into pieces (each piece having size not larger than 8 bits) and the pieces are then packed into 8 bit fragments for encoding as TMDS code words.

In preferred embodiments (e.g., those to be described with reference to FIGS. 3-6), packing state machine sequences implemented by the inventive transmitter are carefully designed so that they can switch from packing pixel fragments to passing unpacked blanking characters (e.g., code words indicative of color mode and/or packing phase data) and back again at any boundary (not just at packing group boundaries). This is useful because some standard television timings have pixel or blanking counts that are not exact multiples of 4 pixels (the packing group size for 10-bit components).

Packing phase data and color mode data (described above) are transmitted over a serial link in any of a variety of ways in various embodiments of the invention. For example, during blanking intervals, a DVI-compliant implementation of transmitter 100 of FIG. 7 transmits TMDS code words indicative of two control bits over each of the three data channels of a TMDS link (a total of six control bits per link clock cycle), and can transmit two of these bits as horizontal and vertical sync bits and two of the other four bits (CTL0, CTL1, CTL2, CTL3) as packing phase data and color mode data, as described below. For another example, during portions of blanking intervals known as data islands, HDMI-compliant embodiments of the inventive transmitter can transmit packets including encoded auxiliary (e.g., audio) data, other data, and control bits over data channels of a TMDS link. In accordance with the present invention, some such packets can include packing phase data and/or color mode data.

In embodiments of the inventive system in which the serial link is a TMDS link and the transmitter and receiver are DVI-compliant, 3N-bit input pixels are clocked into the transmitter using a pixel clock having frequency P (or the pixels are generated in the transmitter in a subsystem that is clocked by a pixel clock). Three streams of TMDS code words are generated in response to each 3N-bit pixel. Typically, one of the streams of TMDS code words is indicative of red color component data, another of green color component data, and another of blue color component data. Each TMDS code word stream is transmitted over a different channel (Channel 0, Channel 1, or Channel 2) of the TMDS link using a link clock having frequency (N/8)P. When N≠8, N-bit components of the input video data are packed into groups of fragments (F fragments per group, 8 bits per fragment). Typically, less significant pixel bits are packed before more significant pixel bits. Each fragment is then TMDS encoded for transmission. The receiver performs the inverse process to decode and unpack the received data.

For a given color depth parameter N, preferred embodiments of the inventive transmitter (e.g., preferred implementations of transmitter 100 of FIG. 7) pack N-bit video words into 8-bit fragments (with 100% efficiency) with a repeating cycle. For example, if N=10, each four consecutive color components of RGB video data (each component being a 10-bit Red component, 10-bit Green component, or 10-bit Blue component) are packed into a five-fragment group (each fragment consisting of 8 bits so that 8 bits per fragment*5 fragments per group=40 bits per group). For another example, if N=12, each two consecutive color components of RGB video data (each component being a 12-bit Red component, 12-bit Green component, or 12-bit Blue component) are packed into a three-fragment group (each fragment consisting of 8 bits, so that 8 bits per fragment*3 fragments per group=24 bits per group). Such packing does not waste any bandwidth.

We next describe in more detail the manner in which a class of embodiments of the inventive transmitter pack video data into groups of 8-bit fragments, for TMDS encoding and transmission over a conventional TMDS link.

While DE=1 (during an active video interval) during 8-bit mode operation of a transmitter in such class, each transmitted TMDS code word communicates 8 bits of video data per link clock cycle. While DE=1 during N-bit mode operation (for N>8) of typical embodiments of the inventive transmitter, N-bit video words are packed into groups of bits (each group consisting of G video words) and each group is sliced into F data fragments (each fragment consisting of 8 bits). The fragments can be asserted to conventional TMDS encoder/serializer circuitry (e.g., encoder/serializer circuitry 108 of FIG. 7) and 10-bit TMDS code words output from the TMDS encoder/serializer circuitry in response to the fragments transmitted over a serial link using a link clock having appropriate frequency. The values of the color depth parameter "N" (sometimes referred to as "color depth"), and the parameters G and F, are related as shown in Table 1 during N-bit mode operation:

TABLE 1

| Color Depth | G words/group | F fragments/group |
|---|---|---|
| 8 | 1 | 1 |
| 10 | 4 | 5 |
| 12 | 2 | 3 |
| 16 | 1 | 2 |

In typical embodiments, the inventive transmitter transmits the link clock and encoded fragments, and also transmits special control codes (including packing phase data indicative of phase of the most recently transmitted fragment, and optionally also color mode data indicative of the transmitter's current color depth mode). Typically, the inventive receiver includes standard TMDS deserializer/decoder circuitry and is configured to recover the special control codes, link clock, and 8-bit fragments transmitted over a TMDS link. Based on the current color depth and group phase, the receiver accumulates the 8-bit fragments into groups, which are then unpacked to recover the original deep color (N-bit) video words.

For each color depth mode of preferred embodiments of the invention, the appropriate one of Tables 2, 3, 4, and 5 specifies the group size and order in which the transmitter presents 8-bit fragments to each of the three data channels of a standard TMDS encoder. The receiver performs the reverse process. The left column of each of Tables 2-5 identifies the fragment(s) of a group and the other columns identify the 8 bits of each fragment. Each row ("mPn") represents the "n"th fragment (0≦n≦(F-1)) for each F-fragment group for color depth m (note that color depth "m" is alternative notation for the above-mentioned color depth parameter "N"). The rows of each of Tables 2-5 are arranged in order of transmission (so that the top row represents the first fragment of a group to be transmitted and the bottom row represents the last fragment of the group to be transmitted. Each entry "Xy" in each table indicates bit y of video word X that is presented to the encoder. Bit 0 is the least significant bit. The m-bit video words are labeled A, B, C, D (as needed) to identify the "G" members of each group (e.g., the group for color depth m=10 has four members A, B, C, and D). Word A is the first-transmitted word of each group.

TABLE 2

(8-bit mode)
(G = 1; F = 1)

| Fragment | Bit 0 | Bit 1 | Bit 2 | Bit 3 | Bit 4 | Bit 5 | Bit 6 | Bit 7 |
|---|---|---|---|---|---|---|---|---|
| 8P0 | A0 | A1 | A2 | A3 | A4 | A5 | A6 | A7 |

TABLE 3

(10-bit mode)
(G = 4; F = 5)

| Fragment | Bit 0 | Bit 1 | Bit 2 | Bit 3 | Bit 4 | Bit 5 | Bit 6 | Bit 7 |
|---|---|---|---|---|---|---|---|---|
| 10P0 | A0 | A1 | A2 | A3 | A4 | A5 | A6 | A7 |
| 10P1 | A8 | A9 | B0 | B1 | B2 | B3 | B4 | B5 |
| 10P2 | B6 | B7 | B8 | B9 | C0 | C1 | C2 | C3 |
| 10P3 | C4 | C5 | C6 | C7 | C8 | C9 | D0 | D1 |
| 10P4 | D2 | D3 | D4 | D5 | D6 | D7 | D8 | D9 |

TABLE 4

(12-bit mode)
(G = 2; F = 3)

| Fragment | Bit 0 | Bit 1 | Bit 2 | Bit 3 | Bit 4 | Bit 5 | Bit 6 | Bit 7 |
|---|---|---|---|---|---|---|---|---|
| 12P0 | A0 | A1 | A2 | A3 | A4 | A5 | A6 | A7 |
| 12P1 | A8 | A9 | A10 | A11 | B0 | B1 | B2 | B3 |
| 12P2 | B4 | B5 | B6 | B7 | B8 | B9 | B10 | B11 |

TABLE 5

(16-bit mode)
(G = 1; F = 2)

| Fragment | Bit 0 | Bit 1 | Bit 2 | Bit 3 | Bit 4 | Bit 5 | Bit 6 | Bit 7 |
|---|---|---|---|---|---|---|---|---|
| 16P0 | A0 | A1 | A2 | A3 | A4 | A5 | A6 | A7 |
| 16P1 | A8 | A9 | A10 | A11 | A12 | A13 | A14 | A15 |

During the blanking intervals (when pixels are not being packed and transmitted), the inventive transmitter can occasionally transmit a short message containing packing phase data (indicative of phase of the most recently transmitted fragment) in order to enable the receiver to align its unpacking sequence with the transmitter's packing sequence. The inventive transmitter can also use the same or additional messages during blanking intervals to send color depth mode data to ensure that the receiver operates in the same color depth as the transmitter, so that the receiver uses the unpacking sequence that corresponds to the transmitter packing sequence.

During a blanking interval (indicated by DE=0), a conventional DVI-compliant transmitter transmits TMDS control code words instead of TMDS pixel data code words. These TMDS control codes are sent once per link clock cycle and are indicative of two control bits (C0, C1) over each of the three data channels of a TMDS link, for a total of six bits of control information per link cycle. DVI-compliant transmitters use two of these six bits for horizontal and vertical sync information (HS, VS) and transmit code words indicative of this sync information over one data channel (Channel 0), and reserve the other four bits (CTL0, CTL1, CTL2, CTL3). A DVI-compliant embodiment of the inventive transmitter must use the standard (10-bit) TMDS control codes, so that a standard DVI-compliant receiver can accomplish proper framing.

In accordance with the invention, during N-bit mode operation (for any value of N, including N=8) of a class of DVI-like embodiments, some or all of such bits CTL0, CTL1, CTL2, and CTL3 (indicated by code words transmitted over data Channels 1 and 2 of a TMDS link) can be used at certain times during blanking to encode short link control messages ("LCMs", to be described in more detail later in this description) to send packing phase data (indicative of phase of the most recently transmitted fragment) and optionally also color mode data (indicative of the transmitter's current color depth mode).

In other embodiments of the invention, packing phase data and/or color mode data are transmitted over a serial link during video blanking in any of a variety of other ways. For example, during portions of blanking intervals known as data islands, HDMI-compliant embodiments of the inventive transmitter can transmit packets including encoded auxiliary (e.g., audio) data, other data, and control bits over some or all of the three data channels of a TMDS link. In accordance with the invention, some such packets can include packing phase data and/or color mode data. An HDMI-compliant transmitter and receiver can distinguish between three portions of each blanking interval (between active video intervals): an initial portion (in which a data island preamble can be transmitted) followed by portion known as a data island followed by a final portion (in which a video preamble can be transmitted). Optionally, there are two or more data islands in a blanking interval. During the initial data island preamble of each blanking interval, repetitions of code words indicative of specific patterns of control bits CTL3, CTL2, CTL1, and CTL0, and optionally also initial bit patterns are transmitted. During the video preamble of each blanking interval, repetitions of code words indicative of other specific patterns of control bits CTL3, CTL2, CTL1, and CTL0, and optionally also initial bit patterns are transmitted.

In the description of preferred embodiments (which can but need not be DVI-compliant), the terminology of DVI is used herein. In accordance with DVI terminology, DE=0 indicates a blanking period and DE=1 indicates an active video period in which pixels are transmitted. In FIGS. 3 through 6 (the packing and unpacking state diagrams), "DE=1" is used indicate that the next character to be transmitted is a pixel and "DE=0" is used to indicate that the next character is a blanking character.

For each of several color depths, Tables 6-10 (set forth below) specify the group size and the order in which typical embodiments (which can be DVI-compliant embodiments) of the inventive transmitter present horizontal and vertical sync codes to the TMDS encoder for Channel 0 of a TMDS link (e.g., the bit in the C0 column of each row of each Table is HSYNC in DVI-compliant embodiments, and the bit in the C1 column of each row of each Table is VSYNC in DVI-compliant embodiments). Just like pixels, blanking (sync) codes are typically communicated to the inventive transmitter at the pixel rate P.

For deep color depths (N>8), the link clock is faster than the source pixel clock P. In order to carry the deeper color data, the link clock is set to (N/8)*P. For the cases shown, the number of link clock cycles per group (of packed K-bit fragments of N-bit video data) is one more than the number of pixel clock cycles (F-1) per group.

During blanking intervals of N-bit mode operation, one blanking code indicative of a new sync bit pair (one HSYNC bit and one VSYNC bit) could be transmitted every link clock cycle (unlike deep color pixels, which require an extra link clock per group). Despite this, in order to maintain a fixed ratio (N/8) of pixel clock cycles to link clock cycles, the transmitter only sends (F-1) new sync bit pairs per group of F link clock cycles.

Thus, Tables 7, 9, and 10 indicate that in blanking intervals during N-bit mode operation, when an F-fragment group is composed entirely of blanking characters, the inventive transmitter transmits a group of F blanking codes (labeled "mCn", where n=0 to F-1) during F consecutive link clock cycles, where each of F-1 of the blanking codes is indicative of a new sync bit pair and the last blanking code transmitted in the group is indicative of the same sync bit pair as the previous code (states 10C4, 12C2 and 16C1 in Tables 7, 9 and 10 and FIGS. 4, 5 and 6). The receiver drops the last (repeated) blanking code of each such period of F link clock cycles. As a result, sync bit pairs are recovered at their original (pixel clock) rate.

When transitioning into or out of a blanking period, F-fragment groups (states n=0 to F-1) carrying a mixture of pixel fragments (labeled "mPn" in Tables 3-5) and blanking codes (labeled "mCn" or "mPCn" in Tables 7-10) may occur. In such cases, the extra link clock cycle is always used for pixel packing, regardless of whether the group starts or ends with pixel fragments.

Examples of mixed pixel/blanking groups for 10 bit mode include the following sequences (visible in FIG. 4):

10P0, 10P1*, 10PC2, 10PC3, 10PC4 (pixel A; blanking T, U, V),

10P0, 10P1, 10P2*, 10PC3, 10PC4 (pixels A, B; blanking U, V),

10P0, 10P1, 10P2, 10P3*, 10PC4 (pixels A, B, C; blanking V);

10C0, 10P1*, 0P2, 10P3, 10P4 (blanking S; pixels B, C, D),

10C0, 10C1, 10P2*, 10P3, 10P4 (blanking S, T; pixels C, D),

10C0, 10C1, 10C2, 10P3*, 10P4 (blanking S, T, U; pixel D);

where * indicates that only part of the pixel fragment contains useful information. For example, in the first sequence, fragment 10P1* contains the remaining 2 bits of pixel A and 6 unused bits that would have started pixel B had the switch to blanking (DE=0) not occurred.

Similar examples for 12 bit mode include:

12P0, 12P1*, 12C2 (one pixel, one blanking) and

12C0, 12P1*, 12P2 (one blanking, one pixel).

Each entry "mCn" (or "mPCn") in the left column of Table 6, 7, 8, 9, and 10 represents a state of the inventive transmitter, where the index "n" is in the range 0≦n≦(F-1), where F is the number of fragments of video data per group, and the index "m" indicates the color depth (note that color depth "m" is alternative notation for the above-mentioned color depth parameter "N"). Each entry "Xy" in each of the middle and right columns of each table indicates bit y of a sync bit pair X to be encoded. Each sync bit pair X presented to the encoder of the inventive transmitter is encoded as a TMDS code word that is transmitted over channel CH0 of a TMDS link by the transmitter. (Bit 0 is the least significant bit of the sync bit pair X (e.g., bit "S0" is less significant than bit "S1").

TABLE 6

(8-bit mode)
(G = 1; F = 1)

| | Sync bit pair (to encoder) | |
|---|---|---|
| State | C0 | C1 |
| 8C0 | S0 | S1 |

TABLE 7

(10-bit mode)
(G = 4; F = 5)
(Table 7 is used if a packing group starts with a blanking character)

| | Sync bit pair (to encoder) | |
|---|---|---|
| State | C0 | C1 |
| 10C0 | S0 | S1 |
| 10C1 | T0 | T1 |
| 10C2 | U0 | U1 |
| 10C3 | V0 | V1 |
| 10C4 | V0 | V1 |

TABLE 8

(10-bit mode)
(G = 4; F = 5)
(Table 8 is used if a packing group starts with a pixel and ends with a blanking character)
(Bridge states for transition from fragment 10Pn to 10C0)

| | Sync bit pair (to encoder) | |
|---|---|---|
| State | C0 | C1 |
| 10PC2 | T0 | T1 |
| 10PC3 | U0 | U1 |
| 10PC4 | V0 | V1 |

TABLE 9

(12-bit mode)
(G = 2; F = 3)

| | Sync bit pair (to encoder) | |
|---|---|---|
| State | C0 | C1 |
| 12C0 | S0 | S1 |
| 12C1 | T0 | T1 |
| 12C2 | T0 | T1 |

TABLE 10

(16-bit mode)
(G = 1; F = 2)

| | Sync bit pair (to encoder) | |
|---|---|---|
| State | C0 | C1 |
| 16C0 | S0 | S1 |
| 16C1 | S0 | S1 |

Table 8 indicates the bridge states ("mPCn") necessary in the 10-bit mode for encoding the blanking portion of mixed groups that transition from fragments of video data (during an active video interval) to sync bits (during a blanking interval). Such bridge states are required to maintain the fixed pixel clock to link clock ratio when the packing group size G is greater than 2.

Typically, the transmitter operates in response to a DE signal whose rising and falling edges are aligned with edges of the pixel clock, and the transmitter includes a FIFO (e.g., FIFO 101 of FIG. 7) that buffers the video data to be packed and encoded, control bits (including sync bits) to be encoded, and a bit indicative of the DE signal. The video, control, and DE bits are clocked into the FIFO using the pixel clock and clocked out of the FIFO using the link clock (e.g., so that packing circuitry operating in the link clock domain can pack groups of bits of the video data into fragments in accordance with the invention).

As indicated in FIG. 4 (to be described below), in response to a falling edge (in the link clock domain) of the DE signal, the following encoded sync bits can be transmitted (by transmitter circuitry operating in the link clock domain).

When DE changes to 0 just after the link clock cycle in which the second fragment of a group (10P1) is presented to the encoder (completing the first and only pixel in a group of one pixel and three sync bit pairs), the second fragment is encoded and transmitted and then one link clock later (state 10PC2 in FIG. 4 and Table 8) sync bits T0, T1 are presented to the encoder, encoded and transmitted (during the blanking interval commencing on such falling edge of DE).

When DE changes to 0 just after the link clock cycle in which the third fragment of a group (10P2) is presented to the encoder (completing the second pixel in a group of two pixels and two sync bit pairs), the third fragment is encoded and transmitted and then one link clock later (10PC3) sync bits U0, U1 are presented to the encoder, encoded and transmitted (during the blanking interval commencing on such falling edge of DE).

When DE changes to 0 just after the link clock cycle in which the fourth fragment of a group (10P3) is presented to the encoder (completing the third pixel in a group of three pixels and one sync bit pair), the fourth fragment is encoded and transmitted and then one link clock later (10PC4) sync bits V0, V1 are presented to the encoder, encoded and transmitted (during the blanking interval commencing on such falling edge of DE).

When DE changes to 0 just after the link clock cycle in which the final fragment of a group (10P4) is presented to the encoder (i.e., when the pixel to blanking transition happens to occur at a group boundary), the fifth fragment of the pixel group is encoded and transmitted and then one link clock later (10C0) sync bits S0, S1 (shown in the first row of Table 7) are then presented to the encoder, encoded and transmitted (during the blanking interval commencing on such falling edge of DE).

With reference to FIGS. 3-6, we next describe operation of typical embodiments of the inventive transmitter that enter the states shown in Tables 6-10 and pack video bits into groups of the type shown in Tables 2-5. For each color depth mode, the transmitter sequence starts at phase 0, and then increments modulo the group size (which is the number, F, of fragments per group) through the phases for each group of fragments. While DE=1, code words indicative of fragments mPn of video data are transmitted. In response to a falling edge of DE, the transmitter enters one of states mCn or mPCn and (while DE=0) cycles through other ones of states mCn or mPCn. For example, in the 10-bit mode, if DE changes from 1 to 0 when phase n is not changing to 0 (when the falling edge of DE is not group aligned), the transmitter enters at least one of states mPCn (of Table 8) and proceeds through the mPCn states until leaving 10PC4 and entering the loop of mCn states (of Table 7). If DE is restricted (as it is in preferred embodiments) such that the minimum duration of a blanking interval is four blanking characters, the minimum total number of states mPCn and/or mCn entered during a blanking interval is four.

FIG. 3 is a state diagram of 8-bit mode operation of a class of embodiments of the inventive transmitter that are configured to transmit data over a TMDS link and to enter the state shown in Table 6 in blanking intervals. During 8-bit operation, the link clock rate matches the pixel clock rate. During each active video interval (when DE=1), the transmitter transmits a code word indicative of an 8-bit video word (word "8P0" of Table 2) over each of data channels CH0, CH1, and CH2 once per link clock cycle. During each link clock cycle of each blanking interval, the transmitter remains in state "8C0" (in which it transmits encoded sync bits S0, S1 of Table 6 over data channel CH0). In response to a falling edge of DE, the transmitter's state machine asserts a pair of sync bits S0,S1 (shown in Table 6) to the transmitter's channel CH0 encoder (which can be an element of a conventional TMDS encoder) rather than 8-bits of video data. In response to each rising edge of DE, the transmitter asserts a sequence of 8-bit video data words 8P0 (one video data word per link clock cycle) to the channel CH0 encoder.

A transmitter that implements the state diagram of FIG. 4 (or FIG. 5 or FIG. 6) typically includes a FIFO that buffers the video data to be packed and encoded, control bits to be encoded, and a DE bit. The video, control, and DE bits are clocked into the FIFO using a pixel clock and clocked out of the FIFO using a link clock (having higher rate than the pixel clock).

For packing modes with pixel group size G greater than 2 (such as 10 bit mode, FIG. 4), G-1 bridge states ("mPCn") are necessary to handle groups that begin with pixels and end with blanking. Once these bridge states have been entered (start of blanking), the balance of that group must contain blanking characters. This leads to a requirement that for packing modes with G>2, the minimum blanking period (DE=0) is G-1 blanking characters (e.g., minimum blanking of 3 characters for 10 bit mode). This minimum can be achieved by adding a test for DE in the final PC state (e.g., 10PC4 in FIG. 4) and branching to the first pixel state (mP0) if DE=1 or the first blanking state (mC0) if DE=0. As drawn, FIG. 4 omits this extra test for DE for simplicity; in that case, DE is preferably restricted so that DE can be low for not less than 4 consecutive link clock cycles (i.e., so that the minimum duration of each blanking interval is four sync bit pairs). This minor restriction on DE is needed to ensure that the transmitter can be implemented in a simple manner and also be capable (during 10-bit mode operation, as indicated in FIG. 4) of resuming transmission of video data (in response to a rising edge of DE) with correct phase in the event that the previous falling edge of DE was not aligned to a group boundary, and to ensure that the receiver can be implemented in a simple manner and also be capable of recovering the transmitted video with correct phase during 10-bit mode operation.

FIG. 4 is a state diagram of 10-bit mode operation of typical embodiments of the inventive transmitter that are configured to transmit data over a TMDS link, pack video bits into groups of the type shown in Table 3, and to enter states shown in Tables 7 and 8 during blanking intervals. During the 10-bit mode of these embodiments, the link clock rate is the pixel clock rate multiplied by 1.25 (e.g., by PLL 106 of FIG. 7). Typically, the transmitter includes a FIFO and receives a DE signal, a pixel clock, video data, and control bits from a source, the DE signal's rising and falling edges are aligned with edges of the pixel clock, and the video data and control bits are clocked into the FIFO using the pixel clock and clocked out of the FIFO using the link clock. Packing and encoding of the video data are performed in the link clock domain.

The transmitter is implemented with a state machine for implementing the state diagram of FIG. 4. The state machine ensures that the transmitter's circuitry for encoding and transmitting fragments of video data and control bit (e.g., sync bit) pairs (referred to as the transmitter's "encoder") operates as follows.

During sustained active video intervals (while DE=1), the transmitter transmits (over each of data channels CH0, CH1, and CH2) a repeating sequence of code words indicative of the following fragments of video data: 10P0, 10P1, 10P2, 10P3, and 10P4. This sequence packs groups of 4 pixels into 5 link clock cycles.

In response to a falling edge of DE (in the link clock domain) that occurs in the link clock cycle just after the second (8-bit) fragment of a group is presented to the encoder, the transmitter enters the following sequence of states: a first state in which it transmits code word indicative of video data fragment 10P1 (an encoded second fragment) over each of data channels CH0, CH1, and CH2; then (in the next link clock cycle) a state "10PC2" in which the transmitter does not transmit encoded video data and instead transmits an encoded sync bit pair T0,T1 over data channel CH0; then (in the next link clock cycle) a state "10PC3" in which the transmitter transmits an encoded sync bit pair U0,U1 over data channel CH0; then (in the next link clock cycle) a state "10PC4" in which the transmitter transmits an encoded sync bit pair V0,V1 over data channel CH0; and then (in the next link clock cycle) a state "10C0" in which the transmitter transmits an encoded sync bit pair S0,S1 over data channel CH0. DE must remain low during transition states 10PC2, 10PC3, 10PC4 and the first instance of blanking state 10C0, leading to the previously mentioned minimum requirement of 4 sync bit pairs of blanking for the design of FIG. 4 (note that if a DE=1 arc is added from state 10PC4 to state 10P0, the absolute minimum of 3 blanking codes would be achieved).

Typically, DE remains low for many more cycles. During subsequent link clock cycles in which DE remains low, the transmitter enters a repeating sequence of states "10C0," "10C1," "10C2," "10C3," and "10C4." At any point in this sequence (after the minimum has been satisfied), if DE rises after state 10Cn, the next state will be as follows:

If DE rises after 10C0 (blanking code S), 10C0 will be followed by 10P1 (start of pixel B; note that the spare bits from pixel A are not used);

If DE rises after 10C1 (blanking code T), 10C1 will be followed by 10P2 (start of pixel C; note that the spare bits from pixel B are not used);

If DE rises after 10C2 (blanking code U), 10C2 will be followed by 10P3 (start of pixel D; note that the spare bits from pixel C are not used)

If DE rises after 10C3 (blanking code V), 10C3 will be followed by 10C4 (a repetition of blanking code V), which is then followed by 10P0 (start of pixel A). The transmitter's repetition of blanking code V maintains the fixed ratio (1.25) of link clock to pixel clock. The receiver is implemented to discard (drop) the repetition of the blanking code V, so that the recovered data is at the pixel clock rate.

Still with reference to FIG. 4, in response to a falling edge of DE (in the link clock domain) that occurs in the link clock cycle just after the third (8-bit) fragment of a group is presented to the encoder, the transmitter enters the following sequence of states: a first state in which it transmits code word indicative of video data fragment 10P2 (an encoded third fragment) over each of data channels CH0, CH1, and CH2; then (in the next link clock cycle), a state "10PC3" in which the transmitter transmits an encoded sync bit pair U0,U1 over data channel CH0; then (in the next link clock cycle) a state "10PC4" in which the transmitter transmits an encoded sync bit pair V0,V1 over data channel CH0; and then (in the next link clock cycle) a state "10C0" in which the transmitter transmits an encoded sync bit pair S0,S1 over data channel CH0. DE must remain low during transition states 10PC3, 10PC4 and the first instance of blanking state 10C0 for the design of FIG. 4.

DE remains typically low for many more cycles and the transmitter enters a repeating sequence of states "10C0," "10C1," "10C2," "10C3, " and "10C4" which ends whenever DE becomes high, as described above.

Similarly (still with reference to FIG. 4), in response to a falling edge of DE (in the link clock domain) that occurs in the link clock cycle just after the fourth (8-bit) fragment of a group is presented to the encoder, the transmitter enters the following sequence of states: a first state in which it transmits code word indicative of video data fragment 10P3 (an encoded fourth fragment) over each of data channels CH0, CH1, and CH2; then (in the next link clock cycle) a state "10PC4" in which the transmitter transmits an encoded sync bit pair V0,V1 over data channel CH0; and then (in the next link clock cycle) a state "10C0" in which the transmitter transmits an encoded sync bit pair S0,S1 over data channel CH0. DE must remain low during transition state 10PC4 and the first instance of blanking state 10C0 for the design of FIG. 4. Again, the transmitter enters a repeating sequence of states "10C0," "10C1," "10C2," "10C3," and "10C4" which ends whenever DE becomes high, as described above.

Similarly (still with reference to FIG. 4), in response to a falling edge of DE (in the link clock domain) that occurs in the link clock cycle just after the fifth (8-bit) fragment of a group is presented to the encoder, the transmitter enters the following sequence of states: a first state in which it transmits code word indicative of video data fragment 10P4 (an encoded fifth fragment) over each of data channels CH0, CH1, and CH2; and then (in the next link clock cycle) a state "10C0" in which the transmitter transmits an encoded sync bit pair S0,S1 over data channel CH0. Again, the transmitter enters a repeating sequence of states "10C0," "10C1," "10C2," "10C3," and "10C4" which ends whenever DE becomes high, as described above.

The state diagram of FIG. 4 defines group sequences of five states 10x0 through 10x4 (where "x" may be P or C, or PC). Note that for each five state sequence, the progression is always 10x0, 10x1, 10x2, 10x3, 10x4, where the suffixes 0 through 4 represent the group "phase". The following groups are possible:

10P0, 10P1, 10P2, 10P3, 10P4 (four pixels),
10P0, 10P1, 10P2, 10P3, 10PC4 (three pixels; one blanking code),
10P0, 10P1, 10P2, 10PC3, 10PC4 (two pixels; two blanking),
10P0, 10P1, 10PC2, 10PC3, 10PC4 (one pixel; three blanking),
10C0, 10C1, 10C2, 10C3, 10C4 (four blanking and a repetition),
10C0, 10C1, 10C2, 10P3, 10P4 (three blanking and one pixel),
10C0, 10C1, 10P2, 10P3, 10P4 (two blanking and two pixels), and
10C0, 10P1, 10P2, 10P3, 10P4 (one blanking and three pixels).

An exemplary sequence of groups of states entered (and video data and sync bit pairs asserted to the encoder) follows for the artificially abbreviated example of a video format that has 5 pixels and 4 blanking codes per line (using the notation that commas separate fragments; A indicates two video bits from a first fragment of a video data group; B indicates two video bits from a second fragment of the video data group; C indicates two video bits from a third fragment of the video data group; D indicates two video bits from a fourth fragment of the video data group; and S, T, U, and V are sync bit pairs):

first group (which carries four pixels from the first line): AAAA, ABBB, BBCC, CCCD, DDDD (i.e., states 10P0, 10P1, 10P2, 10P3, 10P4);

second group (which carries the last pixel and the first three blanking characters from the first line): AAAA, A---, T, U, V (i.e., states 10P0, 10P1, 10PC2, 10PC3, 10PC4);

third group (which carries the final blanking character of the first line and the first three pixels of the second line): S, -BBB, BBCC, CCCD, DDDD (i.e., states 10C0, 10P1, 10P2, 10P3, and 10P4);

fourth group (which carries the last two pixels and the first two blanking characters of the second line): AAAA, ABBB, BB--, U, V (states 10P0, 10P1, 10P2, 10PC3, 10PC4);

fifth group (which carries the last two blanking characters of the second line and the first two pixels of the third line): S, T, --CC, CCCD, DDDD (i.e., states 10C0, 10C1, 10P2, 10P3, 10P4);

sixth group (which carries the last three pixels and the first blanking character of the third line): AAAA, ABBB, BBCC, CCC-, V (i.e., states 10P0, 10P1, 10P2, 10P3, 10PC4);

seventh group (which carries the last three blanking characters of the third line and the first pixel of the fourth line): S, T, U, ---D, DDDD (i.e., states 10C0, 10C1, 10C2, 10P3, 10P4);

eighth group (which carries the last four pixels of the fourth line): AAAA, ABBB, BBCC, CCCD, DDDD (i.e., states 10P0, 10P1, 10P2, 10P3, 10P4); and ninth group (which carries the four blanking characters of the fourth line along with a repetition of the last blanking character to maintain the fixed 1.25 link to pixel clock ratio): S, T, U, V, (V) (i.e., states 10C0, 10C1, 10C2, 10C3, 10C4).

Note that this sequence of nine groups will repeat every four lines (the ninth group is followed by another first group). Each group carries a total of 4 pixel clock cycles of data (either pixels or blanking characters) in 5 link clock cycles. Nine groups can carry 36 data characters, which is sufficient for four lines of 9 data characters (5 pixels and 4 blanking characters). Also note that, in general, lines end or start in mid-group, except at the point where the pattern repeats. If the total count (pixels plus blanking characters) per line is X, the pattern will repeat every 4 lines if X mod 4 is 1 or 3, every 2 lines if X mod 4 is 2, or every line if X mod 4=0, where 4 is the group size in pixel clock cycles for the 10-bit color mode (T=5+4=9 for this case, so the pattern repeats every fourth line.)

FIG. 5 is a state diagram of 12-bit mode operation of typical embodiments of the inventive transmitter that pack video bits into groups of the type shown in Table 4, and enter the states shown in Table 9 during blanking intervals. During the 12-bit mode of these embodiments, the link clock rate exceeds the pixel clock rate (the link clock rate is the pixel clock rate multiplied by 1.5). Typically, the transmitter includes a FIFO and receives a DE signal, a pixel clock, video data, and control bits from a source, the DE signal's rising and falling edges are aligned with edges of the pixel clock, and the video data and control bits are clocked into the FIFO using the pixel clock and clocked out of the FIFO using the link clock.

Packing and encoding of the video data are performed in the link clock domain.

The transmitter is implemented with a state machine for implementing the state diagram of FIG. 5. The state machine ensures that the transmitter's circuitry for encoding and transmitting fragments of video data and control bit (e.g., sync bit) pairs (referred to as the transmitter's "encoder) operates as follows.

During active video intervals (while DE=1), the transmitter transmits (over each of data channels CH0, CH1, and CH2) a repeating sequence of code words indicative of the following fragments of video data: 12P0, 12P1, and 12P3. This sequence packs groups of 2 pixels into 3 link clock cycles.

In response to a falling edge of DE (in the link clock domain) that occurs in the link clock cycle just after the second (8-bit) fragment of a group is presented to the encoder, the transmitter enters the following sequence of states: a first state in which it transmits a code word indicative of video data fragment 12P1 (an encoded second fragment) over each of data channels CH0, CH1, and CH2; then (in the next link clock cycle) a state "12C2" in which the transmitter does not transmit encoded video data and instead transmits an encoded sync bit pair T0,T1 over data channel CH0; and then (in the next link clock cycle) a state "12C0" in which the transmitter transmits an encoded sync bit pair S0,S1 over data channel CH0. During subsequent link clock cycles in which DE remains low, the transmitter enters a repeating sequence of states "12C0," "12C1," and "12C2." At any point in this sequence (after the minimum has been satisfied), if DE rises after state 12Cn, the next state will be as follows:

If DE rises after 12C0 (blanking code S), 12C0 will be followed by 12P1 (start of pixel B; note that the spare bits from pixel A are not used); and If DE rises after 12C1 (blanking code T), 12C1 will be followed by 12C2 (a repetition of blanking code T), which is then followed by 12P0 (start of pixel A). The transmitter's repetition of blanking code T maintains the fixed ratio (1.5) of link clock cycles to pixel clock cycles. The receiver is implemented to discard (drop) the repetition of the blanking code T, so that the recovered data is at the pixel clock rate.

Similarly, in response to a falling edge of DE (in the link clock domain) that occurs in the link clock cycle just after the third fragment of a group is presented to the encoder, the transmitter enters the following sequence of states: a first state in which it transmits a code word indicative of video data fragment 12P2 (an encoded third fragment) over each of data channels CH0, CH1, and CH2; then (in the next link clock cycle) a state "12C0" (in which the transmitter does not transmit encoded video data and instead transmits an encoded sync bit pair S0,S1. During subsequent link clock cycles in which DE remains low, the transmitter enters a repeating sequence of states "12C0," "12C1," and "12C2," which ends whenever DE becomes high, as described above.

The state diagram of FIG. 5 defines group sequences of three states 12x0 through 12x2 (where "x" may be P or C). Note that for each three state sequence, the progression is always 12x0, 12x1, 12x2, where the suffixes 0 through 2 represent the group "phase". The following groups are possible:

12P0, 12P1, 12P2 (two pixels),
12P0, 12P1, 12C2 (one pixel; one blanking character),
12C0, 12C1, 12C2 (two blanking and a repetition), and
12C0, 12P1, 10P2 (one blanking and one pixel).

An exemplary sequence of groups of states entered (and video data and sync bit pairs asserted to the encoder) follows for the artificially abbreviated example of a video format that has 5 pixels and 2 blanking codes per line (using the notation that commas separate fragments; A indicates four video bits from a first fragment of a video data group; B indicates four video bits from a second fragment of the video data group; and S and T are sync bit pairs):

first group (which carries the first two pixels from the first line): AA, AB, BB (states 12P0, 12P1, 12P2);

second group (which carries the next two pixels from the first line): AA, AB, BB (12P0, 12P1, 12P2);

third group (which carries the last pixel and the first blanking character from the first line): AA, A-, T (states 12P0, 12P1, and 12C2);

fourth group (which carries the last blanking character from the first line and the first pixel from the second line): S,-B, BB (states 12C0, 12P1, and 12P2);

fifth group (which carries the next two pixels from the second line): AA, AB, BB (states 12P0, 12P1, 12P2);

sixth group (which carries the last two pixels from the second line): AA, AB, BB (states 12P0, 12P1, 12P2); and seventh group (carries the two blanking characters from the second line along with a repetition of the last blanking character to maintain the fixed 1.5 link to pixel clock cycle ratio): S, T, (T) (states 12C0, 12C1, 12C2).

Note that this sequence of seven groups will repeat every two lines (the seventh group is followed by another first group). Each group carries a total of 2 pixel clock cycles of data (either pixels or blanking characters) in 3 link clocks cycles. Seven groups can carry 14 data characters, which is sufficient for 2 lines of 7 data (5 pixels and 2 blanking characters). Also note that, in general, lines end or start in mid-group, except at the point where the pattern repeats. If the total count (pixels plus blanking characters) per line is X, the pattern will repeat every other line if X mod 2 is 1, or every line if X mod 2=0, where 2 is the group size in pixel clocks for 12 bit color mode. (T=5+2=7 for this case, so the pattern repeats every other line.)

FIG. 6 is a state diagram of 16-bit mode operation of typical embodiments of the inventive transmitter that pack video bits into groups of the type shown in Table 5, and enters the states shown in Table 10 in blanking intervals. FIG. 6 assumes that the link clock rate is twice the pixel clock rate, and that DE can change only at the pixel clock rate. As indicated in FIG. 6, during each active video interval (when DE=1), the transmitter transmits a code word indicative of 8-bits of a 16-bit video word (code word "16P0" of Table 5) followed by a code word indicative of the other 8-bits of the video word (code word "16P1" of Table 5), and then repeats this operation to transmit code words indicative of the next video word, during consecutive link clock cycles. During each blanking interval (when DE=0), the transmitter enters state "16C0" (in which an encoded sync bit pair S0, S1 is transmitted) and then state "16C1" (in which the same encoded sync bit pair S0, S1 is again transmitted), and then repeats this operation, during consecutive link clock cycles. In response to a falling edge of DE, the transmitter enters state 16C0 and asserts a pair of sync bits S0,S1 (shown in Table 10) to the channel CH0 encoder (which is an element of a conventional TMDS encoder in some embodiments) rather than 8-bits of video data. In response to the next rising edge of DE, the transmitter asserts a sequence of 8-bit video data words (one video data word per link clock cycle) to the encoder.

To implement any of the state diagrams of FIGS. 4-6 (or state diagrams for N-bit mode operation in accordance with other embodiments of the invention), the invention imposes no significant timing restrictions on the duration of active video intervals, horizontal blanking intervals, or horizontal line intervals (each consisting of a horizontal line of video and a horizontal blanking interval), measured in units of pixel clock cycles. None of these intervals is required to have a duration that is an exact multiple of the video data group size. The only restriction in some embodiments is that the minimum duration of a blanking interval (in units of link clock cycles) must be greater than the number of active video to blanking transition states. In general, for packing modes with pixel group size G greater than 2 (such as the 10 bit-mode of FIG. 4), G-1 transition states ("mPCn") are necessary to handle groups that begin with pixels and end with blanking characters. Once these transition states have been entered (at the start of blanking), the balance of that group must contain blanking characters. This leads to a requirement that for packing modes with G>2, the minimum blanking period (in which DE=0) is G-1 blanking characters (e.g., the minimum blanking is three blanking characters for the 10-bit mode). For the 8-bit, 12-bit and 16-bit state machines described with reference to FIGS. 3, 5, and 6, this minimum duration is zero link clock cycles (there is no restriction). For the 10-bit state machine described with reference to FIG. 4, the minimum blanking interval duration is four link clock cycles (to allow cycling through the states 10PC2, 10PC3, 10PC4, and 10C0). Those of ordinary skill in the art will recognize that a modification of the FIG. 4 state diagram can reduce this minimum blanking interval duration to three link clock cycles by adding an extra arc out of the state labeled "10PC4." A requirement for a minimum blanking interval duration of four link clock cycles is not a significant obstacle to or limitation on implementing 10-bit mode operation in accordance with the invention because all commonly used conventional video timings have much larger minimum blanking counts. Similarly, the requirement in some embodiments for a minimum blanking interval duration of 16 pixel clock cycles (for the purpose of sending link control messages, as set forth in the following paragraphs) is not a significant obstacle to or limitation on implementing the invention because commonly used video timings have much longer blanking periods.

Figure 1:
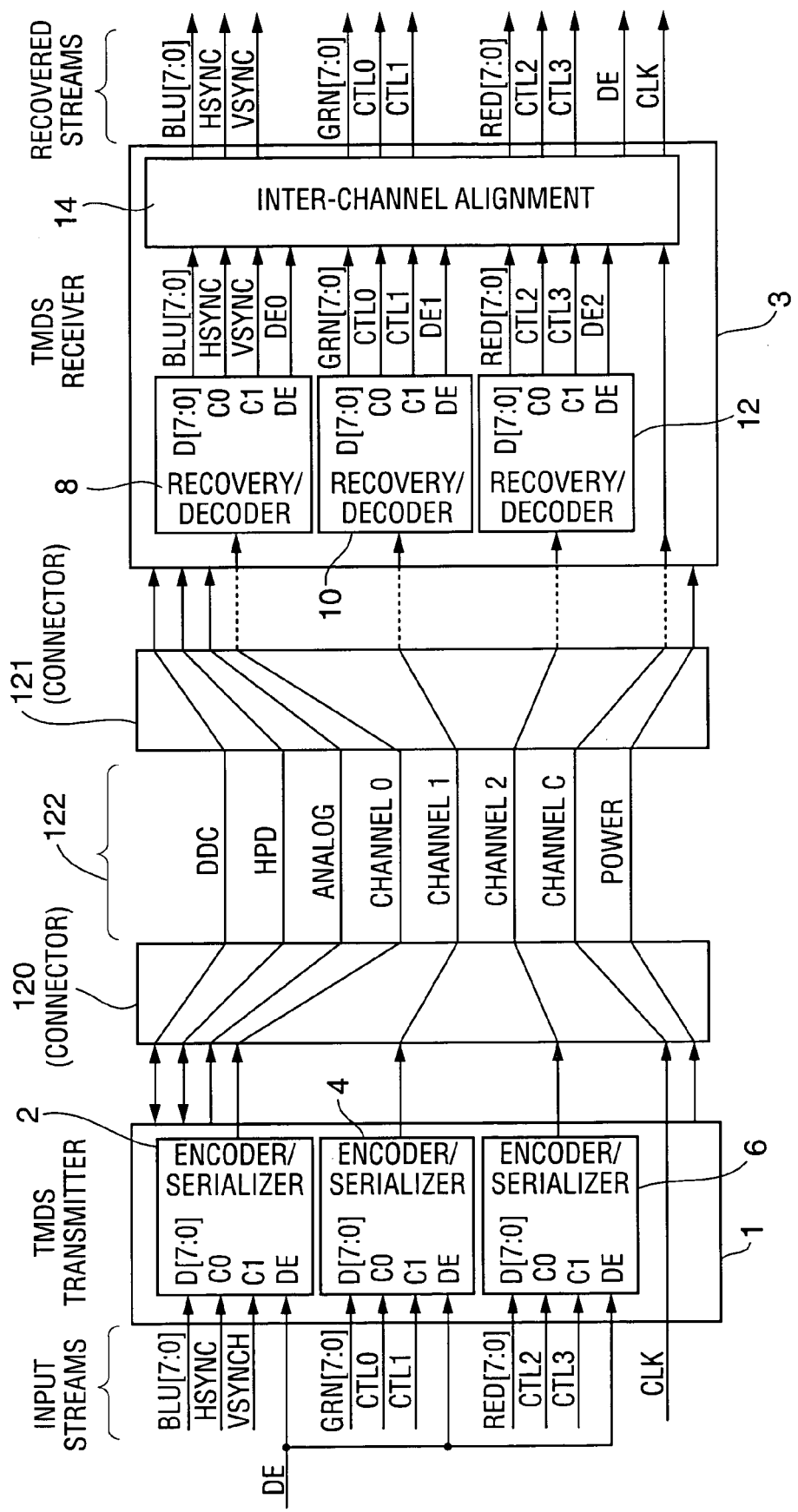
FIG. 1 is a block diagram of a conventional system including a Digital Visual Interface ("DVI") link.

In a class of embodiments in which the inventive transmitter is configured to transmit data over a TMDS link, during active video intervals (when DE is high), the transmitter transmits code words indicative of video data (e.g., the video fragments shown in Tables 2-5) over the link's data channels (CH0, CH1, and CH2, shown in FIG. 1) and also transmits the link clock of the link's clock channel (channel CHC shown in FIG. 1). During blanking intervals (when DE is low), the transmitter transmits code words each indicative of two sync bits (horizontal and vertical sync bits) over data channel CH0 of the link and four control bits (CTL0, CTL1, CTL2, CTL3) over data channels CH1 and CH2 and transmits the link clock over the link's clock channel. During blanking, the four control bits (CTL0 through CTL3) can be used occasionally for short periods to encode the previously mentioned link control messages ("LCMs") to communicate the transmitter packing phase and color depth mode to the receiver. More specifically, during at least one link clock cycle of a blanking interval, preferred embodiments of the transmitter send (over data channel CH1) a code word indicative of a control bit (the conventional control bit CTL0 shown in FIG. 1) and one bit of an LCM, and also send (over data channel CH2) a code word indicative of the other bit of the LCM and another control bit (the conventional control bit CTL3 shown in FIG. 1). The transmitted control bit CTL3 may be used in a conventional manner by HDCP decryption circuitry in the receiver.

In order to allow preferred embodiments of the inventive transmitter to send link control messages (in the manner to be described below) during blanking intervals, each video source that provides video data while DE=1 and sync bits (HS, VS) and control bits (CTL0 through CTL3) while DE=0 to the transmitter (for use by the transmitter to perform packing and encoding in an N-bit mode of operation, where N≠8) is preferably configured to send the DE signal with the following restrictions. The video source is preferably restricted from asserting the DE signal with a low level (to indicate a blanking interval) for less than a minimum period of 16 pixel clock cycles. The video source is preferably also restricted from changing the state of its CTL2 and CTL1 pins (over which it sends conventional TMDS control bits CTL1 and CTL2 to the transmitter) during the first 16 pixel clock cycles following a falling edge of the DE signal. The reasons for this restriction will be explained in greater detail below.

For color depths N that satisfy N>8, code words indicative of fragments of video data (or packing phase data or other data) are transmitted in accordance with typical embodiments of the invention using a link clock that is faster than the source pixel clock. In the embodiments described with reference to Tables 7-10 and FIGS. 4-6, for N=10, 12, or 16, the number of link clock cycles per group is one greater than the number of source pixel clocks per group. Thus, in such embodiments the inventive transmitter is implemented so that a falling edge of DE in the link clock domain (the start of a blanking interval in the link clock domain) does not occur after the first fragment of a group has been transmitted but before the second fragment of the group has also been transmitted. The packing phase data transmitted in accordance with the invention (in each blanking interval) indicate the phase of the most recently transmitted one of the last F-1 fragments of a group (where the complete group consists of F fragments). The receiver (operating in the N-bit color mode) is implemented to recover transmitted 8-bit fragments of video data at the link clock rate and (typically using a small FIFO) to unpack the recovered fragments and deliver unpacked N-bit video words at the rate of one N-bit video word (per color channel) per recovered pixel clock cycle, even for odd pixel or blanking counts.

During N-bit mode operation (where N>8), an embodiment of the inventive transmitter that is configured to send encoded video data, packing phase data, and color mode data over a TMDS link is preferably configured to send a 6-bit link control message ("LCM[5:0]" or "LCM") to a receiver during the first 12 TMDS link clock cycles of each blanking period (DE=0). The LCM can be indicative of packing phase data, color mode data, or other information. The LCM is determined as follows by bits that replace the CTL2 and CTL1 control bits that are conventionally transmitted over data channels CH1 and CH2 of a TMDS link during the first 12 link clocks of the blanking interval:

for the first 4 link clock cycles of a blanking interval, CTL2=LCM[1], CTL1=LCM[0];

for the second 4 link clock cycles of a blanking interval, CTL2=LCM[3], CTL1=LCM[2]; and for the third 4 link clock cycles of a blanking interval, CTL2=LCM[5], CTL1=LCM[4].

During the first 12 link clocks of the blanking intervals, the transmitter can transmit code words indicative of the CTL0 and CTL3 bits that are conventionally transmitted over a TMDS link, and either:

the CTL2 and CTL1 bits that are conventionally transmitted over a TMDS link (e.g., during 8-bit mode operation of the inventive transmitter); or bits indicative of the LCM in place of such conventional CTL2 and CTL1 bits (during N-bit mode operation of the inventive transmitter, where N≠8).

During N-bit mode operation (where N≠8), in each of the first four link cycles of a blanking interval, the transmitter sends an out-of-band TMDS code word indicative of LCM[0]

(in place of conventional bit CTL1) and CTL0 over data channel CH1 of the TMDS link, and also sends an out-of-band TMDS code word indicative of LCM[1] (in place of conventional bit CTL2) and CTL3 over data channel CH2 of the TMDS link. Then, during each of the next four link cycles of the blanking interval, the transmitter sends an out-of-band TMDS code word indicative of LCM[2] (in place of conventional bit CTL1) and CTL0 over data channel CH1 of the TMDS link, and also sends an out-of-band TMDS code word indicative of LCM[3] (in place of conventional bit CTL2) and CTL3 over data channel CH2 of the TMDS link. Then, during each of the next four link cycles of the blanking interval, the transmitter sends an out-of-band TMDS code word indicative of LCM[4] (in place of conventional bit CTL1) and CTL0 over data channel CH1, and also sends an out-of-band TMDS code word indicative of LCM[5] (in place of conventional bit CTL2) and CTL3 over data channel CH2.

As noted, the video source is preferably restricted from changing the state of its CTL2 and CTL1 pins (at which it can assert conventional TMDS control bits CTL1 and CTL2 to the transmitter) during the first 16 pixel clock cycles following its assertion of a falling edge of the DE signal. In place of CTL1 and CTL2 bits from an external source, the inventive transmitter asserts (at the appropriate times) the appropriate bits of LCM to a TMDS encoder within the transmitter, and the encoder generates the appropriate out-of-band TMDS code words in response thereto.

After 12 to 16 pixel clock cycles of DE=0, the CTL2 and CTL1 pins revert to normal operation (so that the inventive transmitter can assert to the encoder code words indicative of CTL1 and CTL2 bits asserted thereto by the external source, rather than code words indicative of LCM bits). At all times, the transmitter sends control bits CTL3 and CTL0 to the encoder in a conventional manner (i.e., code words indicative of conventional control bits CTL3 and CTL0 are sent to the encoder regardless of whether the inventive transmitter operates in a conventional 8-bit mode or an inventive N-bit mode, where N≠8), except in that they are typically asserted to the encoder in response to the link clock rather than the pixel clock.

For deep color depths (N>8), the link clock is faster than the source pixel clock P. As noted above, in typical embodiments, the number of link clock cycles per group (of packed K-bit fragments of N-bit video data) is one more than the number of pixel clock cycles per group. Thus, in blanking intervals during N-bit mode operation, one blanking code indicative of a sync bit pair or a control bit pair (control bits CTL0 and CTL1, or control bits CTL2 and CTL3) can be transmitted per link clock cycle. However, if "X" link cycles are required to transmit a group of K-bit fragments (of N-bit video data) during an active video interval, only X-1 sync bit pairs (or control bit pairs CTL0 and CTL1, or CTL2 and CTL3) will be typically be asserted to the transmitter (from a video source) per X link clock cycles. Thus, in blanking intervals during N-bit mode operation, typical embodiments of the inventive transmitter generate and transmit (e.g. over each of channels CH0, CH1, and CH2 of a TMDS link) a sequence of X blanking codes during each period of X link clock cycles, where each blanking code is indicative of one of X-1 sync (or control) bit pairs received from the video source. The last two blanking codes transmitted during each such period are indicative of the same sync (or control) bit pair. The receiver drops the last blanking code (the repeated blanking code) transmitted during each such period of X link clock cycles in order to match the pixel rate. The inventive transmitter is preferably configured so that while it sends the described six-bit LCM (or during the first 16 link clock cycles of a blanking interval), and optionally for additional link clock cycles thereafter, it asserts an internal DE=0 bit to its TMDS encoder circuitry even if the state of its external DE pin (coupled to the DE pin of an external video source) changes sooner.

The described LCM can be indicative of color mode data (for causing a receiver to operate in the indicated color depth mode), or a phase control message indicative of packing phase data, or it can be indicative of other data of any desired type that may be useful in the specific application. In one embodiment, a transmitter is configured to send LCMs of different types during consecutive horizontal blanking intervals (a blanking interval known as "horizontal" blanking interval typically occurs once per line of a video field or frame, with a longer blanking interval known as a "vertical" blanking interval occurring after the last line of each video field or frame). In a class of preferred embodiments in which a DVI-compliant transmitter sends a 6-bit LCM of the above-described type over data channels CH1 and CH2 of a TMDS link, the transmitter sends the LCMs in the following sequence (which repeats every four horizontal blanking intervals): an LCM indicative of color mode data during the first 16 link clock cycles of every "n"th horizontal blanking interval; an LCM indicative of packing phase data during the first 16 link clock cycles of every "n+1"th horizontal blanking interval; and (optionally also) an LCM indicative of other data during the first 16 link clock cycles of every "n+2"th horizontal blanking interval; and (optionally also) another LCM indicative of other data during the first 16 link clock cycles of every "n+3"th horizontal blanking interval. Optionally the transmitter is programmable so as to be operable either in:

a mode in which it sends an LCM indicative of color mode data once every two horizontal blanking intervals, during the first 16 link clock cycles of every "n"th horizontal blanking interval, and sends an LCM indicative of packing phase data during the first 16 link clock cycles of every "n+1"th horizontal blanking interval (it does not send LCMs of any other type); or a mode in which it sends an LCM indicative of color mode data once every four horizontal blanking intervals, during the first 16 link clock cycles of every "n"th horizontal blanking interval, sends an LCM indicative of packing phase data during the first 16 link clock cycles of every "n+1"th horizontal blanking interval, sends an LCM indicative of other data during the first 16 link clock cycles of every "n+2"th horizontal blanking interval, and sends another LCM indicative of other data during the first 16 link clock cycles of every "n+3"th horizontal blanking interval.

When the described six-bit LCM is indicative of color mode data (for causing a receiver to operate in the indicated color depth mode), the color depth mode message codes can be:

LCM[5:0]=0x30 for the 8-bit mode;
LCM[5:0]=0x31 for the 10-bit mode;
LCM[5:0]=0x32 for the 12-bit mode; and
LCM[5:0]=0x33 for the 16-bit mode, where the prefix "0x" denotes that the following symbol is a hexadecimal representation of a number.

Preferably, the receiver is configured to:

at reset, store an initial (default) color depth mode in a register (a "Last Color Mode Message Register");

check for a color depth mode control message (LCM indicative of color mode data) at the start of each horizontal blanking interval;

filter out invalid color depth control messages (in a manner to be described below); and compare each newly received valid color depth mode control message with the contents of the Last Color Mode Message Register. In response to determining that they match, the receiver increments a Last Color Mode Message Counter (until the counter saturates, which may occur at a count of 255 in a typical implementation). In response to determining that they do not match, the new (valid) color depth mode control message is loaded into the Last Color Mode Message Register and the Last Color Mode Message Counter is cleared.

The receiver preferably implements noise filtering to assess whether each received color depth mode control message is valid. Preferably, the receiver considers a color depth mode control message to be valid only if:

LCM[5:4] is constant for at least Np of the first 4 link clock cycles of DE=0; and LCM[3:2] is constant for at least Np of the second 4 link clock cycles of DE=0; and LCM[1:0] is constant for at least Np of the third 4 link clocks cycles of DE=0; and LCM[5:0] is 0x30, 0x31, 0x32 or 0x33; and DE=0 for at least Np link clock cycles after the link control message, where Np is a predetermined noise filter value. Preferably, Np is a programmable value, and has a default value (its value if it is not programmed to have a different value). In some embodiments, the default value of Np is Np=3.

Preferably, the receiver begins to operate in the N-bit mode indicated by the initial (default) color depth mode stored in the Last Color Mode Message Register. The receiver may include another register that stores the color depth mode control message that indicates the color depth parameter, N, for its current color mode. Preferably, the receiver also implements noise filtering (in the manner described in the following paragraph) when determining whether to change its current color mode.

Preferably, the receiver is configured to compare the color depth mode control message that indicates its current color depth parameter, N, with the contents of the Last Color Mode Message Register. The receiver does not change its color mode when the count of the Last Color Mode Message Counter is less than a programmable noise filter threshold value, Nm (whose maximum value is the count at which the Last Color Mode Message Counter saturates). Whenever the count of the Last Color Mode Message Counter is greater than or equal to Nm:

If the receiver color mode does not match the Last Color Mode Message Register, the receiver changes its color mode to the mode determined by the contents of the Last Color Mode Message Register and resets the Last Color Mode Message Counter, or if the receiver color mode matches the Last Color Mode Message Register, the receiver does not change its color mode or reset the Last Color Mode Message Counter (in this case, all is well so that the receiver's operating mode should not be changed).

As mentioned above, an LCM can be a phase control message (an LCM indicative of transmitter packing phase data). In embodiments of the type described above in which a transmitter implements the state diagrams of FIGS. 4-6, the transmitter can be configured to send a six-bit LCM (in the above-described manner) as such a phase control message, using the following phase control message codes:

LCM[5:0]=0x35 to indicate the phase of fragment 10P1 in the 10-bit mode, or fragment 12P1 in the 12-bit mode, or fragment 16P1 in the 16-bit mode);

LCM[5:0]=0x36 to indicate the phase of fragment 10P2 in the 10-bit mode, or fragment 12P2 in the 12-bit mode;

LCM[5:0]=0x37 to indicate the phase of fragment 10P3 in the 10-bit mode; and LCM[5:0]=0x34 to indicate the phase of fragment 10P4 in the 10-bit mode.

Phase control messages are used to ensure that the receiver's unpacking state machine phase is matched to the transmitter's packing state machine phase. Each phase control message should indicate the phase of the last encoded fragment sent by the transmitter before the most recent falling edge of DE before the phase control message. The receiver includes an unpacking state machine that has the same state sequence as the transmitter's packing state machine (for example, FIG. 3, 4, 5 or 6, depending on the current Color Mode). The receiver logs the phase of its unpacking state machine for the last encoded fragment that it receives before each falling edge of DE. Whenever the receiver decodes a phase control message during a DE=0 period, it compares the transmitter's packing phase (sent via the LCM) to the receiver's most recently logged unpacking phase. The transmitter and receiver phases are for the same fragment (the last fragment before DE changed to zero) and should match. When the link is first started, or after a change in color mode or video timing, the transmitter and receiver will have (in general) unrelated phases, and the receiver uses the transmitter phase (from the LCM) to adjust its phase to match the transmitter. After this initial adjustment of receiver phase, the transmitter and receiver phases should continue to match, as they are executing the same state sequences; in that (unusual) case, a mismatch between the transmitter and receiver phase indicates an error such as an intermittent or noisy signal, and the receiver again adjusts its phase to match the transmitter to recover from the error.

Preferably, the receiver is configured to:

check for a phase control message (an LCM indicative of transmitter's packing phase for the last pixel fragment in the line) at the start of each blanking interval;

log the phase of the last fragment received while DE=1 (the last pixel fragment in the line, just before DE goes to zero) in a "Captured Phase" register;

calculate the "phase offset" value (the difference between transmitter and receiver phase) during blanking intervals; and when a consistent non-zero "phase offset" is detected, adjust the receiver state machine phase so that the phase offset becomes zero (in the manner described below).

The receiver preferably implements noise filtering to assess whether each received phase control message is valid. Preferably, the receiver considers a phase control message to be valid only if:

LCM[5:4] is constant for at least Np of the first 4 link clock cycles of DE=0; and LCM[3:2] is constant for at least Np of the second 4 link clock cycles of DE=0; and LCM[1:0] is constant for at least Np of the third 4 link clocks cycles of DE=0; and LCM[5:0] is 0x34, 0x35, 0x36 or 0x37; and DE=0 for at least Np link clock cycles after the link control message, where Np is a programmable noise filter value (in some embodiments, the default value of Np is Np=3).

Preferably, whenever a (valid) phase control message is received, the receiver compares the transmitter phase indicated by the phase control message with the receiver's "captured phase" value (logged in response to the last video fragment received before the start of the blanking interval). If they match, a Phase Error counter in the receiver is cleared. If they do not match and the count indicated by the Phase Error counter is zero, the difference between the phase indicated by the valid phase control message and the "captured phase" value in the Captured Phase register is placed into the Phase Offset register and the Phase Error counter is incremented.

If the phase indicated by the valid phase control message does not match the "captured phase" value (logged in response to the last video fragment received before the start of the blanking interval) and the count indicated by the Phase Error counter is non-zero, the receiver compares the "phase offset" value in the Phase Offset register with the difference between the phase indicated by the valid phase control message and the "captured phase" value in the Captured Phase register. If the new difference is the same as the phase offset value, the Phase Error counter is incremented. If the new difference (between the phase indicated by the valid phase control message and the "captured phase" value in the Captured Phase register) does not match the phase offset value in the Phase Offset register, the new difference is placed in the Phase Offset register (to replace the old phase offset value) and the Phase Error counter is cleared.

Whenever the count indicated by the Phase Error counter becomes greater than or equal to the above-defined programmable noise filter value, Nm (whose maximum value is the count at which the Phase Error counter saturates), the Phase Error counter is cleared and the receiver's unpacking state machine phase is corrected by subtracting (modulo the group size F, the number of fragments per group for the current Color Mode) the value in the Phase Offset register from the unpacking state machine phase. Whenever the count indicated by the Phase Error counter is less than the noise filter value, Nm, the receiver's state machine's phase is considered to be correct and is not adjusted by subtracting the phase offset value in the Phase Offset register therefrom.

With reference to FIGS. 7-14, we next describe several embodiments of the inventive transmitter, receiver, and system.

Figure 7:
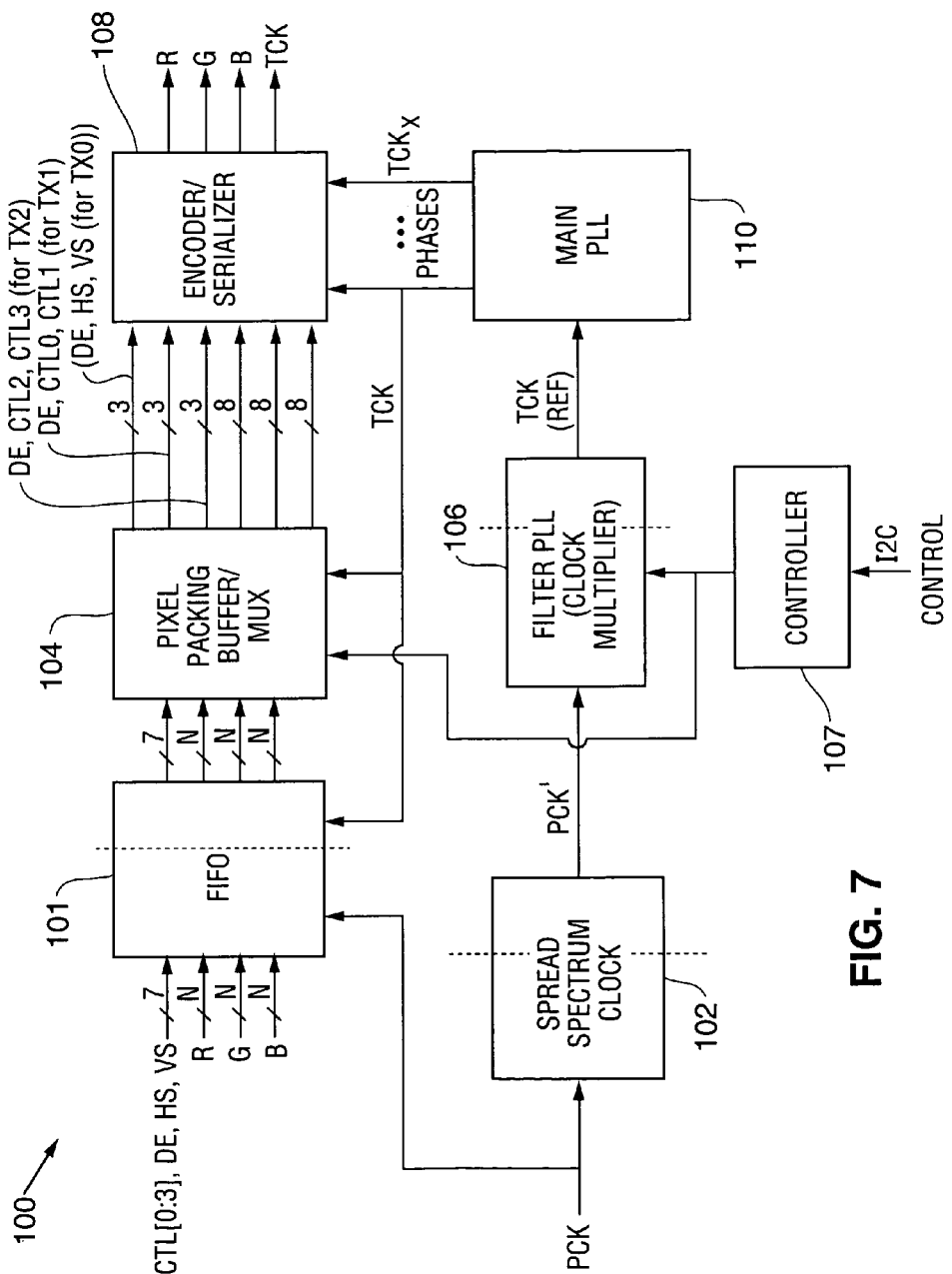
FIG. 7 is a block diagram of a preferred embodiment of the inventive transmitter.
Figure 8:
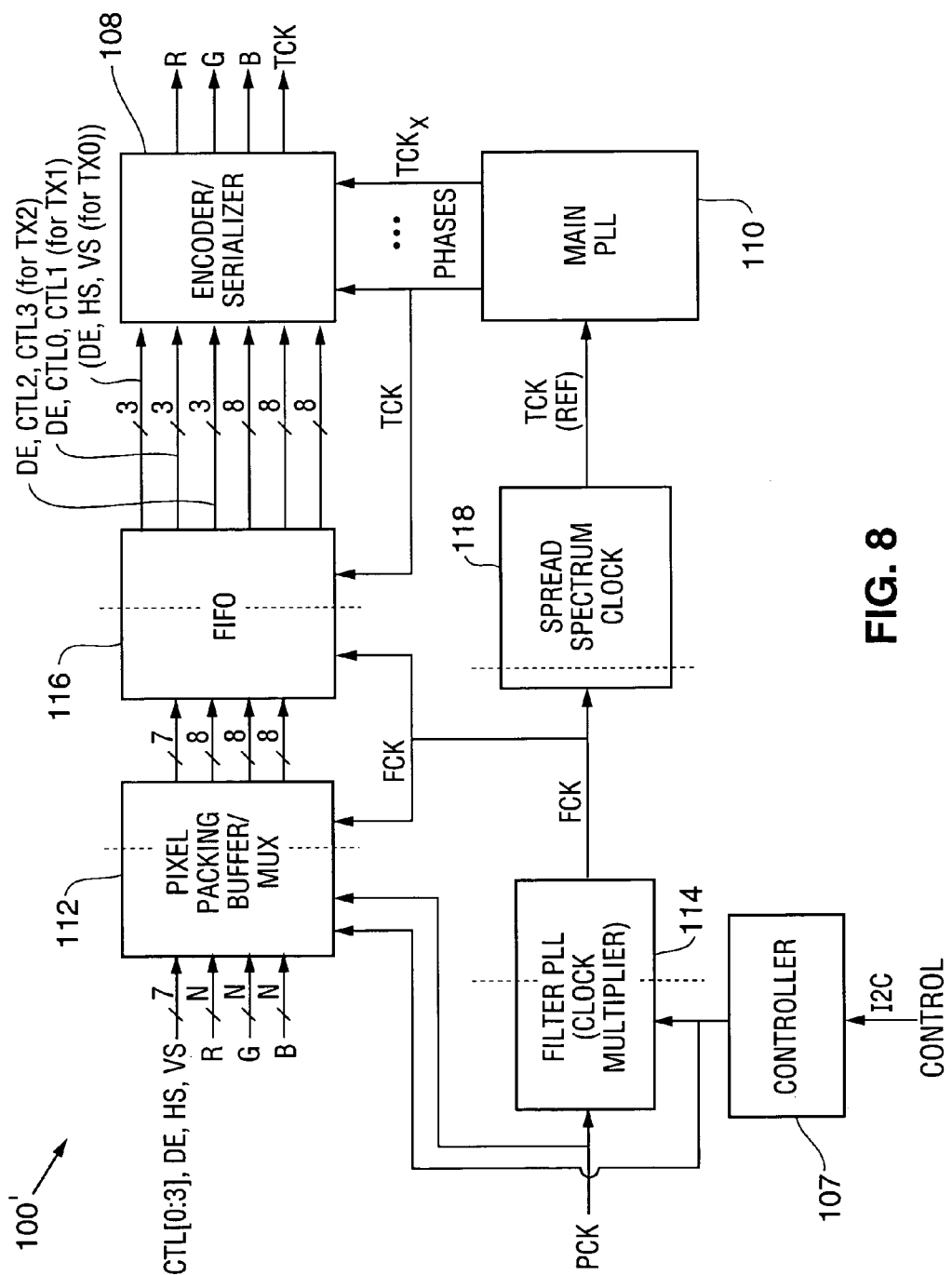
FIG. 8 is a block diagram of an alternative embodiment of the inventive transmitter.
Figure 9:
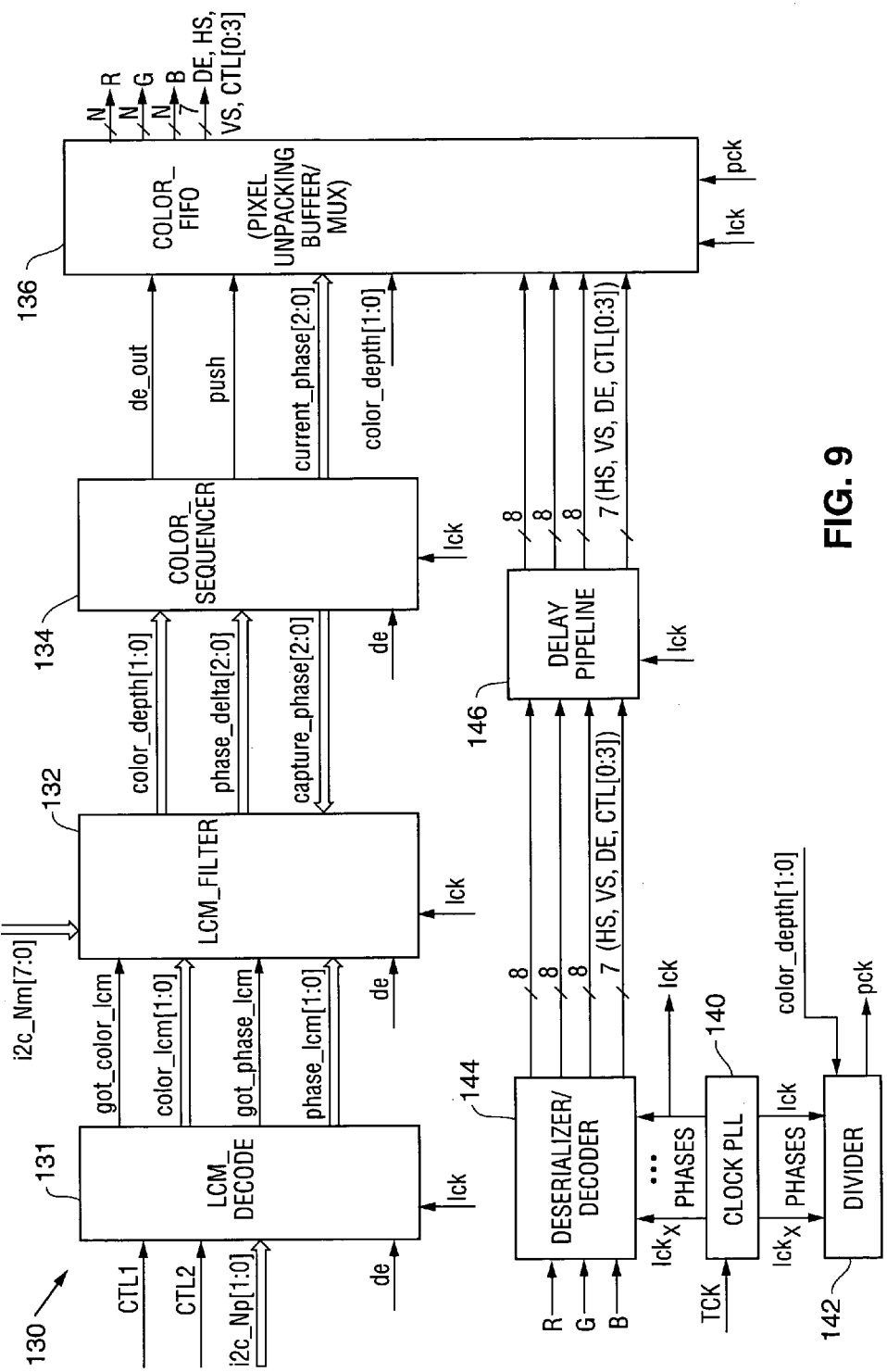
FIG. 9 is a block diagram of a preferred embodiment of the inventive receiver.

FIG. 7 is a block diagram of a preferred embodiment of the inventive transmitter, FIG. 8 is a block diagram of an alternative embodiment of the inventive transmitter, and FIG. 9 is a block diagram of a preferred embodiment of the inventive receiver.

Transmitter 100 of FIG. 7 includes FIFO buffer 101, (optional) spread spectrum clock generation circuitry 102, pixel packing buffer and multiplexing circuitry ("packer") 104, encoder and serializer ("encoder") 108, clock multiplier 106, main PLL (phase-locked loop circuit) 110, and control registers 107, connected as shown.

Encoder 108 of transmitter 100 (transmitter 100' of FIG. 8 includes an identical encoder 108) is preferably implemented to encode 8-bit video color components as 10-bit TMDS code words and transmit them (and a link clock) over a TMDS link in the same manner as does conventional transmitter 1 of FIG. 1 (except that in some modes of operation, the link clock employed and transmitted by encoder 108 may have higher frequency than the link clock transmitted by transmitter 1). Deserializer and decoding circuitry 144 of receiver 130 of FIG. 9 is preferably implemented to receive and decode such 10-bit TMDS code words (using a multi-phase clock set generated by Clock PLL 140 in response to the received link clock) to recover 8-bit video color components in the same manner as does conventional receiver 3 of FIG. 1.

Transmitter 100 of FIG. 7, and transmitter 100' of FIG. 8, are also operable in any selected one of a 10-bit mode a 12-bit mode, and a 16-bit mode to pack and encode video data in accordance with the invention, and each is implemented to transmit the encoded video data over Channel 0, Channel 1, and/or Channel 2 of a TMDS link. Receiver 130 of FIG. 9 is also operable in any of a 10-bit mode, a 12-bit mode, and a 16-bit mode to decode and unpack such encoded video data after transmission over a TMDS link.

Control registers 107 (of FIG. 7) are configured to set transmitter 100's operating mode (i.e., to set the color depth N to 8, 10, 12, or 16) by asserting control bits to packer 104 and clock multiplier 106 to specify the color depth mode in which elements 104 and 106 should operate. In a typical implementation, the control registers are coupled for I2C communication with an external source of control and configuration bits (including bits that determine in which color depth mode the transmitter should operate).

The optional spread spectrum clock circuitry 102 of FIG. 7 receives a pixel clock PCK from an external source (or circuitry within the transmitter generates the pixel clock and asserts it to circuitry 102). In response, circuitry 102 generates and asserts to PLL 106 a phase-modulated version, PLK', of the pixel clock. Spread spectrum clock circuitry 102 can be implemented in a conventional manner. For example, if the rest of transmitter 100 (or the rest of transmitter other than control registers 107) is implemented as an integrated circuit (a "first" chip), circuitry 102 can be a commercially available integrated circuit (for generating a spread spectrum clock in response to an input clock) coupled to the first chip. Pixel clock PCK and phase-modulated pixel clock PLK' have the same (time-averaged) clock rate.

When transmitter 100 operates in the N-bit color mode, 3N-bit pixels of video data, a data enable bit (DE), horizontal and vertical sync control bits (HS and VS), and control bits (CTL0, CTL1, CTL2, and CTL3) are clocked into FIFO 101 using the pixel clock PCK, and clocked out of FIFO 101 using the link clock (TCK) generated by main PLL 110. The video data and bits DE, HS, VS, and CTL[0:3] can be received from an external source (coupled to transmitter 100) or generated by circuitry (not shown) within transmitter 100. FIFO 101 provides tolerance against the frequency spread resulting from the time-varying relative phase of clocks PCK and PCK', and the frequency and phase differences of the multiplied link TCK relative to clock PCK'. FIFO 101 has sixteen FIFO locations and a width of 55 bits (48 bits for up to 16 bit RGB pixel components plus 7 bits for DE, HS, VS, CTL[3:0]) in a typical implementation.

Clock multiplier 106 is a PLL that generates a raw link clock TCK(ref) in response to the output PCK' of spread spectrum clock circuitry 102. The raw link clock is a frequency-multiplied version of clock PCK' having frequency (N/8)P, where P is the frequency of clock PCK'.

In alternative embodiments (e.g., embodiments in which the transmitter does not receive the pixel clock from an external source but instead generates the pixel clock, such as, for example, when the transmitter is integrated in the same chip as a video/graphics source), the transmitter may include circuitry for generating the link bit rate clock directly (e.g., using a standard oscillator or synthesizer) and with the appropriate frequency for the transmitter's current color mode, and also circuitry for frequency dividing the link bit rate clock to generate the link symbol clock and the pixel clock. In some cases, the frequency divider circuitry for generating the pixel clock could be a simple digital integer divider from the link bit rate. In other cases, the frequency divider circuitry for generating the pixel clock could be implemented in the same manner as any embodiment of fractional frequency divider 142 of FIG. 9 (described below).

Main PLL 10 generates a stabilized version, TCK, of raw link clock TCK(ref), and phase-shifted versions of the stabilized link clock TCK for use by encoder 108, FIFO 101 and packer 104. Specifically, PLL 110 generates a multi-phase clock set which is a set of L clocks, each having the link clock frequency and a different phase $\phi_m$ that satisfies $\phi_m = \phi_{offset} + 2\pi(m/L) + \Delta\phi_m$ where the index "m" is a non-negative integer in the range $\{0, \ldots, L-1\}$, and $\Delta\phi_m$ is an error term. Typically $\Delta\phi_m$ is much smaller than the phase increment $2\pi/L$, and the multi-phase clock set is generated to approximate (as closely as is practical) an ideal multi-phase clock set consisting of L clocks, each having the link clock frequency and each having a different phase $\phi_m = \phi_{offset} + 2\pi(m/L)$.

Transmitter 100 has two main clock domains: the pixel clock domain (i.e., circuitry 102 and the circuitry for clocking bits into FIFO 101 in response to pixel clock PCK), and the link clock domain (i.e., the circuitry for clocking bits out of FIFO 101, and elements 104, 108, and 110).

Encoder 108 operates in response to stabilized link clock TCK (generated by PLL 110) and performs the above-described operations of encoding 8-bit data words received from packer 104 as 10-bit TMDS code words, serializing the data, and transmitting the serialized encoded data (and stabilized link clock) over a TMDS link to a receiver.

Packer 104 passes through to encoder 108 the DE, CTL0, and CTL3 bits clocked out of FIFO 101, and can either pass through to encoder 108 the CTL1 and CTL2 bits clocked out of FIFO 101 or (at appropriate times) assert in place of them internally generated bits CTL1 and CTL2 that determine the above-described link control messages LCM[5:0]. Packer 104 implements a LCM generator (e.g., LCM generator 124 of FIG. 7A) which causes packer 104 to assert the internally generated bits CTL1 and CTL2 comprising each message LCM[5:0] at appropriate times during appropriate blanking intervals (e.g., in the first 12 link clock cycles of each blanking interval as described above).

Preferably, FIFO 101 has 55-bit width, which is sufficient to carry DE, 6 sync/control bits and/or 48 pixel data bits for one pixel clock. A new pixel or blanking character is written into FIFO 101 every pixel clock (PCK), along with DE (DE=1 indicates a pixel, DE=0 indicates blanking). Pixel packing buffer and multiplexing circuitry 104 reads a new pixel or blanking character (along with DE) out of FIFO 101 during certain link clocks (TCK), indicated by the FIFO_read output of the packing state machine 123 (in FIG. 7A). The main purpose of the FIFO is to buffer and resynchronize the data as it crosses between the PCK and TCK clock domains, which operate at different frequencies.

Figure 7A:
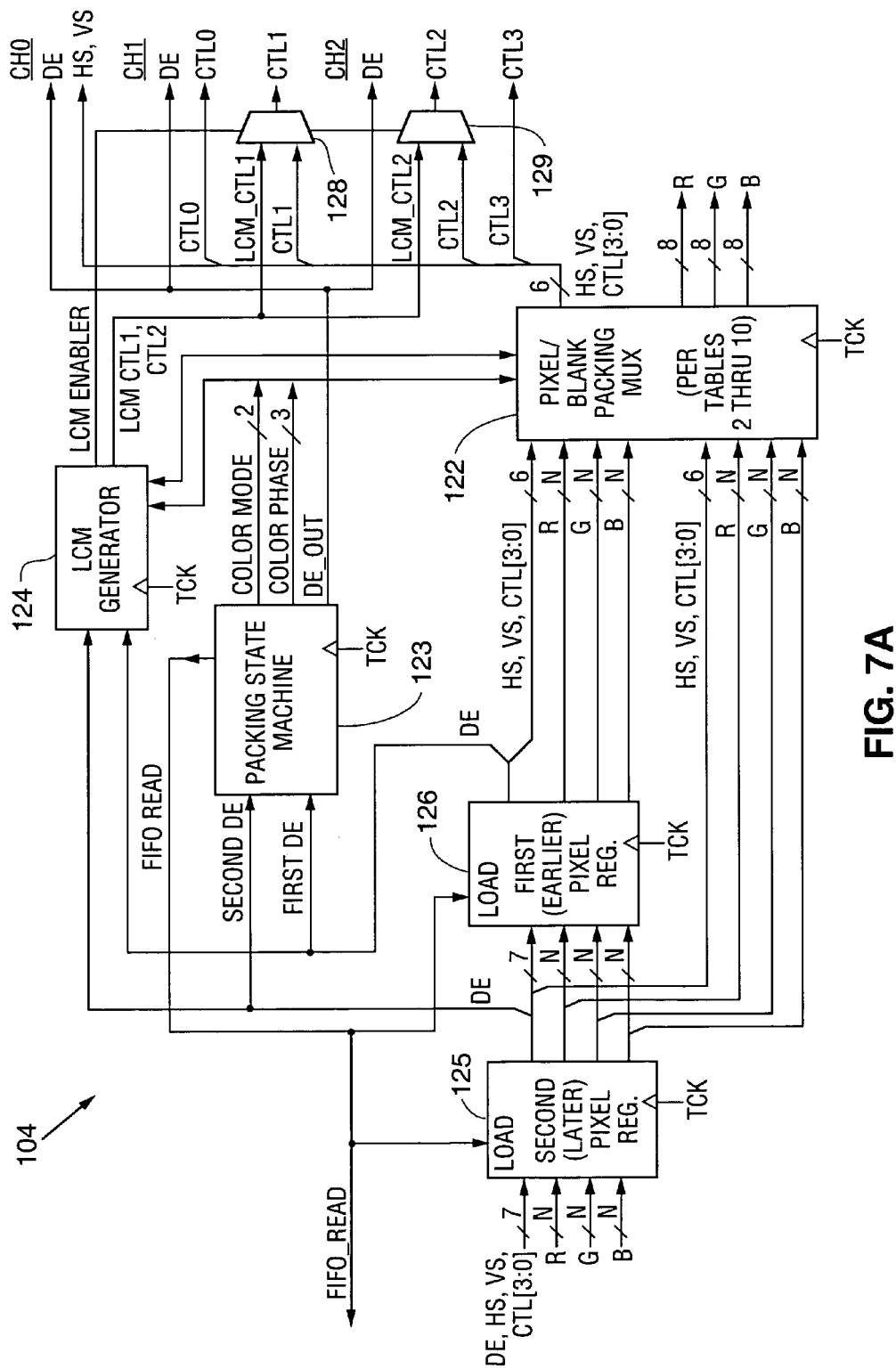
FIG. 7A is a block diagram of an implementation of pixel packing buffer and multiplexing circuitry 104 of FIG. 7.

An implementation of pixel packing buffer and multiplexing circuitry 104 is shown in more detail in FIG. 7A. In this implementation, circuitry 104 includes two pixel data holding registers (125 and 126) that are updated every time a FIFO_read signal is asserted by packing state machine 123 (which implements the appropriate one of the state diagrams of FIGS. 3 through 5). Together, elements 125 and 126 form a shift register, with the first register 126 containing the earlier of two consecutive pixel or blanking characters and the second register 125 containing the later of two consecutive pixel or blanking characters.

The state machine 123 states are shown in FIGS. 3 through 6. The FIFO_read control signal output from state machine 123 is false in one of the "P" packing states (typically 10P0, 12P0, or 16P0, with the specific phase depending on the particular implementation) because a new pixel is not needed, and is also false in one of the "C" packing states (typically 10C4, 12C2, 16C1; again, implementation dependent). In the other states, state machine 123 asserts the FIFO_read control signal as true.

Similarly, in certain states (typically the "P" states; again, the specific phase will depend on the particular implementation) state machine 123 asserts DE_OUT=1 and in the other states (typically "PC" and "C" states; again, implementation dependent) state machine 123 asserts DE_OUT=0.

The Color Mode (8, 10, 12, 16 bit components) and Color Phase (0 through 4) signals output from state machine 123 instruct pixel packing mux 127 to select bits from registers 125 and 126 in accordance with Tables 2 through 10 to form the next fragment to be sent to encoder 108 (shown in FIG. 7). For example, in the 10-bit mode, 8 bits can be selected from the first holding register 126 (for each color component, according to Table 3) during state 10P0, then 2 bits can be selected from first holding register 126 and 6 bits from second holding register 125 (for each color component) during state 10P1, then 4 bits can be selected from each of first holding register 126 and second holding register 125 (for each color component) during state 10P2, then 6 bits can be selected from first holding register 126 and 2 bits from second holding register 125 (for each color component) during state 10P3, and then 8 bits can be selected from first holding register 126 (for each color component) during state 10P4.

Alternatively, register 125 may be omitted and the head (output word) of FIFO 101 may be used in place of register 125. This implementation may save a register, but may not be able to operate at as high a speed as the preferred implementation including two registers 125 and 126.

Multiplexers 127, 128, and 129 (connected as shown in FIG. 7A) pass through to encoder 108 the DE, CTL0, and CTL3 bits clocked out of FIFO 101, and can either pass through to encoder 108 the CTL1 and CTL2 bits clocked out of FIFO 101 or (at appropriate times) assert in place of them internally generated bits CTL1 and CTL2 that determine the above-described link control messages LCM[5:0]. More specifically, LCM generator 124 of FIG. 7A generates bits (labeled "LCM, CTL1" and "LCM, CTL2" in FIG. 7A) comprising each message LCM[5:0], and causes multiplexers 128 and 129 to assert the internally generated bits LCM, CTL and LCM, CTL2 at times (determined by the LCM_ENABLE signal asserted to multiplexers 128 and 129 by LCM generator 124) such that encoder 108 will transmit the LCM[5:0] during the appropriate link clock cycles of each appropriate blanking interval (e.g., in the first 12 link clock cycles of each blanking interval as described above).

Transmitter 100 of FIG. 7 is preferably implemented to be operable in an 8-bit mode in which packer 104 passes through to encoder 108 three streams of 8-bit video data from FIFO 101 to encoder 108, so that encoder 108 can perform conventional TMDS encoding of the video data to generate a 10-bit TMDS code word in response to each 8-bit component and transmit the encoded data over a TMDS link. In each N-bit mode (in which N>8), packer 104 implements packing by selecting three 8-bit words (according to Tables 3 through 5 and FIGS. 4 through 6) from the six N-bit words (two N-bit words per color component) available from registers 125 and 126 (of FIG. 7A) and asserts the selected data to encoder 108, so that encoder 108 can perform conventional TMDS encoding of the video data to generate a 10-bit TMDS code word in response to each 8-bit component and transmit the encoded data over the TMDS link.

Transmitter 100 of FIG. 7 is preferably also operable in a 6-bit color mode in which even and odd 3N-bit pixels (where 3N=18) are paired to form 36 bit words which can then be packed and encoded using the same techniques already described for the 12 bit color mode (3*12=36). In the 6-bit color mode, the rate of the transmitted link clock may be 0.75×(⅝) of the pixel clock rate (instead of 1.5× the pixel clock rate, as in the 12-bit color mode). In the 6-bit color mode, the even/odd pairing rate may be at the pixel clock rate, forming 36 bit words which may be packed at one half the pixel clock rate. In that case, the link clock rate is again 1.5× the 36-bit word packing rate, as it is in the case of 12-bit pixels.

More generally, in some modes of some implementations, transmitter 100 may accept two pixels per input clock, with an input clock having one-half the pixel rate, and a wider FIFO may be used which accepts two pixels per write. In this case clock multiplier 106 may multiply the input clock (whose rate is one-half the pixel rate) by a factor double that for implementing the previously described ratio of link clock to pixel clock rate to obtain the link clock.

FIG. 8 shows an alternative clocking implementation for the transmitter, which is not currently preferred. Elements and signals identified in FIG. 8 that correspond to elements and signals identified in FIG. 7 are numbered identically in the two Figures, and the above description thereof will not be repeated. Transmitter 100' of FIG. 8 includes pixel packing buffer and multiplexing circuitry (packer) 112 (similar to packer 104 of FIG. 7), FIFO buffer 116 (similar to 101 in FIG. 7), spread spectrum clock generation circuitry 118 (similar to 102 in FIG. 7), encoder 108 (as in FIG. 7), clock multiplier 114 (similar to 106 in FIG. 7), main PLL 110 (as in FIG. 7), and control registers 107 (as in FIG. 7), connected as shown.

FIG. 8 simply reverses the order of clock multiplication 114 and spread spectrum clocking 118 compared to FIG. 7, which requires that the pixel packing 112 occur prior to the FIFO 116, and introduces an additional clock domain FCK. With regard to the color packing state machine and the link control messages described above, the fundamental principles of operation are the same for FIG. 7 and FIG. 8; the differences are only at the implementation level.

Clock multiplier 114 of FIG. 8 is a PLL that generates a frequency-multiplied version ("FCK") of the pixel clock in response to pixel clock PCK. Frequency-multiplied clock FCK has frequency (N/8)P, where P is the frequency of clock PCK and transmitter 100' is operating in an N-bit color depth mode In response to frequency-multiplied clock FCK, spread spectrum clock circuitry 118 generates and asserts to PLL 110 a raw link clock, TCK(ref), which is a phase-modulated version of clock FCK. Spread spectrum clock circuitry 118 can be implemented in a conventional manner, and can be identical to spread spectrum clock circuitry 102 of FIG. 7 if such an implementation of circuitry 118 is operable in response to either a clock having frequency (N/8)P (as in FIG. 8) or a pixel clock having frequency P (as in FIG. 7).

Transmitter 100' of FIG. 8 performs the same functions as does transmitter 100, but operates in three main clock domains: the pixel clock domain (i.e., clock multiplier 114 and the circuitry for clocking bits into packer 112 in response to pixel clock PCK; the frequency-multiplied clock domain (i.e., the circuitry for clocking bits out of packer 112 and for clocking the bits into FIFO 116 in response to clock F); and the link clock domain (i.e., the circuitry for clocking bits out of FIFO 116, and elements 104 and 110).

FIFO 116 provides tolerance against the frequency spread resulting from the time-varying relative phase of clocks FCK and TCK(ref), and the clock variation of TCK(ref) relative to link clock TCK.

The FIG. 7 implementation of the inventive transmitter is preferable to that of FIG. 8 for most applications since: the latter implementation may require increased buffering in 112 compared to 104 in the former; the former has only two clock trees whereas the latter has three; and spread spectrum clock circuitry 102 of FIG. 7 must have a higher maximum operating frequency and wider operating frequency range than must circuitry 118 of FIG. 8.

Figure 9A:
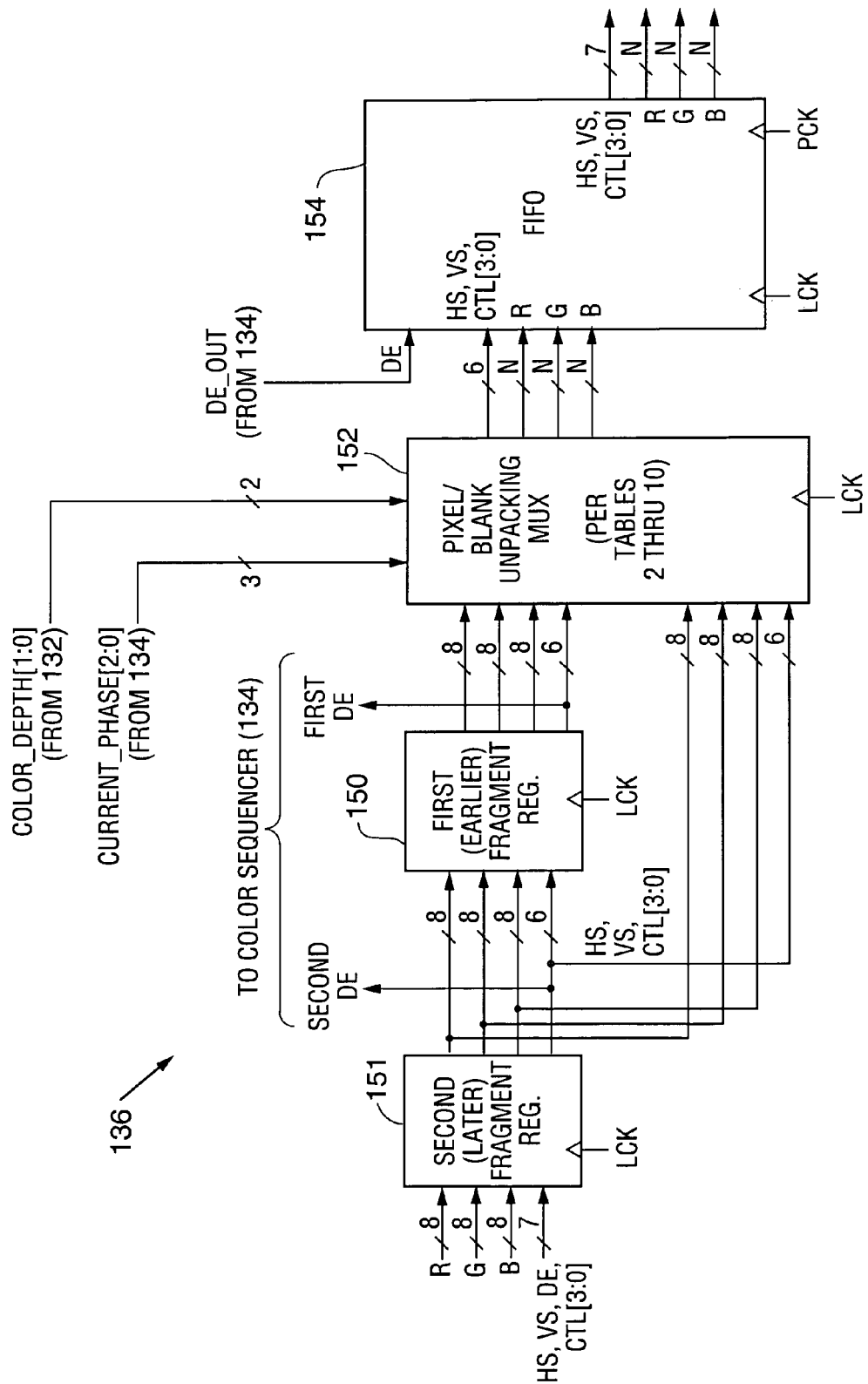
FIG. 9A is a block diagram of an implementation of pixel unpacking buffer and multiplexing circuitry 136 of FIG. 9.

Receiver 130 of FIG. 9 includes deserializer and decoding circuitry 144, main PLL 140, clock divider 142, LCM decoding logic 131, LCM filter 132, color sequencer (unpacking state machine) 134, pixel unpacking buffer and color FIFO (unpacker) 136, and delay pipeline 146, connected as shown. Unpacker 136 is preferably implemented as shown in FIG. 9A (i.e., it preferably includes elements 150, 151, 152, and 154, connected as shown in FIG. 9A). In FIG. 9, the "CTL1" and "CTL2" bits input to LCM decoding logic 131 are two bits of the bits "CTL[0:3]" output from decoder 144.

In operation of receiver 130, TMDS code words (including video code words) that have been transmitted over the data channels of a TMDS link are received, decoded, and deserialized in TMDS deserializer and decoding circuitry 144. Once per cycle of the recovered link clock "lck," the following bits are clocked out of circuitry 144: three 8-bit video words (one 8-bit word for each of three color components, each of which is a fragment of an N-bit color component), and seven control bits (DE, VS, HS, and CTL[0:3], each of which has been described above). The decoded video and control bits are delayed in delay pipeline 146 for a time sufficient for state machine 134 to respond to the output of LCM filter 132 by asserting appropriate control bits to the unpacking circuitry (preferably implemented as elements 150, 151, and 152 of FIG. 9A) of unpacker 136.

With unpacker 136 implemented as shown in FIG. 9A, during every link clock cycle, a 24-bit pixel fragment or a 6-bit sync/control code is clocked from delay pipeline 146 into assembly buffer input register 151. Input register 151 is copied one link clock cycle later to register 150. Unpacking multiplexer 152 operates on each color component individually and combines bits from the earlier fragment in register 150 and the later fragment in register 151 to recover the full 3N-bit pixel in accordance with the invention. Unpacking multiplexer 152 combines the two fragments according to Tables 2 through 10, as directed by the color_depth[1:0] output of LCM filter 132 (of FIG. 9) and the current_phase [2:0] output of color sequencer state machine 134 (of FIG. 9).

During F-1 link clock cycles (out of F link clock cycles per fragment group), state machine 134 "push" output causes a new N-bit pixel to be written from the unpacking mux 152 to FIFO 154. State machine 134 also generates a "de_out" output that tags each word written to FIFO 154 as either pixel or blanking data.

FIFO 154 of unpacker 136 preferably has 55-bit width (for pixel data having up to 48 bit width, plus 7 bits of DE, sync and control data) and 8-word depth, in order to buffer and resynchronize data transfers between the link clock and pixel clock domains. Writes to FIFO 154 occur during link clock cycles that have "push" true. Reads from FIFO 154 to the receiver data outputs occur every pixel clock cycle.

Tables 2 through 10 and FIGS. 3 through 6 (implemented by the current_phase[2:0], de_out, and push outputs of color sequencer 134) define the process of assembling fragments into pixels or blanking characters. In response to the current_phase[2:0] bits from color sequencer 134, multiplexing circuitry 152 within unpacker 136 selects N bits defined by Tables 2 through 5 for each color component (where 3N=24, 30, 36, or 48) from one or both of the assembly buffer registers 150, 151 for output to the FIFO 154 during the link clock cycles that complete new pixels or blanking characters (indicated by "push"=1). For each group of size of F fragments, there will be F writes to assembly buffer registers and F-1 writes to the FIFO, all at link clock rate.

For example, while unpacking pixels in the 10-bit color mode (for each of three color components, in parallel):

during the 10P0 state, fragment 10P0 is written to the second assembly register 151, the previous contents of register 151 are moved to register 150 and no data is pushed into the FIFO;

during the 10P1 state, fragment 10P1 is written to the second assembly register 151, the previous contents of register 151 are moved to register 150 and 8 bits from the first register 150 plus 2 bits from the second register 151 are used to recover pixel "A", which is pushed into FIFO 154;

during the 10P2 state, fragment 10P2 is written to the second assembly register 151, the previous contents of register 151 are moved to register 150 and 6 bits from the first register 150 plus 4 bits from the second register 151 are used to recover pixel "B", which is pushed into FIFO 154;

during the 10P3 state, fragment 10P3 is written to the second assembly register 151, the previous contents of register 151 are moved to register 150 and 4 bits from the first register 150 plus 6 bits from the second register 151 are used to recover pixel "C", which is pushed into FIFO 154; and during the 10P4 state, fragment 10P4 is written to the second assembly register 151, the previous contents of register 151 are moved to register 150 and 2 bits from the first register 150 plus 8 bits from the second register 151 are used to recover pixel "D", which is pushed into FIFO 154.

Unpacked pixels or blanking characters (HS, VS, CTL[0:3]) and DE (DE=1 for pixels, DE=0 for blanking) are read out of FIFO 154 at the pixel clock rate determined by the PCK clock divider 142. In some modes of some implementations, the pixel clock may be divided by two (relative to its rate in other modes), and two pixels (even and odd) read out of FIFO 154 per pixel clock cycle, provided that FIFO 154 is wide enough to deliver two pixels per pixel clock cycle.

As shown in FIG. 9, clock PLL 140 recovers the transmitted link clock TCK from the link's clock channel, and generates a stabilized version ("lck") of the recovered link clock (and phase shifted versions thereof). Specifically, PLL 140 generates a multi-phase clock set, which is a set of L clocks, each having the link clock frequency (or an integer multiple thereof, as described below with reference to FIGS. 10-13) and each having a different phase $\phi_m$ that satisfies $\phi_m = \phi_{offset} + 2\pi(m/L) + \Delta\phi_m$ where the index "m" is a non-negative integer in the range $\{0, \ldots, L-1\}$, and $\Delta\phi_m$ is an error term. Typically $\Delta\phi_m$ is much smaller than the phase increment $2\pi/L$, and the multi-phase clock set is generated to approximate (as closely as is practical) an ideal multi-phase clock set consisting of L clocks, each having the link clock frequency and each having a different phase $\phi_m = \phi_{offset} + 2\pi(m/L)$. In response to this multi-phase clock set, circuitry 144 performs the above-described operations of de-serializing the video data received over the link, decoding the de-serialized 10-bit TMDS code words to recover 8-bit code words, and asserting the 8-bit code words to delay pipeline 146.

Clock divider 142 performs a frequency dividing operation to recover the pixel clock ("pck") from the stabilized recovered link clock "lck" (and other members of the multi-phase clock set) asserted thereto by PLL 140. Clock divider 142 can include the circuitry shown in FIGS. 10 and 12 (to be described below). Alternatively, clock divider 142 can be implemented as a PLL, in which case receiver 130 would include two PLLs (PLL 140 and the PLL that implements clock divider 142). However, such alternative embodiments are typically more expensive to implement those in which clock divider 142 employs logic circuitry (e.g., the logic shown in FIGS. 10 and 12) to recover a pixel clock from a recovered link clock or a stabilized version of a recovered link clock.

LCM decoding logic 131 receives the control bits CTL0, CTL1, and DE output from circuitry 144. Logic 131 also receives two control bits (i2c_Np[1:0]) that determine the above-described noise filter value, Np, for use in filtering link control messages LCM[5:0] determined by the control bits CTL0 and CTL1. Logic 131 identifies each message LCM[0:5] determined by a sequence of the bit pairs CTL0, CTL1 and performs the above-described filtering operation to determine whether the message is valid. Logic 131 asserts the following output bits to LCM filter 132:

color_lcm[1:0], which indicate the value of the color depth link control message most recently determined to be valid (e.g., color_lcm[1:0]=00, 01, 10, and 11 indicate respectively that the receiver should operate in the 8-bit, 10-bit, 12-bit, or 16-bit color mode;

got_color_lcm (which goes high for one link clock cycle when a new color depth link control message is decoded);

got_phase_lcm (which goes high for one link clock cycle when a new packing phase link control message is decoded); and phase_lcm[1:0], which indicate the value of the packing phase link control message most recently determined to be valid.

LCM filter 132 receives the bits that are output from logic 131, the DE bit output from circuitry 144, and eight control bits (i2c_Nm[7:0]) that determine the above-described noise filter threshold value, Nm, for use in filtering color depth link control messages determined by the bits "color_lcm[1:0]" and packing phase link control messages determined by the bits "phase_lcm[1:0]".

Preferably the bits "i2c_Np[1:0]" are asserted to decoding logic 131, and the bits "i2c_Nm[7:0]" are asserted to filter 132 over a conventional I2C link from a microcontroller that can be configured or programmed by a user to specify the noise filter value, Np, and the noise filter threshold value, Nm.

Color sequencer 134 implements a state machine to determine the sequence of unpacking states in which receiver 130 operates and also captures the phase of the last fragment of video data received before the start of blanking. Sequencer 134 asserts the bits "capture_phase[2:0]" to filter 132 to indicate the phase of the fragment of video data captured by receiver 130 at the most recent falling edge of DE, and asserts the bits "current_phase[2:0]" to filter 132 to indicate the unpacking phase that unpacker 136 should use to reassemble the fragments into pixel or blanking data (per Tables 2 through 10 and FIGS. 3 through 6).

LCM filter 132 filters the link control messages determined by bits color_lcm[1:0] and phase_lcm[1:0]. LCM filter 132 includes the above-described "Last Color Mode Message Counter" and "Phase Error counter" (each preferably implemented as an 8-bit counter). For example, the output of filter 132 does not cause receiver 130 to change its color mode unless the count of the Last Color Mode Message Counter is equal to or greater than the noise filter threshold value, Nm.

LCM filter 132 asserts the following output bits to color sequencer 134:

color_depth[1:0], indicating the current color depth parameter ("N") for receiver 130. Each new value of color_depth[1:0] triggers a color mode change (filter 132 also asserts the color_depth[1:0] bits to unpacker 136 and clock divider 142 to determine the color mode in which unpacker 136 and clock divider 142 operate); and phase_delta[2:0], called "Phase Offset" in the description above. A non-zero value of phase_delta[2:0] triggers a phase adjustment of the unpacking state machine to match the transmitter's packing sequence.

In a typical implementation, the color_depth[1:0] bits default to a value that determines 8-bit mode operation if no color depth link control message or packing phase link control message is decoded for a programmable, predetermined number of blanking intervals.

Color sequencer 134 implements an unpacking state machine for each supported N-bit color mode (i.e., a state machine for each value of N as in FIGS. 3 through 6, determined by control bits color_depth[1:0]), although only one such state machine is active at any time.

The "de_out" bit output from color sequencer 134 is derived from state values.

In addition to the above-mentioned bits output from color sequencer 134, the color sequencer outputs to unpacker 136 a "push" bit indicating whether unpacker 136 should clock a new set of bits from delay pipeline into the FIFO buffer within unpacker 136.

In typical implementations of color sequencer 134:
in 8-bit mode operation, the phase_delta[2:0] bits from filter 132 are ignored; and
in N-bit mode operation (where N≠8), a non-zero value of phase_delta[2:0] triggers a resynchronization by subtracting (modulo the pixel group size G) the phase_delta[2:0] value from a control word that indicates the next state of the currently active state machine. Alternatively, color sequencer 134 always loads a non-zero value of phase_delta[2:0] into a Y-bit phase counter, where Y is the number of bits representing phase in the currently active state machine. Every time the state machine passes through a zero phase state it freezes and increments the phase counter until the phase counter reaches zero. At this point the state machine's phase should be correctly set and the state machine is unfrozen.

As described, receiver 130 of FIG. 9 is implemented to receive conventional TMDS-encoded video data from a serial link (e.g., a DVI link) and decode the received TMDS code words to generate 24-bit video data (e.g., 24-bit pixels, each comprising an 8-bit Red component, an 8-bit Green component, and an 8-bit Blue component). The receiver is also operable in accordance with the invention in any of the following modes (the specific mode is determined by color mode data received over the link):

a 30-bit pixel mode in which it receives TMDS-encoded video data from the link and decodes the received TMDS code words and unpacks the decoded bits to generate 30-bit video data (each pixel of which consists of a 10-bit Red component, a 10-bit Green component, and a 10-bit Blue component);

a 36-bit pixel mode in which it receives TMDS-encoded video data from the link and decodes the received TMDS code words and unpacks the decoded bits to generate 36-bit video data (each pixel of which consists of a 12-bit Red component, a 12-bit Green component, and a 12-bit Blue component); and a 48-bit pixel mode in which it receives TMDS-encoded video data from the link and decodes the received TMDS code words and unpacks the decoded bits to generate 48-bit video data (each pixel of which consists of a 16-bit Red component, a 16-bit Green component, and a 16-bit Blue component).

A variation on receiver 130 is also operable in accordance with the invention in the following mode (with its specific operating mode determined by color mode data received over the link):

an 18-bit pixel mode in which it receives TMDS-encoded video data from the link and decodes the received TMDS code words and generates from the decoded bits 36-bit video data (each pixel of which consists of a 12-bit Red component, a 12-bit Green component, and a 12-bit Blue component) which are further unpacked by dividing the 36 bits into even and odd pairs of 18-bit video data (each pixel of which consists of an even and odd 6-bit Red component, an even and odd 6-bit Green component, and an even and odd 6-bit Blue component). The 36 bit pixel rate clock can be divided in half to obtain the 18 bit pixel rate clock.

In the N-bit mode of operation of receiver 130 (in which three N-bit color components are clocked out of unpacker 136 per pixel clock cycle), the frequency of the pixel clock "pck" generated by clock divider 142 is (8/N)=L, where L is the frequency of the recovered link clock "lck."

Figure 10:
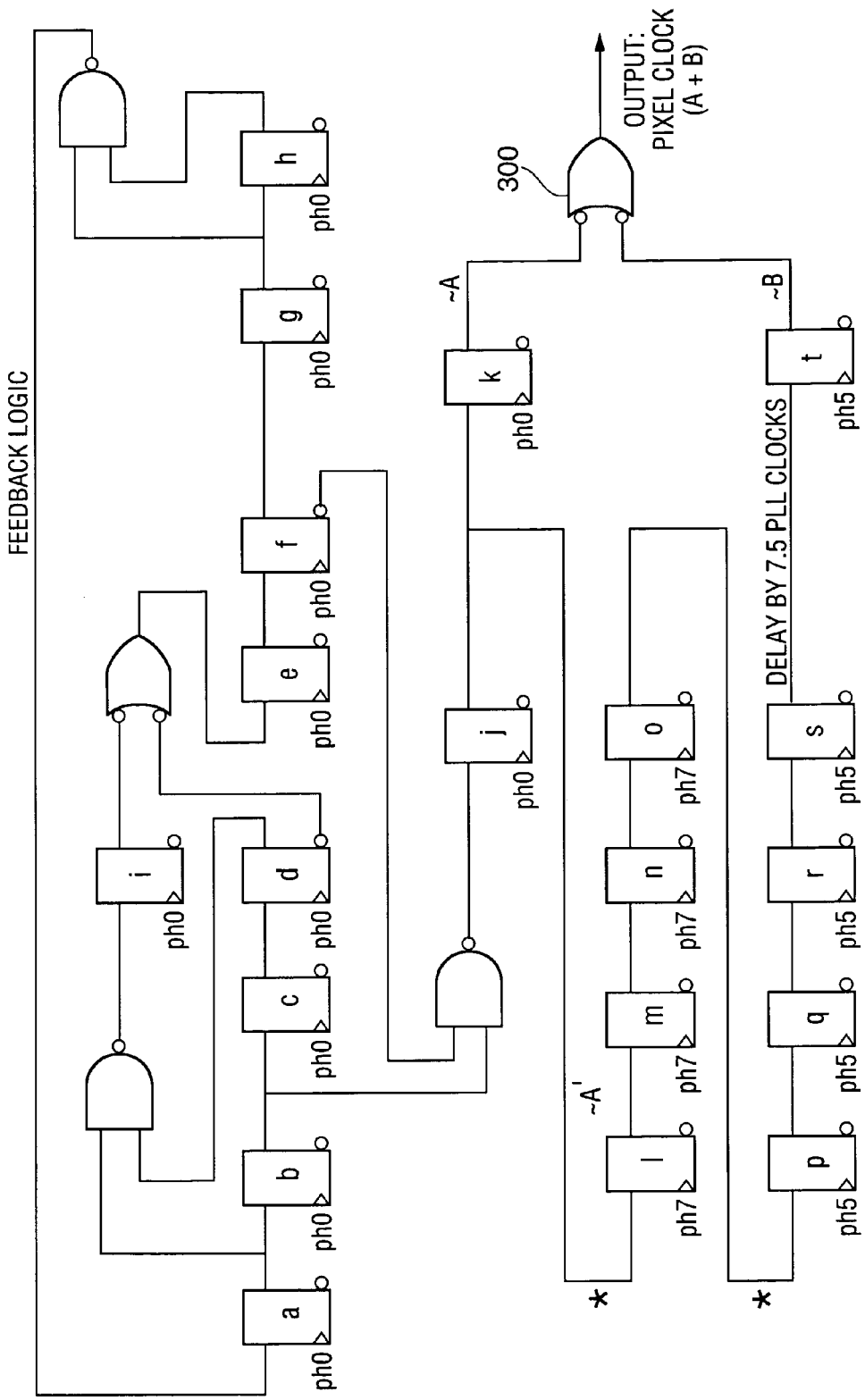
FIG. 10 is a block diagram of a circuit for use in the clock divider of the FIG. 9 receiver.
Figure 11:
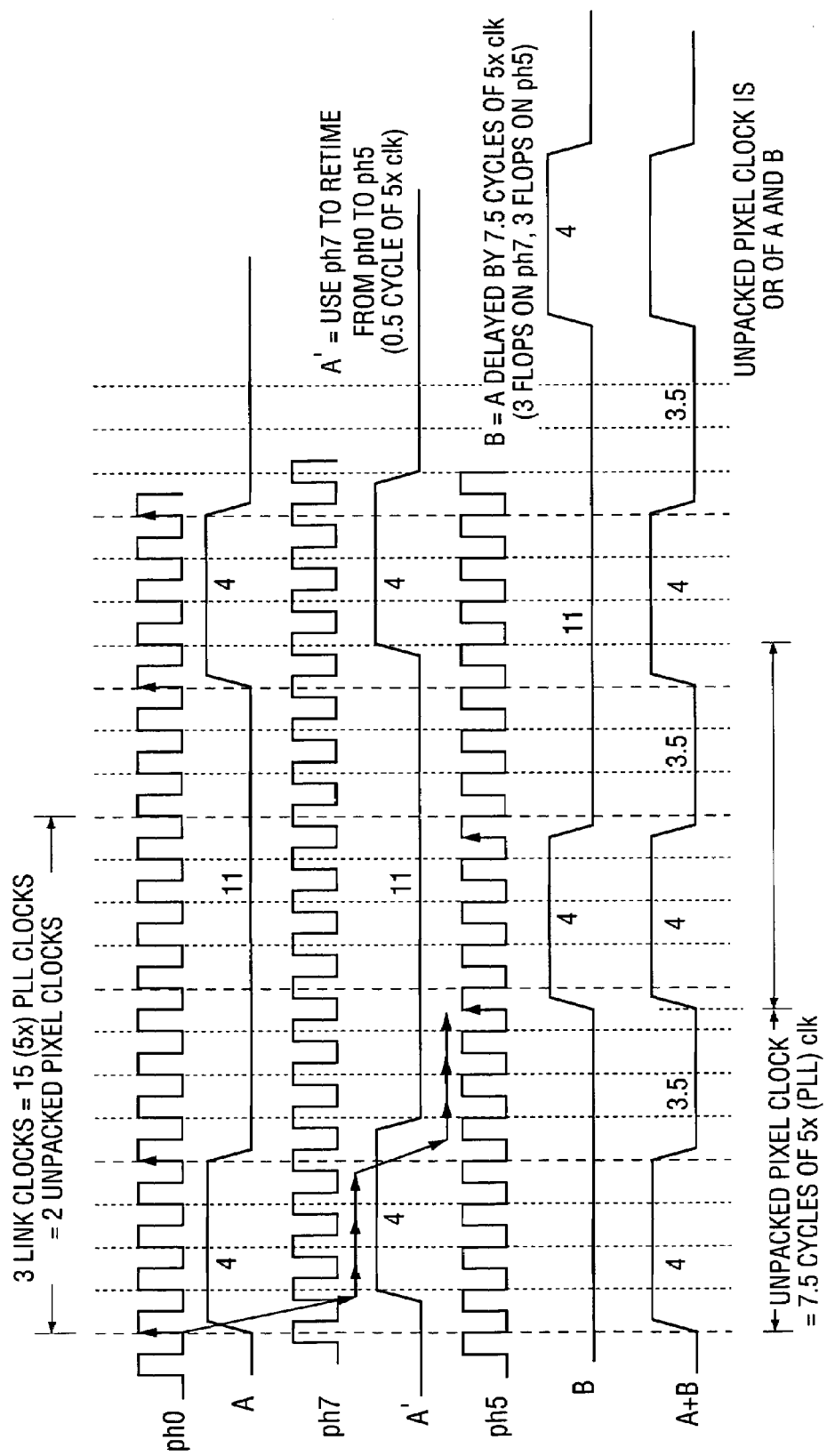
FIG. 11 is a timing diagram of signals received and generated by the FIG. 10 circuit.

FIG. 10 is a block diagram of a circuit for use in a preferred implementation of clock divider 142 of receiver 130 of FIG. 9, during 12-bit mode of operation (in which three 12-bit color components are clocked out of unpacker 136 each pixel clock cycle). FIG. 11 is a timing diagram of signals received and generated by the FIG. 10 circuit. A preferred implementation of clock PLL 140 outputs a multi-phase clock set, as described previously. Specifically, in the preferred implementation, PLL 140 generates a multi-phase clock set, which is a set of 10 clocks, each having a phase increment $2\pi/10$ and a frequency equal to 5 times the link clock rate.

Phases 0, 5 and 7 of the multi-phase clock set are used as inputs ph0, ph5 and ph7 to the clock divider 142. The phase of clock ph0 corresponds to that of the recovered link clock "lck,", phase of clock ph5 corresponds to that of ph0 plus $2\pi(5/10)$, and the phase of clock ph7 corresponds to that of ph0 plus $2\pi(7/10)$. In the 12-bit operating mode, two cycles of the desired pixel clock "pck" should equal three cycles of the link clock. Three cycles of the link clock are 15 cycles of the 5 × clock outputs from the PLL 140.

In the 12-bit operating mode, the clock divider 142 (including the FIG. 10 circuit) first generates the complement of waveform "A" in FIG. 11 by using a Johnson counter (well known to practitioners of the art) consisting of flip-flops "a" through "i" plus one feedback gate (driving flip-flop "a") and two initialization gates (connected to flip-flop "i"), as shown in FIG. 10. The NAND gate that drives flip-flop "j" is connected to tap points driven by flip-flops "b" and "f". The tap point is designed such that waveform "A" will be high for 4 cycles and low for 11 cycles of the ph0 clock. Therefore, "A" has a period of 15 ph0 clocks or 3 link clocks or 2 pixel clocks.

Flip-flops "l" through "s" delay the complement of waveform "A" by 7.5 ph0 clocks to produce the complement of waveform "B". This fractional delay is accomplished by using ph7 and ph5 to clock the delay flip-flops; ph7 (input to flip-flop "l") provides a 0.7 cycle delay from ph0 (output of flip-flop "j"), and ph5 (input to flip-flop "p") provides a 0.8 cycle delay from ph7 (output of flip-flop "o"), together, they provide 1.5 cycles delay; the other named flip-flops provide the remaining 6 cycles of delay.

The final negative input OR function 300 (driven by flip-flops "k" and "t") combines the complements of waveforms "A" and "B" to produce the desired pixel clock (signal "A+B"), which has a period of 7.5 ph0 clocks or 1.5 ($7 \cdot 5/5$) link clocks. The resulting waveform is high for 4 ph0 cycles and low for 3.5 ph0 cycles. The signal (A+B) is the pixel clock "pck" which has frequency (L/1.5), where L is the link clock frequency.

Figure 12:
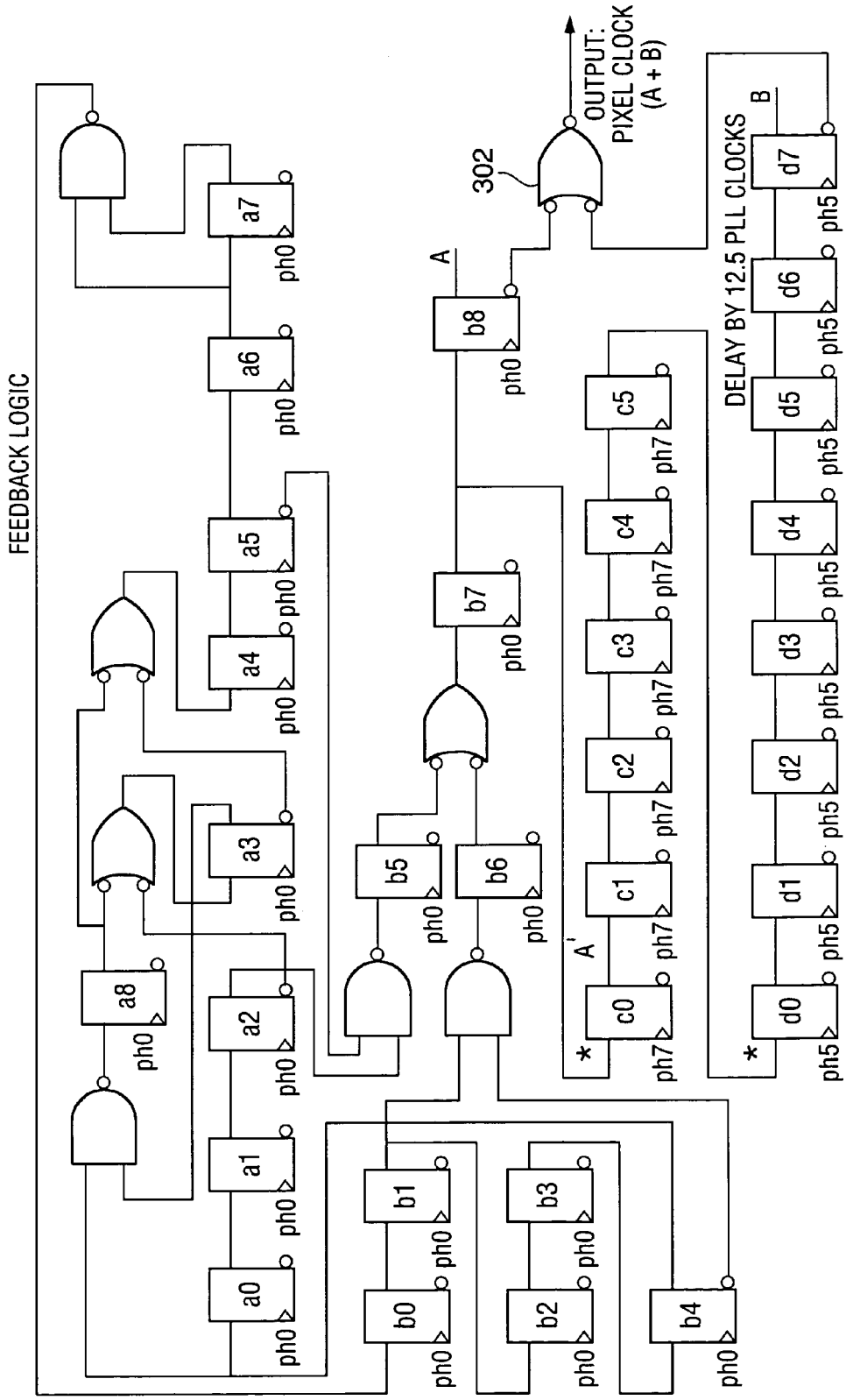
FIG. 12 is a block diagram of another circuit for use in the clock divider of the FIG. 9 receiver.
Figure 13:
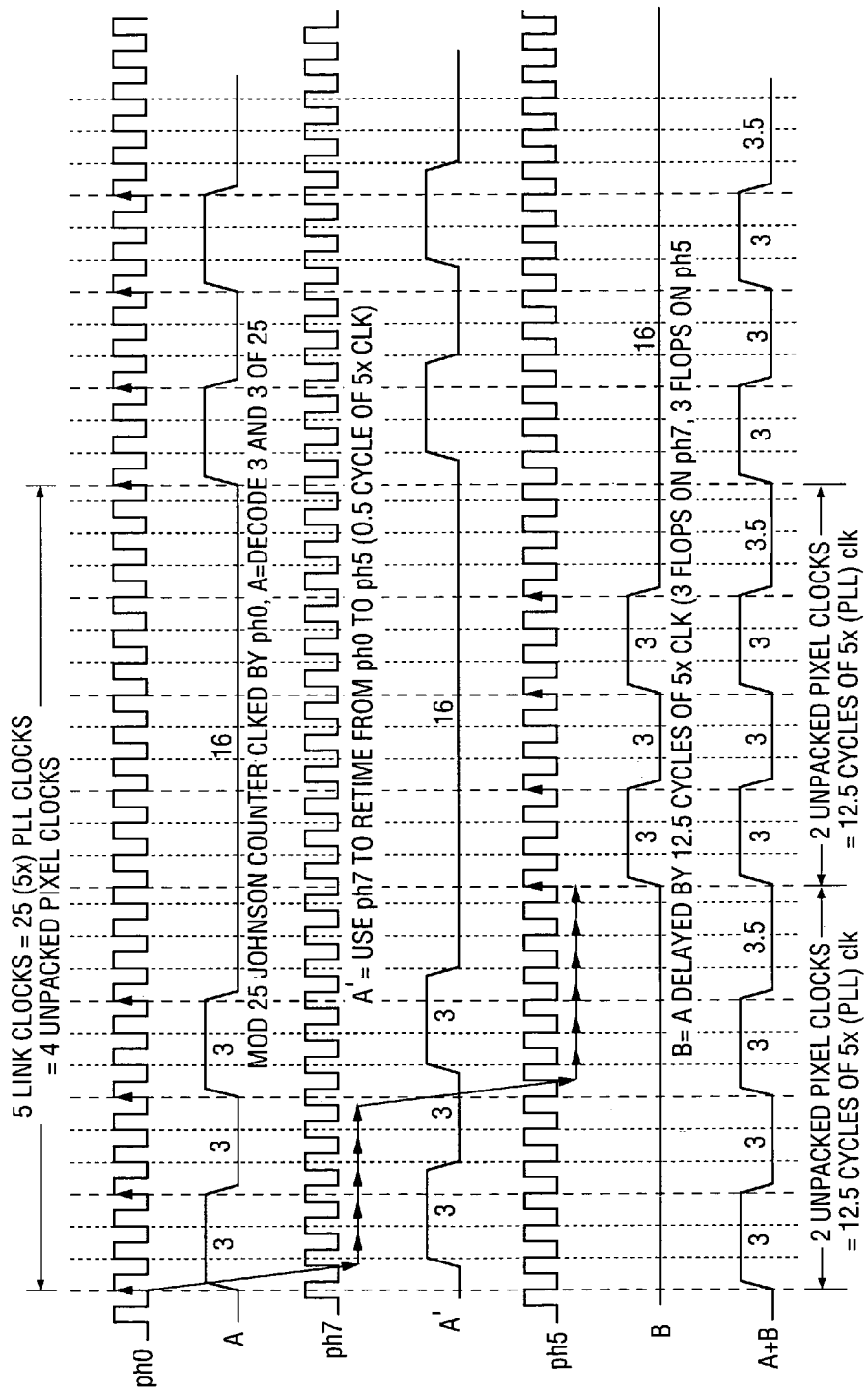
FIG. 13 is a timing diagram of signals received and generated by the FIG. 12 circuit.

FIG. 12 is a block diagram of a circuit for use in a preferred implementation of clock divider 142 of receiver 130 of FIG. 9, during 10-bit mode of operation (in which three 10-bit color components are clocked out of unpacker 136 each pixel clock cycle). FIG. 13 is a timing diagram of signals received and generated by the FIG. 12 circuit. In the 10-bit operating mode, the frequency of the pixel clock "pck" generated by clock divider 142 is (8/10)L=(L/1.25). A preferred implementation of clock PLL 140 outputs a multi-phase clock set, each clock in the set having one of 10 different phases and a frequency equal to 5 times the link clock rate. Phases 0, 5 and 7 of the multi-phase clock set are used as inputs ph0, ph5 and ph7 to the clock divider 142. In the 10-bit operating mode, four cycles of the desired pixel clock "pck" should equal five cycles of the link clock. Five cycles of the link clock are 25 cycles of the 5× clock outputs from the PLL 140.

In the 10-bit mode, clock divider 142 (including the FIG. 12 circuit) first generates waveform "A" in FIG. 13 by using a Johnson counter (well known to practitioners of the art) consisting of flip-flops "a0" through "a8" and "b0" through "b4" plus one feedback gate (driving flip-flop "b0") and three initialization gates (connected to flip-flop "a8"), shown in FIG. 12. The NAND gate that drives flip-flop "b5" is connected to tap points driven by flip-flops "a2" and "a5", producing a first pulse that is high for 3 cycles of ph0 and low for 22 cycles. The NAND gate that drives flip-flop "b6" is connected to tap points driven by flip-flops "b1" and "b4", producing a second pulse that is high for 3 cycles of ph0 and low for 22 cycles that lags the first pulse by 6 cycles. The negative input OR gate that drives "b7" combines the first and second pulse to obtain the complex waveform "A", which has a period of 25 ph0 cycles or 5 link clocks or 4 pixel clocks.

Similarly to the 12-bit mode divider described above, flip-flops "c0" through "c5" and "d0" through "d6" delay the waveform "A" by 12.5 ph0 clocks to produce the waveform "B". This fractional delay is accomplished by using ph7 and ph5 and the previously described technique.

The final negative input OR function 302 (driven by flip-flops "b8" and "d7") combines the waveforms "A" and "B" to produce the desired pixel clock (the signal "A+B" shown in each of FIGS. 12 and 13), which cycles 4 times per 25 ph0 cycles (or 5 link clocks). The resulting waveform is high for 3 ph0 cycles and low for 3 (sometimes 3.5) ph0 cycles. The signal (A+B) is the pixel clock "pck" which has frequency (L/1.25), where L is the link clock frequency.

The advantage of the fractional clock divider designs of FIGS. 10 through 13 is that they require less die area than the conventional PLL based frequency divider approach and do not require area or critical design for PLL phase detectors, loop filters and VCOs, using just a few flip-flops and gates.

The general principle of the clock divider designs of FIGS. 10 through 13 is to take advantage of the fastest available clock signal related to the link clock. Typically a clock set having M phases, and frequency equal to N times the link rate (where M and N are integers, M typically even), is required for the operation of deserializer 144 (shown in FIG. 9). Such a clock defines M*N subdivisions of the link clock. In the preferred embodiment, M=10 and N=5, providing up to 50 subdivisions of the link clock period. Other embodiments may have N=10 and M greater than or equal to 2, providing at least 20 subdivisions. Preferred embodiments of the invention define a waveform (in the described embodiments this is accomplished by using Johnson counters) using the available subdivision points of the link clock period, and phase shifts and combines (e.g., using an OR or NOR gate) two or more copies of the waveform using the available subdivision points, to produce a pixel clock that exactly (or sufficiently accurately) provides the required fractional ratio to the link clock (which is required by the unpacking system, e.g., that of FIG. 9). The pixel clock duty cycle is either exactly 50% or a very close approximation of 50%, depending on the number of available subdivisions (M*N) and the required clock ratio. More subdivisions improve the approximation or result in an exact pixel clock.

In some embodiments, the inventive transmitter transmits N-bit video over a serial link configured to transmit encoded K-bit words of video data. In such embodiments, the transmitter comprises: a subsystem operable in at least one N-bit mode to pack a sequence of N-bit words of video data into a sequence of fragments, where N≠K and each of the fragments consists of K bits of the video data; and circuitry coupled to the subsystem and having at least one output configured to be coupled to the serial link, wherein the circuitry is configured to generate a sequence of encoded fragments by encoding each fragment in the sequence of fragments and to assert the sequence of encoded fragments to the at least one output, whereby the encoded fragments can be transmitted over the link when said link is coupled to the at least one output. Preferably, the sequence of encoded fragments is a sequence of groups of M encoded fragments, where M=N/D, D is the greatest common divisor of N and K, the N-bit words of video data are asserted to the subsystem at a first rate equal to P of the N-bit words per unit time, and the circuitry is configured to assert the sequence of encoded fragments to the at least one output at a second rate that is at least substantially equal to (N/K)P of the encoded fragments per unit time. Also preferably, the transmitter is configured to execute state sequences, each consisting of M states (e.g., the states described above with reference to FIGS. 4-6), during operation in each N-bit mode. The state sequences include: active video interval sequences (e.g., a sequence of states 10P0 through 10P4 in FIG. 4), wherein M of the encoded fragments are asserted to the at least one output during each of the active video interval sequences; blanking interval sequences (e.g., a sequence of states 10C0 through 10C4 in FIG. 4), wherein M blanking characters is asserted to the at least one output during each of the blanking interval sequences, and one of said M blanking characters is identical to another one of said M blanking characters; active video to blanking transitional sequences (e.g., a sequence of states 10P1, 10PC2, 10PC3, 10PC4, and 10C1 in FIG. 4), wherein one of the encoded fragments is asserted to the at least one output during a first state of each of the active video to blanking transitional sequences and a last state of each of the active video to blanking transitional sequences occurs in a blanking interval; and blanking to active video transitional sequences (e.g., a sequence of states 10C0, 10P1, 10P2, 10P3, and 10P4 in FIG. 4), wherein one of the encoded fragments is asserted to the at least one output during a last state of each of the blanking to active video transitional sequences and a first state of each of the blanking to active video transitional sequences occurs in a blanking interval, and wherein the transmitter is configured to assert the sequence of encoded fragments to the at least one output without omitting assertion of any encoded fragment thereof by executing (completely or partially) a sufficient number of state sequence cycles, each of the state sequence cycles including any number of the active video interval sequences, followed by one of the active video to blanking transitional sequences, followed by a number of the blanking interval sequences, followed by one of the blanking to active video transitional sequences.

In some embodiments of the inventive transmitter (e.g., embodiments in which transmitter 201 or transceiver 205 of FIG. 2 is implemented as a HDMI-compliant transmitter), the transmitter is operable to send encoded video data words (e.g., 8-bit video data words, each encoded using the TMDS encoding algorithm as a 10-bit, transition-minimized code word) over at least one video channel of a TMDS link (or other TMDS-like link having at least one channel for transmitting serial video) during active video intervals. During portions of blanking intervals (e.g., data islands) between the active video intervals, packets including (containing) encoded packing phase data and/or encoded color mode data (and optionally also other encoded data) are transmitted over at least one video channel of the link. During each data island, at least one packet containing encoded data is transmitted. In some embodiments, all encoded data contained in each packet is encoded as a sequence of 10-bit, TMDS transition-minimized code words. During periods (e.g., control data periods) between the active video intervals and data islands, some such transmitters send control words (each encoded as a 10-bit, transition-maximized code word indicative of two control bits: CTL0 and CTL1, or CTL2 and CTL3) and sync words (each encoded as a 10-bit, transition-maximized code word indicative of two sync bits: HSYNC and VSYNC) over the video channels. During each active video interval, HSYNC, VSYNC, CTL0, CTL1, CTL2, and CTL3 are assumed by the receiver to maintain the values that they had when the active video interval started.

In HDMI-compliant embodiments, transition-minimized code words indicative of HSYNC and VSYNC bits are sent (e.g., one code word per link clock cycle, each word indicative of an HSYNC bit, a VSYNC bit, a packet header bit, and at least one other bit) over one channel (CH0) of a TMDS link during each data island.

In HDMI-compliant embodiments, each packet has a 32-bit packet header and four sub-packets (each consisting of 64 bits). Each subpacket includes 56 data bits followed by 8 BCH parity bits. Nine data bits of a packet are transmitted per link clock cycle. In accordance with some embodiments of the invention, an HDMI-compliant transmitter transmits packets containing encoded packing phase data and/or encoded color mode data over each of at least some of the data channels of a TMDS link during data islands. During active video intervals, TMDS code words indicative of packets of encoded video data are transmitted over the link (e.g., in the same manner described above with reference to other embodiments of the invention).

In a class of embodiments in which no explicit packing phase data are transmitted to a receiver (i.e., embodiments in which no messages indicative of packing phase data are transmitted during blanking intervals), packing phase data can be indicated implicitly to a receiver by restricting the total video (pixels plus blanking) words per line to be an integer multiple of the packing group size (G video words). This restriction may be acceptable in some applications. In this special case, the phase at the checkpoint (e.g., the first or last pixel fragment in each line) does not change from line to line (assuming that the total characters per line is constant), and can be fixed in the design of the transmitter and receiver state machines, eliminating the need for communication of phase via link messages (or other explicitly transmitted packing phase data). For example, a transmitter could start each line by transmitting a fragment having phase 0 (e.g., state 10P0 in the 10-bit mode), and the receiver can know the start of line by observing the rising edge of DE and can adjust its starting phase to phase 0, without the need for a phase message, as the phase is implied by DE. In such implementations, the transmitter (operating in each N-bit mode in which it packs a sequence of N-bit words of video data into a sequence of fragments, where N≠K and each of the fragments consists of K bits of the video data) always transmits a fragment (of an M-fragment group, where M=N/D, and D is the greatest common divisor of N and K) of the video data which has fixed, predetermined phase (within the M-fragment group) at each checkpoint (e.g., at the start or the end of each active video interval). Such embodiments support arbitrary pixel counts (number of fragments transmitted) and blanking counts (number of blanking characters transmitted) per horizontal line of transmitted video data, provided that the total (pixel plus blanking) count per line is constant and constrained to be an integer multiple of the pixel group size (i.e., the total number of fragments plus blanking characters transmitted per horizontal line is constrained to be X*M, where X is an integer).

In another class of embodiments in which no explicit packing phase data are transmitted to a receiver, packing phase data can be indicated implicitly to a receiver by implementing the transmitter such that the transmitter (operating in each N-bit mode in which it packs a sequence of N-bit words of video data into a sequence of fragments, where N≠K and each of the fragments consists of K bits of the video data) always restarts the packing sequence at each checkpoint (e.g., at the start of each active video interval). For example, this can be done by configuring the transmitter to implement the state diagram of FIG. 14 (and the receiver to implement that of FIG. 15), both of which assume operation in a 10-bit mode.

Figure 14:
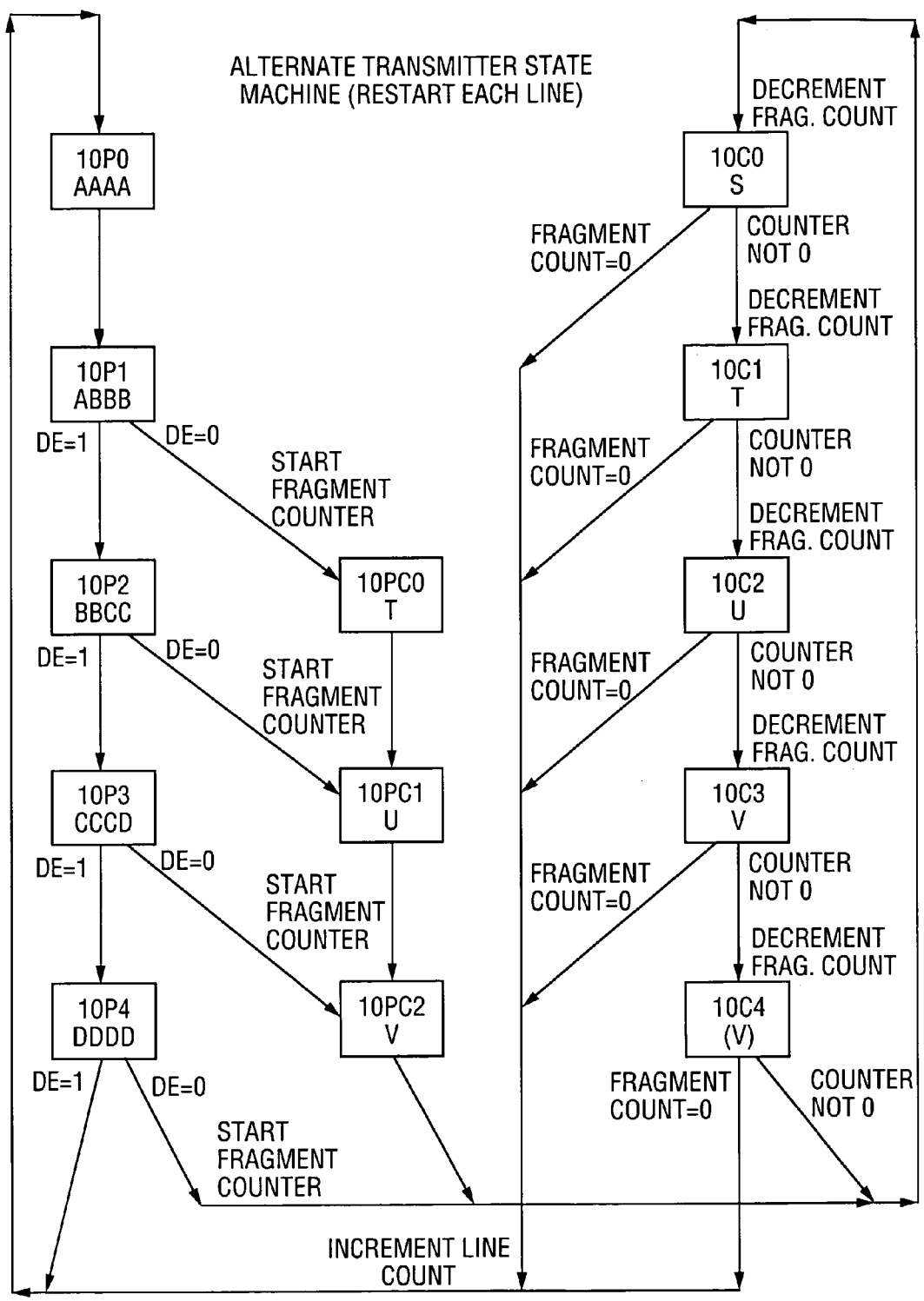
FIG. 14 is a state diagram of 10-bit mode operation of an embodiment of the inventive transmitter that restarts the packing phase at the start of each line, implying the packing phase.

The transmitter state diagram of FIG. 14 shows one implementation of this alternate approach of restarting packing at the beginning of each line. The pixel packing states 10P0 through 10P4 are the same sequence used previously in FIG. 4 and again refer to the fragments defined in Table 3.

The transition states 10PC0 through 10PC3 and the blanking states 10C0 through 10C4 are similar to FIG. 4, with the following modifications:

Upon entry into the blanking period (DE changes to 0), a fragment counter is started. This occurs on one of the following transitions (depending on the active pixel count per line): 10P1 to 10PC2, 10P2 to 10PC3, 10P3 to 10PC4, or 10P4 to 10C0;

The fragment counter is started at an initial count that is derived from the horizontal blanking period (described below) and modified based on the current line count;

As the blanking period progresses (including a possible initial transition period through none of more of the 10PCn states, eventually looping through the 10Cn states), the fragment counter counts down once per link clock;

Whenever the fragment counter becomes zero (in one of the 10Cn states), the next state is forced to 10P0, starting the next line at phase 0, regardless of the ending phase of the blanking period; and A line counter is incremented at the start of each line (entering 10P0 from one of the 10Cn states). This counter counts modulo G (the packing group size in pixels).

The blanking period is fixed in the pixel clock domain, but will, in general, vary by one cycle in the link clock domain, depending on the video timing active and blanking pixel counts. In order to correctly recover the video (pixel and blanking) characters at the correct pixel clock rate when the link clock rate is (N/K) times the pixel clock rate, the average blanking period in link clocks (HBL) must be HBP*(N/K), where HBP is the blanking count in pixels, N is the pixel word size (10 bits in this example) and K the link fragment size (8 bits in this example). For a timing such as the 480p CEA-861 digital television standard, HBP=138, and HBL will be 172.5 for this 10-bit mode example. For every G lines, if half of the lines have 172 fragments and half have 173 fragments, the correct average is obtained. The blanking period width will appear to vary in the link clock domain, but will be constant when recovered to the pixel clock domain.

The correct blanking duration is obtained in the link clock domain by initializing the fragment counter (mentioned above) on entry into the blanking period with either HBL rounded down or HBL rounded up (to the nearest integer; in this example 172 or 173). If the fractional part of HBL is called FHBL, HBL must be rounded up FHBL*G lines in every G lines. The mod G line counter and a register containing FHBL are used to control whether HBL rounded up or down is loaded as the start value to the fragment counter.

Figure 15:
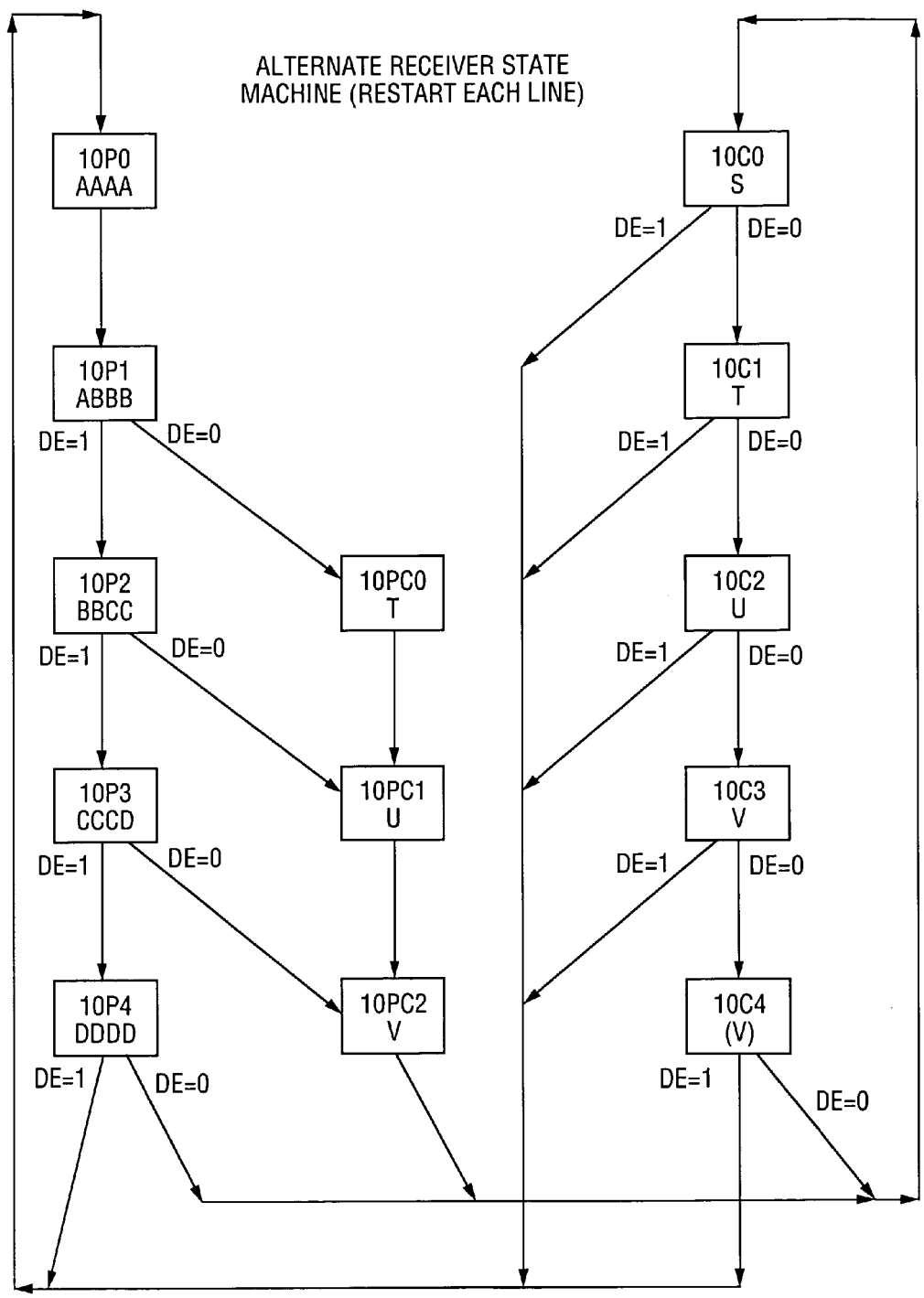
FIG. 15 is a state diagram of 10-bit mode operation of an embodiment of the inventive receiver that corresponds to the transmitter of FIG. 14.

The receiver state diagram of FIG. 15 shows one implementation of receiver corresponding to the transmitter of FIG. 14. The sequence is the same as in FIG. 4, with the following modification:

Whenever the DE becomes one (in one of the 10Cn states), the next state is forced to 10P0, starting the next line at phase 0, regardless of the ending phase of the blanking period.

A receiver that implements the FIG. 15 state diagram will correctly track the transmitter of FIG. 14 without requiring link phase messages (the earlier described explicit phase approach), by using the agreed rule that a DE=0 to DE=1 transition must always cause the transmitter and receiver to go to phase 0 (10P0).

In another class of embodiments that use the transmitter and receiver state diagrams of FIGS. 4 through 6, a different method can be used to communicate the transmitter phase to the receiver that avoids explicit phase messages. In each of these state diagrams, the final phase of the blanking loop (10C4 in FIG. 4, 12C2 in FIG. 5 and 16C1 in FIG. 6) is a repetition of the fragment transmitted in the previous state. In common video timings, the blanking codes change very slowly (not more than three different values per blanking interval) relative to the blanking interval duration (typically hundreds of pixel clock cycles or more). In these embodiments, the transmitter uses the repeated fragment (10C4 in FIG. 4, 12C2 in FIG. 5 and 16C1 in FIG. 6) to send the complement of the sync code sent in the preceding fragment (for example if HS=1 is sent during one link clock cycle during a blanking interval, the transmitter sends HS=0 during the next link clock cycle). When (as is typical) the sync code changes very slowly compared to the fragment group rate, the receiver can low pass filter the received sync codes to estimate the intended sync code (for the 10 bit example, 4 out of 5 fragments will tend to be the true sync value with one of 5 being the complement of the sync value) and can determine which of the fragments in the group is the complement of the estimated true sync value. The receiver then knows that the complemented fragment must be phase (F-1) of phases 0 through (F-1). The receiver can use this information to adjust its state machine phase to match the transmitter in the manner already described.

It should be understood that while certain forms of the present invention are illustrated and described herein, the invention is defined by the claims and is not to be limited to the specific embodiments described and shown.

What is claimed is:

1. A transmitter for transmitting N-bit video over a serial link configured to transmit encoded K-bit words of video data, said transmitter comprising:
  a subsystem operable in at least one N-bit mode to pack a sequence of N-bit words of video data into a sequence of fragments, where N≠K and each of the fragments consists of K bits of the video data; and
  circuitry coupled to the subsystem and having at least one output configured to be coupled to the serial link, wherein the circuitry is configured to generate a sequence of encoded fragments by encoding each fragment in the sequence of fragments and to assert the sequence of encoded fragments to the at least one output, whereby the encoded fragments can be transmitted over the link when said link is coupled to the at least one output, wherein the sequence of encoded fragments is a sequence of groups of the encoded fragments, each of the groups determines a different one of the N-bit words of video data, and the circuitry is configured to assert the groups sequentially to the at least one output, and wherein the N-bit words of video data are asserted to the subsystem at a first rate equal to P of the N-bit words per unit time and the circuitry is configured to assert the sequence of encoded fragments to the at least one output at a second rate that is at least substantially equal to (N/K)P of the encoded fragments per unit time.

2. The transmitter of claim 1, wherein the sequence of encoded fragments is a sequence of groups of M encoded fragments, where M=N/D, and D is the greatest common divisor of N and K.

3. A transmitter for transmitting N-bit video over a serial link configured to transmit encoded K-bit words of video data, said transmitter comprising:
  a subsystem operable in at least one N-bit mode to pack a sequence of N-bit words of video data into a sequence of fragments, where N≠K and each of the fragments consists of K bits of the video data; and
  circuitry coupled to the subsystem and having at least one output configured to be coupled to the serial link, wherein the circuitry is configured to generate a sequence of encoded fragments by encoding each fragment in the sequence of fragments and to assert the sequence of encoded fragments to the at least one output, whereby the encoded fragments can be transmitted over the link when said link is coupled to the at least one output,
  wherein the sequence of encoded fragments is a sequence of groups of M encoded fragments, where M=N/D, D is the greatest common divisor of N and K, the N-bit words of video data are asserted to the subsystem at a first rate equal to P of the N-bit words per unit time, and the circuitry is configured to assert the sequence of encoded fragments to the at least one output at a second rate that is at least substantially equal to (N/K)P of the encoded fragments per unit time, and wherein the transmitter is configured to execute state sequences, each consisting of M states, during operation in each said N-bit mode, said state sequences including:
  active video interval sequences, wherein M of the encoded fragments are asserted to the at least one output during each of the active video interval sequences;
  blanking interval sequences, wherein M blanking characters is asserted to the at least one output during each of the blanking interval sequences, and one of said M blanking characters is identical to another one of said M blanking characters;
  active video to blanking transitional sequences, wherein one of the encoded fragments is asserted to the at least one output during a first state of each of the active video to blanking transitional sequences and a last state of each of the active video to blanking transitional sequences occurs in a blanking interval; and
  blanking to active video transitional sequences, wherein one of the encoded fragments is asserted to the at least one output during a last state of each of the blanking to active video transitional sequences and a first state of each of the blanking to active video transitional sequences occurs in a blanking interval, wherein the transmitter is configured to assert the sequence of encoded fragments to the at least one output without omitting assertion of any encoded fragment thereof by executing, completely or partially, a sufficient number of state sequence cycles, each of the state sequence cycles including any number of the active video interval sequences, followed by one of the active video to blanking transitional sequences, followed by a number of the blanking interval sequences, followed by one of the blanking to active video transitional sequences.

4. A transmitter for transmitting N-bit video over a serial link configured to transmit encoded K-bit words of video data, said transmitter comprising:

a subsystem operable in at least one N-bit mode to pack a sequence of N-bit words of video data into a sequence of fragments, where N≠K and each of the fragments consists of K bits of the video data; and circuitry coupled to the subsystem and having at least one output configured to be coupled to the serial link, wherein the circuitry is configured to generate a sequence of encoded fragments by encoding each fragment in the sequence of fragments and to assert the sequence of encoded fragments to the at least one output, whereby the encoded fragments can be transmitted over the link when said link is coupled to the at least one output, wherein the sequence of encoded fragments is a sequence of groups of M encoded fragments, each of the M encoded fragments in each of the groups has a different phase within the group, and the transmitter is configured to assert the encoded fragments to the at least one output during active video intervals and to assert packing phase data to the at least one output during at least some blanking intervals between the active video intervals, wherein the packing phase data indicate the phase of one of the encoded fragments that has been asserted to the at least one output at a known checkpoint.

5. The transmitter of claim 4, wherein the packing phase data asserted during a blanking interval indicate the phase of the last one of the encoded fragments asserted to the at least one output before said blanking interval.

6. The transmitter of claim 5, wherein the circuitry includes encoder circuitry having a first pair of outputs configured to be coupled to a data channel of a transition minimized differential signaling (TMDS) link and a second pair of outputs configured to be coupled to a second data channel of the TMDS link, the encoder circuitry is configured to receive and encode control bits and to assert code words indicative of the encoded control bits to the first pair of outputs and the second pair of outputs, and the transmitter is operable in a message mode in which control bits including packing phase bits are asserted to the encoder circuitry and the encoder circuitry asserts code words indicative of the packing phase bits to the first pair of outputs and the second pair of outputs, wherein said code words indicative of the packing phase bits determine the packing phase data.

7. The transmitter of claim 6, wherein the transmitter is also operable in a second mode in which a sequence of four-bit control words are asserted to the encoder circuitry, each of said control words including a CTL0 bit, a CTL1 bit, a CTL2 bit, and a CTL3 bit, and wherein the control bits asserted to the encoder circuitry in the message mode include a sequence of message mode control words, each of said message mode control words including a CTL0 bit, two of the packing phase bits, and a CTL3 bit.

8. The transmitter of claim 6, wherein K=8, the transmitter is also operable in an 8-bit mode in which the circuitry asserts 10-bit TMDS code words indicative of 8-bit words of the video data to the at least one output during active video intervals at a rate of one 10-bit TMDS code word per cycle of a link clock having frequency P, each of the encoded fragments is a 10-bit TMDS code word, the transmitter is also operable in each said N-bit mode to assert the sequence of encoded fragments to the at least one output during active video intervals at a rate of one encoded fragment per cycle of a second link clock having frequency at least substantially equal to (N/8)P, and the packing phase data are indicated by a sequence of 10-bit TMDS code words asserted to the first pair of outputs and the second pair of outputs during the first X cycles of the second link clock during at least one blanking interval between active video intervals during operation of the transmitter in each said N-bit mode, where X is a predetermined integer.

9. The transmitter of claim 5, wherein the transmitter is configured to assert the encoded fragments to the at least one output during active video intervals and to assert packets including encoded auxiliary data to the at least one output during data islands, wherein each of the data islands is a time interval that neither coincides with nor overlaps any of the active video intervals, the transmitter is also configured to assert control data to the at least one output during control data periods, wherein the control data periods neither coincide with nor overlap any of the data islands and neither coincide with nor overlap any of the active video intervals, and at least one of the packets includes the packing phase data.

10. The transmitter of claim 5, wherein the transmitter is configured to assert color mode data to the at least one output during at least some blanking intervals between active video intervals, wherein the color mode data are indicative of the N-bit mode in which the subsystem is operating.

11. The transmitter of claim 10, wherein the circuitry includes encoder circuitry having a first pair of outputs configured to be coupled to a data channel of a transition minimized differential signaling (TMDS) link and a second pair of outputs configured to be coupled to a second data channel of the TMDS link, the encoder circuitry is configured to receive and encode control bits and to assert code words indicative of the encoded control bits to the first pair of outputs and the second pair of outputs, and the transmitter is operable in a first message mode in which control bits including color mode bits are asserted to the encoder circuitry and the encoder circuitry asserts code words indicative of the color mode bits to the first pair of outputs and the second pair of outputs, wherein said code words indicative of the color mode bits determine the color mode data.

12. The transmitter of claim 11, wherein the transmitter is also operable in a second message mode in which a sequence of second message mode control words are asserted to the encoder circuitry, each of said second message mode control words including a CTL0 bit, a pair of packing phase bits, and a CTL3 bit, and the encoder circuitry asserts code words indicative of the packing phase bits to the first pair of outputs and the second pair of outputs, wherein said code words indicative of the packing phase bits determine the packing phase data, and wherein the control bits asserted to the encoder circuitry in the first message mode include a sequence of four-bit words, each including a CTL0 bit, a pair of the color mode bits, and a CTL3 bit.

13. The transmitter of claim 10, wherein the transmitter is configured to assert the encoded fragments to the at least one output during active video intervals and to assert packets including encoded auxiliary data to the at least one output during data islands, wherein each of the data islands is a time interval that neither coincides with nor overlaps any of the active video intervals, the transmitter is also configured to assert control data to the at least one output during control data periods, wherein the control data periods neither coincide with nor overlap any of the data islands and neither coincide with nor overlap any of the active video intervals, and at least one of the packets includes the color mode data.

14. The transmitter of claim 1, wherein K=8, the transmitter is also operable in an 8-bit mode in which the circuitry asserts Q-bit code words indicative of 8-bit words of the video data to the at least one output during active video intervals at a rate of one Q-bit word per cycle of a link clock having frequency P.

15. The transmitter of claim 14, wherein each of the encoded fragments is a Q-bit code word, and the transmitter is also operable in each said N-bit mode to assert the sequence of encoded fragments to the at least one output during active video intervals at a rate of one encoded fragment per cycle of a second link clock having frequency at least substantially equal to (N/8)P.

16. The transmitter of claim 15, wherein the serial link is a transition minimized differential signaling (TMDS) link and the circuitry is configured to generate a the sequence of encoded fragments by encoding the fragments as 10-bit TMDS code words.

17. A transmitter for transmitting N-bit video over a serial link configured to transmit encoded K-bit words of video data, said transmitter comprising:
a subsystem operable in at least one N-bit mode to rack a sequence of N-bit words of video data into a sequence of fragments, where N≠K and each of the fragments consists of K bits of the video data; and
circuitry coupled to the subsystem and having at least one output configured to be coupled to the serial link, wherein the circuitry is configured to generate a sequence of encoded fragments by encoding each fragment in the sequence of fragments and to assert the sequence of encoded fragments to the at least one output, whereby the encoded fragments can be transmitted over the link when said link is coupled to the at least one output, wherein K=8, the transmitter is also operable in an 8-bit mode in which the circuitry asserts Q-bit code words indicative of 8-bit words of the video data to the at least one output during active video intervals at a rate of one Q-bit word per cycle of a link clock having frequency P, each of the encoded fragments is a Q-bit code word, the transmitter is also operable in each said N-bit mode to assert the sequence of encoded fragments to the at least one output during active video intervals at a rate of one encoded fragment per cycle of a second link clock having frequency at least substantially equal to (N/8)P, and the transmitter is operable in a 10-bit mode in which N=10, the sequence of encoded fragments is a sequence of groups, each said group consists of five of the encoded fragments, and each encoded fragment in each said group has a different phase within the group.

18. The transmitter of claim 17, wherein the subsystem is configured to operate as follows when the transmitter operating in the 10-bit mode enters a blanking interval after asserting a Q-bit code word indicative of a second fragment of a group to the at least one output but before asserting a Q-bit code word indicative of a third fragment of the group to the at least one output:
during a first cycle of the second link clock in the blanking interval, the subsystem enters a first intermediate state;
during a second cycle of the second link clock in the blanking interval, the subsystem enters a second intermediate state;
during a third cycle of the second link clock in the blanking interval, the subsystem enters a third intermediate state;
during a fourth cycle of the second link clock in the blanking interval, the subsystem enters a first blanking state; and
during subsequent cycles of the second link clock in the blanking interval, the subsystem enters a repeating sequence of a second blanking state, a third blanking state, a fourth blanking state, a fifth blanking state, and the first blanking state.

19. The transmitter of claim 18, wherein the subsystem is configured to operate as follows when the transmitter operating in the 10-bit mode enters a blanking interval after asserting a Q-bit code word indicative of a third fragment of a group to the at least one output but before asserting a Q-bit code word indicative of a fourth fragment of the group to the at least one output:
during a first cycle of the second link clock in the blanking interval, the subsystem enters the second intermediate state;
during a second cycle of the second link clock in the blanking interval, the subsystem enters the third intermediate state;
during a third cycle of the second link clock in the blanking interval, the subsystem enters the first blanking state;
during a fourth cycle of the second link clock in the blanking interval, the subsystem enters the second blanking state; and
during subsequent cycles of the second link clock in the blanking interval, the subsystem enters a repeating sequence of the third blanking state, the fourth blanking state, the fifth blanking state, the first blanking state, and the second blanking state.

20. The transmitter of claim 19, wherein the subsystem is configured to operate as follows when the transmitter operating in the 10-bit mode enters a blanking interval after asserting a Q-bit code word indicative of a fourth fragment of a group to the at least one output but before asserting a Q-bit code word indicative of a fifth fragment of the group to the at least one output:
during a first cycle of the second link clock in the blanking interval, the subsystem enters the third intermediate state;
during a second cycle of the second link clock in the blanking interval, the subsystem enters the first blanking state;
during a third cycle of the second link clock in the blanking interval, the subsystem enters the second blanking state;
during a fourth cycle of the second link clock in the blanking interval, the subsystem enters the third blanking state; and
during subsequent cycles of the second link clock in the blanking interval, the subsystem enters a repeating sequence of the fourth blanking state, the fifth blanking state, the first blanking state, the second blanking state, and the third blanking state.

21. The transmitter of claim 20, wherein the transmitter operating in the 10-bit mode is configured to operate as follows when entering an active video interval:
upon entering the active video interval with the subsystem in the fifth blanking state, the circuitry asserts a Q-bit code word indicative of a first fragment of a group to the at least one output during a first cycle of the second link clock in the active video interval;
upon entering the active video interval with the subsystem in the first blanking state, the circuitry asserts a Q-bit code word indicative of a second fragment of a group to the at least one output during a first cycle of the second link clock in the active video interval;

upon entering the active video interval with the subsystem in the second blanking state, the circuitry asserts a Q-bit code word indicative of a third fragment of a group to the at least one output during a first cycle of the second link clock in the active video interval; and upon entering the active video interval with the subsystem in the third blanking state, the circuitry asserts a Q-bit code word indicative of a fourth fragment of a group to the at least one output during a first cycle of the second link clock in the active video interval.

22. A transmitter for transmitting N-bit video over a serial link configured to transmit encoded K-bit words of video data, said transmitter comprising:

a subsystem operable in at least one N-bit mode to pack a sequence of N-bit words of video data into a sequence of fragments, where N≠K and each of the fragments consists of K bits of the video data; and circuitry coupled to the subsystem and having at least one output configured to be coupled to the serial link, wherein the circuitry is configured to generate a sequence of encoded fragments by encoding each fragment in the sequence of fragments and to assert the sequence of encoded fragments to the at least one output, whereby the encoded fragments can be transmitted over the link when said link is coupled to the at least one output, wherein K=8, the transmitter is also operable in an 8-bit mode in which the circuitry asserts Q-bit code words indicative of 8-bit words of the video data to the at least one output during active video intervals at a rate of one Q-bit word per cycle of a link clock having frequency P, each of the encoded fragments is a Q-bit code word, the transmitter is also operable in each said N-bit mode to assert the sequence of encoded fragments to the at least one output during active video intervals at a rate of one encoded fragment per cycle of a second link clock having frequency at least substantially equal to (N/8)P, and the transmitter is operable in a 12-bit mode in which N=12, the sequence of encoded fragments is a sequence of groups, each said group consists of three of the encoded fragments, and each encoded fragment in each said group has a different phase within the group.

23. The transmitter of claim 22, wherein the subsystem is configured to operate as follows when the transmitter operating in the 12-bit mode enters a blanking interval after asserting a Q-bit code word indicative of a second fragment of a group to the at least one output but before asserting a Q-bit code word indicative of a third fragment of the group to the at least one output:

during a first cycle of the second link clock in the blanking interval, the subsystem enters a third blanking state; and during subsequent cycles of the second link clock in the blanking interval, the subsystem enters a repeating sequence of a first blanking state, a second blanking state, and the third blanking state.

24. The transmitter of claim 23, wherein the transmitter operating in the 12-bit mode is configured to operate as follows when entering an active video interval with the subsystem in the third blanking state:

during a first cycle of the second link clock in the active video interval, the circuitry asserts a Q-bit code word indicative of a first fragment of a group to the at least one output.

25. The transmitter of claim 15, wherein the transmitter is operable in a 16-bit mode in which N=16, the sequence of encoded fragments is a sequence of groups, each said group consists of two of the encoded fragments, and each encoded fragment in each said group has a different phase within the group.

26. The transmitter of claim 25, wherein the subsystem is configured to operate as follows when the transmitter operating in the 16-bit mode enters a blanking interval after asserting a Q-bit code word indicative of a second fragment of a group to the at least one output but before asserting a Q-bit code word indicative of a first fragment of a subsequent group to the at least one output:

during a first cycle of the second link clock in the blanking interval, the subsystem enters a first blanking state; and during subsequent cycles of the second link clock in the blanking interval, the subsystem enters a repeating sequence of a second blanking state, and the first blanking state.

27. The transmitter of claim 26, wherein the transmitter operating in the 16-bit mode is configured to operate as follows when entering an active video interval with the subsystem in the second blanking state:

during a first cycle of the second link clock in the active video interval, the circuitry asserts a Q-bit code word indicative of a first fragment of a group to the at least one output.

28. A transmitter for transmitting N-bit video over a serial link configured to transmit encoded K-bit words of video data, said transmitter comprising:

a subsystem operable in at least one N-bit mode to pack a sequence of N-bit words of video data into a sequence of fragments, where N≠K and each of the fragments consists of K bits of the video data; and circuitry coupled to the subsystem and having at least one output configured to be coupled to the serial link, wherein the circuitry is configured to generate a sequence of encoded fragments by encoding each fragment in the sequence of fragments and to assert the sequence of encoded fragments to the at least one output, whereby the encoded fragments can be transmitted over the link when said link is coupled to the at least one output, wherein the sequence of encoded fragments is a sequence of groups of M encoded fragments, each of the M encoded fragments in each of the groups has a different phase within the group, the circuitry is configured to assert the sequence of encoded fragments to the at least one output during active video intervals and to assert blanking characters to the at least one output during blanking intervals, and the transmitter is configured to execute state machine sequences, each consisting of M states, that implement transitions between the active video intervals and the blanking intervals at boundaries between assertion of different encoded fragments of a single group, and between boundaries that occur between assertion of different groups, without omitting assertion of any encoded fragment in the sequence of encoded fragments.

29. The transmitter of claim 28, wherein M=N/D, where D is the greatest common divisor of N and K, the transmitter is also operable in a K-bit mode in which the circuitry asserts code words indicative of K-bit words of the video data to the at least one output during active video intervals at a rate of one code word per cycle of a link clock having frequency P, the transmitter is also operable in each said N-bit mode to assert the sequence of encoded fragments to the at least one output during active video intervals at a rate of one encoded fragment per cycle of a second link clock having frequency at least substantially equal to (N/K)P.

30. The transmitter of claim 29, wherein the transmitter is configured to assert packing phase data to the at least one output during at least some blanking intervals between the active video intervals, the packing phase data asserted during a blanking interval indicate the phase of the last one of the encoded fragments asserted to the at least one output before said blanking interval.

31. The transmitter of claim 30, wherein the packing phase data are indicated by a sequence of code words asserted to a first pair of outputs of the circuitry and a second pair of outputs of the circuitry during the first X cycles of the second link clock during at least one blanking interval between active video intervals during operation of the transmitter in each said N-bit mode, where X is an integer.

32. A transmitter for transmitting N-bit video over a serial link configured to transmit encoded K-bit words of video data, said transmitter comprising:
a subsystem operable in at least one N-bit mode to pack a sequence of N-bit words of video data into a sequence of fragments, where N≠K and each of the fragments consists of K bits of the video data; and
circuitry coupled to the subsystem and having at least one output configured to be coupled to the serial link, wherein the circuitry is configured to generate a sequence of encoded fragments by encoding each fragment in the sequence of fragments and to assert the sequence of encoded fragments to the at least one output, whereby the encoded fragments can be transmitted over the link when said link is coupled to the at least one output, wherein one said N-bit mode is a mode in which N=L*P, where L and P are integers, and the transmitter is also operable in a P-bit mode in which the video data consist of P-bit color components, and the subsystem in the P-bit mode is configured to pack sets of L consecutive P-bit color components of the video data into N-bit words, and to pack a sequence of the N-bit words into the sequence of fragments in the same manner that the subsystem in the N-bit mode packs a sequence of N-bit words of the video data into the sequence of fragments.

33. The transmitter of claim 1, wherein the sequence of encoded fragments is a sequence of groups of M encoded fragments, each of the M encoded fragments in each of the groups has a different phase within the group, and the transmitter is configured to assert the encoded fragments to the at least one output during active video intervals, and to assert blanking data to the at least one output during blanking intervals between the active video intervals, so as to indicate implicitly the phase of each of the encoded fragments that is asserted to the at least one output at each occurrence of a known checkpoint.

34. The transmitter of claim 33, wherein the phase of said each of the encoded fragments is indicated implicitly by constraining occurrence of the checkpoint so as to fix said phase at each occurrence of the checkpoint.

35. The transmitter of claim 33, wherein the phase of said each of the encoded fragments is indicated implicitly by restarting transmission of one said sequence of groups at each occurrence of the checkpoint.

36. A transmitter, including:
a subsystem operable in any selected one of a number of different 3N-bit pixel modes to pack sequences of N-bit color components of video data into sequences of fragments, where N≠8, each of the fragments consists of 8 bits of the video data, and the 3N-bit pixel modes include a 30-bit pixel mode, a 36-bit pixel mode, and a 48-bit pixel mode; and
circuitry coupled to the subsystem and having outputs configured to be coupled to a transition minimized differential signaling (TMDS) link, wherein the circuitry is configured to generate sequences of encoded fragments by performing TMDS encoding on the sequences of fragments and to assert the sequences of encoded fragments to the outputs during active video intervals, whereby the encoded fragments can be transmitted over the TMDS link when said TMDS link is coupled to the outputs,
wherein the transmitter is operable in a 24-bit pixel mode in which the subsystem asserts 8-bit components of 24-bit pixels to the circuitry, the circuitry performs TMDS encoding on the 8-bit components to generate a 10-bit TMDS code word in response to each of the 8-bit components, and the circuitry asserts each said TMDS code word to the outputs, and
wherein each of the sequences of fragments is a sequence of MN-fragment groups, where MN is an integer whose value depends on which of the 3N-bit pixel modes is the selected one of the 3N-bit pixel modes, each of the fragments in each of the groups has a different phase within the group, the circuitry is configured to assert blanking characters to the outputs during blanking intervals, and the transmitter is configured to implement state machine sequences that implement transitions between the active video intervals and the blanking intervals at boundaries between assertion of different encoded fragments of a single one of the groups, and between boundaries that occur between assertion of different ones of the groups, without omitting assertion of any encoded fragment in any of the sequences of encoded fragments.

37. The transmitter of claim 36, wherein the transmitter is also operable in an 18-bit pixel mode in which the video data are 18-bit video data, and the subsystem in the 18-bit pixel mode is configured to pack consecutive 6-bit color components of the video data into 12-bit words, and to pack sequences of the 12-bit words into the sequences of fragments in the same manner that the subsystem in the 36-bit pixel mode packs consecutive 12-bit color components of the video data into sequences of fragments.

38. The transmitter of claim 36, wherein transmitter in the 24-bit pixel mode is configured to assert each said TMDS code word to the outputs at a rate of one said TMDS code word per cycle of a link clock having frequency P, the encoded fragments asserted to the outputs in each said 3N-bit pixel mode are also TMDS code words, and the transmitter in each said 3N-bit pixel mode is configured to assert the TMDS code word to the outputs at a rate of one of the TMDS code words per cycle of a second link clock having frequency at least substantially equal to (N/8)P.

39. A system, including:
a transmitter;
a receiver; and
a serial link coupled between the transmitter and the receiver, wherein the transmitter comprises:
a subsystem operable in at least one N-bit mode to pack a sequence of N-bit words of video data into a sequence of fragments, where N≠K and each of the fragments consists of K bits of the video data; and
circuitry coupled to the subsystem and having outputs configured to be coupled to data channels of the serial link, wherein the circuitry is configured to generate a sequence of encoded fragments by encoding the fragments and to assert the sequence of encoded fragments to the outputs to transmit the encoded fragments to the receiver over the link, wherein the sequence of encoded fragments is a sequence of groups of the encoded fragments, each of the groups determines a different one of the N-bit words of video data, and the circuitry of the transmitter is configured to assert the groups sequentially to the outputs, and wherein the N-bit words of video data are asserted to the subsystem at a first rate equal to P of the N-bit words per unit time and the circuitry of the transmitter is configured to assert the sequence of encoded fragments to the outputs at a second rate that is at least substantially equal to (N/K)P of the encoded fragments per unit time.

40. The system of claim 39, wherein the sequence of encoded fragments is a sequence of groups of M encoded fragments, where M=N/D, and D is the greatest common divisor of N and K.

41. A system, including:

a transmitter;

a receiver; and a serial link coupled between the transmitter and the receiver, wherein the transmitter comprises:

a subsystem operable in at least one N-bit mode to pack a sequence of N-bit words of video data into a sequence of fragments, where N≠K and each of the fragments consists of K bits of the video data; and circuitry coupled to the subsystem and having outputs configured to be coupled to data channels of the serial link, wherein the circuitry is configured to generate a sequence of encoded fragments by encoding the fragments and to assert the sequence of encoded fragments to the outputs to transmit the encoded fragments to the receiver over the link, wherein the transmitter is configured to execute state sequences, each consisting of M states, during operation in each said N-bit mode, said state sequences including:

active video interval sequences, wherein M of the encoded fragments are asserted to the outputs during each of the active video interval sequences;

blanking interval sequences, wherein M blanking characters is asserted to the outputs during each of the blanking interval sequences, and one of said M blanking characters is identical to another one of said M blanking characters;

active video to blanking transitional sequences, wherein one of the encoded fragments is asserted to the outputs during a first state of each of the active video to blanking transitional sequences and a last state of each of the active video to blanking transitional sequences occurs in a blanking interval; and blanking to active video transitional sequences, wherein one of the encoded fragments is asserted to the outputs during a last state of each of the blanking to active video transitional sequences and a first state of each of the blanking to active video transitional sequences occurs in a blanking interval, wherein the transmitter is configured to assert the sequence of encoded fragments to the outputs without omitting assertion of any encoded fragment thereof by executing, completely or partially, a sufficient number of state sequence cycles, each of the state sequence cycles including any number of the active video interval sequences, followed by one of the active video to blanking transitional sequences, followed by a number of the blanking interval sequences, followed by one of the blanking to active video transitional sequences.

42. A system, including:

a transmitter;

a receiver; and a serial link coupled between the transmitter and the receiver, wherein the transmitter comprises:

a subsystem operable in at least one N-bit mode to pack a sequence of N-bit words of video data into a sequence of fragments, where N≠K and each of the fragments consists of K bits of the video data; and circuitry coupled to the subsystem and having outputs configured to be coupled to data channels of the serial link, wherein the circuitry is configured to generate a sequence of encoded fragments by encoding the fragments and to assert the sequence of encoded fragments to the outputs to transmit the encoded fragments to the receiver over the link, wherein the sequence of encoded fragments is a sequence of groups of M encoded fragments, each of the M encoded fragments in each of the groups has a different phase within the group, and the transmitter is configured to assert the encoded fragments to the outputs during active video intervals and to assert packing phase data to at least one of the outputs during at least some blanking intervals between the active video intervals, wherein the packing phase data asserted during a blanking interval indicate the phase of the last one of the encoded fragments asserted to the outputs before said blanking interval.

43. The system of claim 42, wherein the circuitry includes encoder circuitry having a first pair of outputs configured to be coupled to a data channel of a transition minimized differential signaling (TMDS) link and a second pair of outputs configured to be coupled to a second data channel of the TMDS link, the encoder circuitry is configured to receive and encode control bits and to assert code words indicative of the encoded control bits to the first pair of outputs and the second pair of outputs, and the transmitter is operable in a message mode in which control bits including packing phase bits are asserted to the encoder circuitry and the encoder circuitry asserts code words indicative of the packing phase bits to the first pair of outputs and the second pair of outputs, wherein said code words indicative of the packing phase bits determine the packing phase data.

44. The system of claim 43, wherein the transmitter is also operable in a second mode in which a sequence of four-bit control words are asserted to the encoder circuitry, each of said control words including a CTL0 bit, a CTL1 bit, a CTL2 bit, and a CTL3 bit, and wherein the control bits asserted to the encoder circuitry in the message mode include a sequence of message mode control words, each of said message mode control words including a CTL0 bit, two of the packing phase bits, and a CTL3 bit.

45. The system of claim 42, wherein the transmitter is configured to assert the encoded fragments to the outputs during active video intervals and to assert packets including encoded auxiliary data to at least a subset of the outputs during data islands, wherein each of the data islands is a time interval that neither coincides with nor overlaps any of the active video intervals, the transmitter is also configured to assert control data to the outputs during control data periods, wherein the control data periods neither coincide with nor overlap any of the data islands and neither coincide with nor overlap any of the active video intervals, and at least one of the packets includes the packing phase data.

46. The system of claim 42, wherein the transmitter is configured to assert color mode data to at least one of the outputs during at least some blanking intervals between active video intervals, wherein the color mode data are indicative of the N-bit mode in which the transmitter's subsystem is operating.

47. The system of claim 42, wherein the circuitry includes encoder circuitry having a first pair of outputs configured to be coupled to a data channel of a transition minimized differential signaling (TMDS) link and a second pair of outputs configured to be coupled to a second data channel of the TMDS link, the encoder circuitry is configured to receive and encode control bits and to assert code words indicative of the encoded control bits to the first pair of outputs and the second pair of outputs, and the transmitter is operable in a message mode in which control bits including color mode bits are asserted to the encoder circuitry and the encoder circuitry asserts code words indicative of the color mode bits to the first pair of outputs and the second pair of outputs, wherein said code words indicative of the color mode bits determine the color mode data.

48. A system, including:
a transmitter;
a receiver; and
a serial link coupled between the transmitter and the receiver, wherein the transmitter comprises:
a subsystem operable in at least one N-bit mode to pack a sequence of N-bit words of video data into a sequence of fragments, where N≠K and each of the fragments consists of K bits of the video data; and
circuitry coupled to the subsystem and having outputs configured to be coupled to data channels of the serial link, wherein the circuitry is configured to generate a sequence of encoded fragments by encoding the fragments and to assert the sequence of encoded fragments to the outputs to transmit the encoded fragments to the receiver over the link, wherein the sequence of encoded fragments is a sequence of groups of M encoded fragments, each of the M encoded fragments in each of the groups has a different phase within the group, and the transmitter is configured to assert the encoded fragments to the outputs during active video intervals, and to assert blanking data to the outputs during blanking intervals between the active video intervals, so as to indicate implicitly the phase of each of the encoded fragments that is asserted to the outputs at each occurrence of a known checkpoint.

49. The transmitter of claim 1, wherein said transmitter is operable during active video intervals and blanking intervals between the active video intervals, said transmitter is configured to transmit the encoded K-bit words of video data during the active video intervals but not during any of the blanking intervals, and the circuitry is configured to assert each said sequence of encoded fragments to the at least one output during the active video intervals but not during any of the blanking intervals.

50. The system of claim 39, wherein said transmitter is operable during active video intervals and blanking intervals between the active video intervals, said transmitter is configured to transmit the encoded fragments during the active video intervals but not during any of the blanking intervals, and the circuitry is configured to assert each said sequence of encoded fragments to the outputs during the active video intervals but not during any of the blanking intervals.

* * * * *

UNITED STATES PATENT AND TRADEMARK OFFICE
CERTIFICATE OF CORRECTION

PATENT NO. : 7,599,439 B2 Page 1 of 1
APPLICATION NO. : 11/166458
DATED : October 6, 2009
INVENTOR(S) : Michael G. Lavelle et al.

It is certified that error appears in the above-identified patent and that said Letters Patent is hereby corrected as shown below:

In Column 54, line 18 (first occurrence), "MN" should be --$M_N$--; and

In Column 54, line 18 (second occurrence), "MN" should be --$M_N$--.

Signed and Sealed this

Fifth Day of January, 2010

David J. Kappos
*Director of the United States Patent and Trademark Office*